(12) United States Patent
Rooney

(10) Patent No.: US 11,263,574 B2
(45) Date of Patent: *Mar. 1, 2022

(54) PROMULGATING EXCHANGE OF INFORMATION FOR AN EXTRACTION RIGHTS MARKET IN A GROUNDWATER BASIN

(71) Applicant: IPQ PTY LTD, Adelaide (AU)

(72) Inventor: Thomas Henry Rooney, Fresno, CA (US)

(73) Assignee: IPQ PTY LTD, Adelaide (AU)

( * ) Notice: Subject to any disclaimer, the term of this patent is extended or adjusted under 35 U.S.C. 154(b) by 0 days.

This patent is subject to a terminal disclaimer.

(21) Appl. No.: 16/748,791

(22) Filed: Jan. 21, 2020

(65) Prior Publication Data

US 2020/0234215 A1 Jul. 23, 2020

Related U.S. Application Data

(63) Continuation of application No. 15/224,462, filed on Jul. 29, 2016, now Pat. No. 10,579,951.

(Continued)

(51) Int. Cl.
| | |
|---|---|
| *G06Q 10/06* | (2012.01) |
| *G06Q 50/06* | (2012.01) |
| *E21B 41/00* | (2006.01) |
| *G01V 11/00* | (2006.01) |
| *G06Q 50/02* | (2012.01) |

(Continued)

(52) U.S. Cl.
CPC ....... *G06Q 10/06375* (2013.01); *E21B 41/00* (2013.01); *G01V 11/00* (2013.01); *G06Q 10/06315* (2013.01); *G06Q 10/10* (2013.01);

*G06Q 20/14* (2013.01); *G06Q 30/018* (2013.01); *G06Q 40/04* (2013.01); *G06Q 40/12* (2013.12);

(Continued)

(58) Field of Classification Search
CPC ............. G06Q 10/06375; G06Q 40/12; G06Q 10/06315; G06Q 10/10; G06Q 20/14; G06Q 30/018; G06Q 40/04; G06Q 50/02; G06Q 50/06; G06Q 50/163; G06Q 50/16; G01V 11/00; E21B 41/00
USPC ...................................................... 705/3–44
See application file for complete search history.

(56) References Cited

U.S. PATENT DOCUMENTS 5,813,798 A * 9/1998 Whiffen .................... B09C 1/00
210/739
5,874,001 A 2/1999 Carter
(Continued)

OTHER PUBLICATIONS

Yashodha, "Do buyers have bargaining power ? Evidence from informal groundwater contracts", PLoS One 15.9: e0236696, Public Library of Science, Sep. 2020.*

(Continued)

*Primary Examiner* — Frantzy Poinvil
(74) *Attorney, Agent, or Firm* — Kang S. Lim

(57) ABSTRACT

An electronic newsletter distribution system useful in association with a water agency management platform provides information exchange for administering groundwater extraction rights in one or more trading-zones. The platform matches offers to trade utilization of groundwater extraction rights (GWRs), and intermediates transfers of the matched GWRs based one or more transfer rules. The system also facilitates trading of "sell order" and "buy order" in response to the water pricing and water offering information.

14 Claims, 52 Drawing Sheets

Related U.S. Application Data

(60) Provisional application No. 62/308,781, filed on Mar. 15, 2016.

(51) Int. Cl.

| | | |
|---|---|---|
| *G06Q 10/10* | (2012.01) | |
| *G06Q 30/00* | (2012.01) | |
| *G06Q 50/16* | (2012.01) | |
| *G06Q 40/04* | (2012.01) | |
| *G06Q 40/00* | (2012.01) | |
| *G06Q 20/14* | (2012.01) | |

(52) U.S. Cl.
CPC .............. *G06Q 50/02* (2013.01); *G06Q 50/06* (2013.01); *G06Q 50/163* (2013.01)

(56) References Cited

U.S. PATENT DOCUMENTS

| | | | | |
|---|---|---|---|---|
| 6,151,566 | A | 11/2000 | Whiffen | |
| 7,103,479 | B2* | 9/2006 | Patwardhan | A01G 25/16 702/12 |
| 7,254,564 | B2* | 8/2007 | Coppola, Jr. | G01V 9/02 703/10 |
| 7,486,398 | B1* | 2/2009 | Cole | G01N 21/39 356/432 |
| 8,074,670 | B2* | 12/2011 | Peters | B65G 5/005 137/1 |
| 9,195,719 | B2 | 11/2015 | Lassley | |
| 9,202,252 | B1 | 12/2015 | Smith et al. | |
| 10,871,391 | B2* | 12/2020 | Dechesne | G06Q 50/06 |
| 10,883,238 | B2* | 1/2021 | Goodrich | G06Q 10/06315 |
| 2002/0174052 | A1* | 11/2002 | Guler | G06Q 30/08 705/37 |
| 2003/0078901 | A1 | 4/2003 | Coppola, Jr. | |
| 2005/0246102 | A1* | 11/2005 | Patwardhan | A01G 25/16 702/2 |
| 2013/0160997 | A1* | 6/2013 | Punthakey | E03B 1/00 166/250.01 |
| 2013/0218873 | A1 | 8/2013 | Lassley et al. | |
| 2013/0346327 | A1 | 12/2013 | Lassley | |
| 2014/0074734 | A1* | 3/2014 | Lassley | G06Q 50/165 705/306 |
| 2015/0270622 | A1* | 9/2015 | Takasaki | H01Q 5/385 343/797 |
| 2016/0034912 | A1 | 2/2016 | Lassley | |
| 2016/0097173 | A1 | 4/2016 | Divers, III | |
| 2017/0044894 | A1 | 2/2017 | Surowinski | |
| 2017/0270607 | A1 | 9/2017 | Rooney | |
| 2017/0270621 | A1 | 9/2017 | Fleming | |
| 2017/0270622 | A1 | 9/2017 | Rooney | |
| 2017/0270624 | A1* | 9/2017 | Rooney | G06Q 20/14 |

OTHER PUBLICATIONS

McColly, "Market Mechanisms and Efficient Allocation of Water: Modeling Water Prices, Option Contracts on Water and Enhancing Frameworks", Texas A&M University—Corpus Christi, ProQuest Document Id: 2421467896, Dissertations Publishing (Year: 2020).*

State of California—Department of Water Resources and the Regents of the University of California, California Land and Water Use, Department of Water Resources and Department of Air, Land and Water Resources. University of California, Davis. "User's Guide, CUP+—M Consumptive Use Program $^{Plus}$" Version 1.0, 2008, pp. 1-48.

State of California, The Resources Agency, Department of Water Resources. Bulletin 118 "California's Groundwater" updated 2003, Chapter 6, 44 pages.

USGS Circular 1186, "Sustainability of Ground-Water Resource" by William M. Alley et al., dated 1999, 43 pages—Part 1 of 2.

USGS Circular 1186, "Sustainability of Ground-Water Resource" by William M. Alley et al., dated 1999, 43 pages—Part 2 of 2.

State of California, The Resources Agency, Department of Water Resources. Bulletin 118-80, "Ground Water Basins in California", A report to the Legislature in Response to Water Code Section 12924, dated Jan. 1980, 43 pages.—Part 1 of 2.

State of California, The Resources Agency, Department of Water Resources. Bulletin 118-80, "Ground Water Basins in California", A report to the Legislature in Response to Water Code Section 12924, dated Jan. 1980, 42 pages.—Part 2 of 2.

Wheeler et al., "Developing a water market readiness assessment framework", Centre for Global and resources, Faculty of the Professions, University of Adelaide, Adelaide, SA 5005, Journal of Hydrology, www.elsevier.com /locate/jhydrol. (Year: 2017).

Hilary, "Whose Water is it", American Journal of Economics and Sociology, vol. 75, No. 3. (Year: 2016).

Intellectual Property India, "Examination report under sections 12 & 13 of the Patents Act, 1970 and the Patents Rules, 2003." Application No. 201827031891 dated Oct. 20, 2021, 7 pages.

* cited by examiner

| Crop: | Alfalfa ▼ | Year: | 2015 | | | | Collapse Search |
|---|---|---|---|---|---|---|---|
| Member: | | Group: | | | | | Search |

| ☐ | Member ⇅ | APN ⇅ | Crop ⇅ | Acres ⇅ | Plant ⇅ | Pull ⇅ | Add NEW [?] |
|---|---|---|---|---|---|---|---|
| ☐ | TOM & GRACE NAITO LLC | 023-230-004 | Alfalfa | 100.0 | 01/12/2016 | | Edit |
| ☐ | MANUEL T & LAURA T ROCHA | 023-180-022 | Alfalfa | 19.1 | 20/02/2016 | 31/12/2016 | Edit |
| ☐ | DOUBLE C FARMS #2 COSYNS | 023-270-012 | Alfalfa | 242.7 | 02/04/2016 | 31/12/2016 | Edit |
| ☐ | DOUBLE C FARMS #2 COSYNS | 023-270-010 | Alfalfa | 271.5 | 02/04/2016 | 31/12/2016 | Edit |
| ☐ | MANUEL T & LAURA T ROCHA | 023-050-010 | Alfalfa | 38.6 | 20/02/2016 | 31/12/2016 | Edit |
| ☐ | S RANCH LLC 4 | 023-230-004 | Alfalfa | 94.3 | 08/01/2016 | 31/12/2016 | Edit |

| All Members | All APNs | | Clear Table | | Clear Selection | | Isolate Selection |
| Showing 1 to 6 of 311 entries | | | Previous | 1 | 2 | 3 | 4 | 5 | ... | 52 | Next |

FIG. 8A

Water Use By APNs

| Crop | | Immediate Estimates | | Forecast Estimates | | | | | |
|---|---|---|---|---|---|---|---|---|---|
| Type | Area | This Week | Next Week | May | Jun | Jul | Aug | Sep | Oct |
| Grapes (Table/Raisin) | 10474 | 1315.8 | 1358.1 | 5447.8 | 6107.2 | 6883.9 | 5607.9 | 4180 | 2674.8 |
| Alfalfa | 20930.6 | 2784.1 | 2873.7 | 11525.9 | 12922.2 | 13412.5 | 11865.8 | 8844.4 | 5659.6 |
| Walnut | 804.7 | 130.8 | 135 | 541.6 | 607.2 | 630.2 | 557.6 | 415.5 | 265.9 |
| Olives | 134.4 | 13.9 | 14.4 | 57.6 | 64.6 | 67 | 59.3 | 44.2 | 28.3 |
| Brussel Sprouts | 8.2 | 1.2 | 1.3 | 5.3 | 6.0 | 6.1 | 5.4 | 4 | 2.6 |
| Total | 61140.8 | 7370.8 | 7607.8 | 30516.7 | 34210.6 | 35508.7 | 31413.9 | 23314.9 | 14983.3 |

Irrigation Requirement Estimate by Crop

| APN: | ▼ | Nickname: | | |
|------|---|-----------|---|---|
| Member: | | Group: | | |

Collapse Search

Search

| ☐ | Member ↕ | APN ↕ | Nickname ↕ | Acres ↕ | Turnouts ↕ | Crops ↕ | Wells ↕ | Add NEW ? ◄ ▶ |
|---|----------|-------|------------|---------|------------|---------|---------|------|
| ☐ | TOM & GRACE NAITO LLC | 023-230-004 | | | | Alfalfa | | Edit |
| ☐ | MANUEL T & LAURA T ROCHA | 023-180-022 | | | | Alfalfa | | Edit |
| ☐ | DOUBLE C FARMS #2 COSYNS | 023-270-012 | | | | Alfalfa | | Edit |
| ☐ | DOUBLE C FARMS #2 COSYNS | 023-270-010 | | | | Alfalfa | | Edit |
| ☐ | MANUEL T & LAURA T ROCHA | 023-050-010 | | | | Alfalfa | | Edit |
| ☐ | S RANCH LLC 4 | 023-230-004 | | | | | | Edit |

[All Members] [All Groups] [All Crops] [All Wells]    [Clear Table] [Clear Selection] [Isolate Selection]

Showing 1 to 6 of 947 entries    Previous [1] 2 3 4 5 ... 158 Next 850b
855b
880b
860b
890b

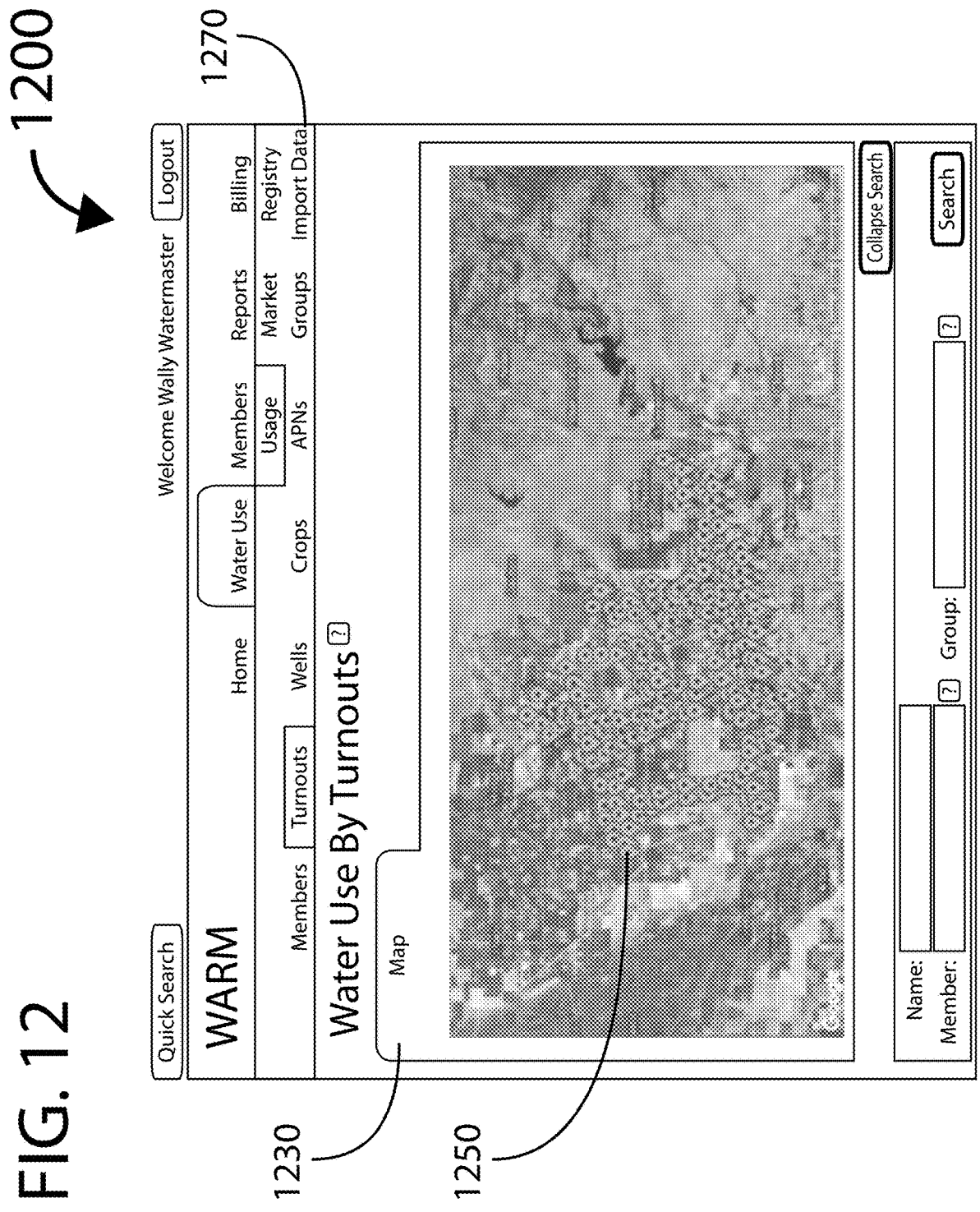

FIG. 14 — 1400

WARM   Welcome Wally Watermaster   Logout

Overview | Home | Water Use | Members | Reports | Billing
Reports | Annual Report | Mapping | Advanced Reports | Data Input/Export Quick Search Select Basin
[Select Basin ▼]

Water Use
- Water Use Scenario Analysis
- Surface water resource forecasts
- Forecast Water Use – District
- Water Use by Well – Map
- Recharge potential – Map

Market Analysis
- Lease Price analysis
- Sale Price analysis
- Long term water resource movement estimates
- Recharge project breakeven price
- Surface/Groundwater substitution analysis

Crops and Production
- Basin Gross Value of Irrigated production
- Land use and crop production forecasts
- Well development forecasts
- Water Resource optimization analysis
- Forecast district maximum production capacity
- Commodity price trend ← 1440
- Irrigation Productivity analysis
- Crop revenue maximization analysis

Climate and Weather
- Southern Oscillation Index/ENSO analysis
- Above above outlooks
- Long term rainfall trend analysis
- Long term temperature trend analysis
- Tree nut production estimates
- Frost risk forecasts
- Recharge opportunity forecasts

Quick Search — Logout
Welcome Wally Watermaster

WARM
Home | Water Use | Members | Reports | Billing
Search | Add New Member | TOM COURTNEY 1720a — Contact Details First name: TOM
Last name: COURTNEY
Email: tom@warmgma.org
Company:
Job Title:
Landline: ✓
Mobile: ✓
Fax:

Street: 413 W YOSEMITE AVE #108
Suburb: Clovis
Country: United States
State:
Post/Zip: 0

Account Options
- Grower
- Domestic
- Newsletter Opt In
- Validated Email
- Validated Access Contact Notes HEY EVERYBODY!! Tom is our new board member!

Quick Search

WARM

Welcome Wally Watermaster    Logout

Home | Water Use | Members | Reports | Market | Registry | Billing

Overview | Usage | Market Platform | Transfer Rules | Market Rules

Create Lease Order

Select GWR

GWR 412547 ▼    Zone: Yolo

Sub Basin: Sub Basin 4

Volume available to sell: 284 acre feet ( Transfer Conditions )    ( Check Market TOU )

Details

Volume: 284 acre feet

Split: 40 acre feet

Zone: Yolo

Price per af: $198

Total value: $56,232 (not incl. Charges and taxes)

Lease to: 30th September 2016

Sub Basin: Sub Basin 4

( Transfer Conditions )    ( Check Property )

( Download Sale Contract )    ( Create Order )

| Quick Search | | | | Welcome Wally Watermaster | Logout |
|---|---|---|---|---|---|
| WARM | | | | | |
| | Home | Water Use | Members | Reports | Billing |
| | | Overview | GWR List | Interests | Documents |

Search GWRs

| Owner name | | Company name |
| GWR number | | Company |
| Dealings in the Last 30 Days ▾ | | Property id |
| Dealings between | | |
| Start date | to End date | Zone |

| Reg ID | UserType | Name | Company Name | Campaign | Tagged Broker | Go To CRM |
|---|---|---|---|---|---|---|
| 2735352393 | Online | TOM & GRACE NAITO | | Iron | | Go To CRM |
| 2824538383 | Online | TOM & GRACE NAITO | | Iron | | Go To CRM |
| 2826249683 | Online | BARBARA TESTOLIN | | Iron | | Go To CRM |
| 2824532672 | Online | BEULAH TESTOLIN JR. | | Silver | | Go To CRM |
| 2823353468 | Online | EDNA TESTOLIN | | None | | Go To CRM |
| 2823353364 | Online | EDNA TESTOLIN | | None | | Go To CRM |
| 2823353392 | Online | EDNA TESTOLIN | | None | | Go To CRM |
| 2823353466 | Online | EDNA TESTOLIN | | None | | Go To CRM |
| 2823363416 | Online | EDNA TESTOLIN | | Silver | | Go To CRM |
| 2823394890 | Online | EDNA TESTOLIN | | Iron | | Go To CRM |

WARM

Welcome Wally Watermaster  [Logout]

| Home | Water Use | Members | Reports | Billing |
| | Overview | Usage | Market | Registry |
| | | GWR List | Interests | Documents |

[Quick Search]

Action No. 41541

Registry Action
Action No:  41541
Type:  Registration of Lease

*Agency View*

*Member View*

View Registry Action Procedures
Show Action Diary
Download Action Progress

Action Details

Lessor Information
Member Name: George Jetson
Property Name Id: Coachella Ranch
Zone: South View attached polls
View Property Details
Member contact
Send form to Member
Show Member 5360

Lessee Information
Member Name: TOM & GRACE NAITO LLC
Property Name:
Zone: South View attached polls
View Property Details
Member contact
Send form to Member
Show Member 5360

2910a →

2920a →

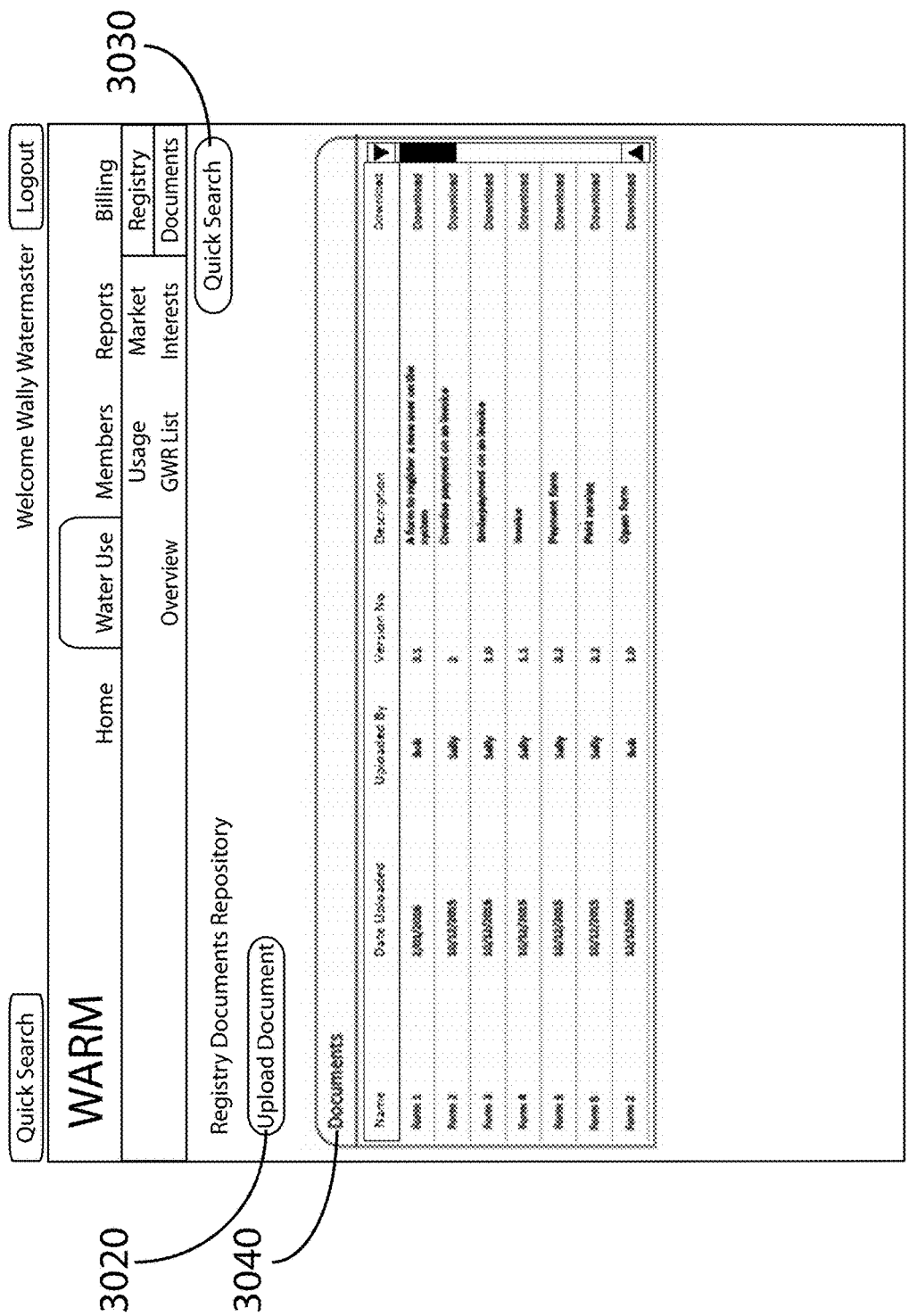

Pending registry actions

| Date | Type | Owner | Status | Details |
|---|---|---|---|---|
| 2/01/2016 | GWR Sale | George Jetsom | Not Approved | Details |
| 18/12/2015 | Mortgage discharge | George Jetson | Approved | Details |
| 18/12/2015 | GWR Sale with land | George Jetson | Approved | Details |
| 18/12/2015 | GWR Lease | George Jetson | Not Approved | Details |
| 18/12/2015 | GWR Sale | George Jetson | Not Approved | Details |

3160b

Recently Saved Reports

| 1/18/16 | 2015 GW Extraction | Wally Watermaster |
|---|---|---|
| 1/12/16 | December Extraction | Daniel Hope |
| 1/10/16 | December Meters Report | Lang Lang |
| 12/4/15 | Nov Storage Level | Wally Watermaster |
| 12/3/15 | Crop report | Ludo Einaudi |
| 1/18/16 | 2015 GW Extraction | Wally Watermaster |

Quick Search | Welcome Wally Watermaster | Logout

WARM

Home | Water Use | Members | Reports | Billing
Overview | Invoices | Past Due | Collections 3220a — $127,874 Current Invoices | $34,280 Overdue Invoices | $144,758 Closed Invoices | $2,874,581 Estimated Invoices ← 3230a

Search Invoices

Status ▼ | Name | Crop Type ▼
Invoice Number | Company | Zone
Property | |
Start Date | End Date | Search

Search Result

Show [10 ▼] entries | | | | | | | Search: [ ]

| Created | Type | No. | Member | Due Date | Balance | Total | Status | Action |
|---|---|---|---|---|---|---|---|---|
| No Data | | | | | | | | |

Showing 0 to 0 of 0 entries | Previous | Next

PROMULGATING EXCHANGE OF INFORMATION FOR AN EXTRACTION RIGHTS MARKET IN A GROUNDWATER BASIN

CROSS REFERENCE TO RELATED APPLICATIONS

This application claims the benefit of and is a Continuation of application Ser. No. 15/224,462, filed Jul. 29, 2016, of the same title, now U.S. Pat. No. 10,579,951 issued Mar. 3, 2020, which application claims priority to provisional application No. 62/308,781 filed Mar. 15, 2016, entitled "Systems and Methods for Sustainable Management of Renewable Water Resources".

This application also is related to application Ser. No. 15/224,436, filed Jul. 29, 2016, entitled "Systems and Methods for Imputing Groundwater Usage in a Groundwater Basin", abandoned.

Additionally, this application is related to application Ser. No. 15/224,448, filed Jul. 29, 2016, entitled "Systems and Methods for Optimization of Groundwater Resource Usage in a Groundwater Basin", abandoned.

Lastly, this application is related to application Ser. No. 15/224,467, filed Jul. 29, 2016, entitled "A Water Agency Management Platform for Sustainably Managing Water Resources Including Groundwater Extraction Rights Within a Water Management Area", abandoned.

All of the above-referenced applications are incorporated herein in their entirety by this reference.

BACKGROUND

The present invention relates to systems and methods for responsible sustainable management of renewable water resources, including groundwater.

Given the need to conserve water resources to sustain both increasing human consumption and agriculture indefinitely, when combined with unpredictability of climate conditions and a growing need for food, sustainable groundwater management has become a critical and essential component of a long term solution to the water resource management.

The management of water resources is often further complicated by a complex mapping of jurisdictional boundaries corresponding to multiple surface water management agencies that haphazardly cross over the boundaries of the naturally occurring groundwater basins, which commonly contain one or more aquifers. In some geographical areas, intensive groundwater pumping, often dramatically increasing during extended periods of drought, have resulted in the water table dropping substantially—sometimes causing permanent loss of aquifer capacity, which further exacerbates the critical urgency of attaining sustainable water resource management. In some areas of California's central valley, surface subsidence due to aquifer collapse has been reported—nearly 2 inches per month in some locations according to NASA.

Groundwater is essentially distributed by the aquifer, which often is accessed on a patchwork basis due to the large cost of drilling wells. In contrast, surface water may be distributed using natural and manmade water courses that may provide a much more uniform, widespread and measurable distribution of water. Private access to and depletion of groundwater goes largely unmeasured, unmetered and unregulated. Such an inequitable and unsustainable free-for-all situation is often referred to as "the tragedy of the commons". Hence, delaying implementation of comprehensive water resource management is not an option, if long-term sustainability is to be accomplished.

A typical water agency has a specific geographic district over which it has authority. The boundaries of an agency's district may correspond to the boundaries of a surface water basin or can be more arbitrarily based on political boundaries such as municipal, county, state, provincial or international borders. Water agencies seldom have boundaries fully encompassing an underlying aquifer or aquifers. More often, multiple water agencies overlie different portions of a single aquifer. Additionally, one or more water consumers within an agency's district may have water rights that are senior to or separate from the agency. In many instances, a water agency combines pumped groundwater with surface water supplies. Additionally, a water agency may have customers that are pumping groundwater from private unmetered wells and using it in conjunction with water supplied from the water agency. In addition to water consumers—agricultural and municipal—a groundwater basin may have many additional stakeholders such as, politicians, government officials, lobbyists, community organizations, scientists, water brokers, and right of way holders. All of these complexities make coherent sustainable management of a groundwater basin extremely difficult.

Consequently, in order to effectively sustainably manage a groundwater basin, either a single agency needs to have authority over the entire basin; or multiple agencies overlying parts of that basin need to cooperate to provide coordinated management that in combination results in combined authority over the entire basin. Problematically, many basins have private (and often unmetered) groundwater users with senior or otherwise independent water rights. Perhaps the most direct solution to such a "Gordian Knot" problem is legislation that modifies and subsumes such prior private rights under the authority of a water agency (or cooperating water agencies) with the mandate to locate, monitor, measure, charge fees for, and/or otherwise regulate and limit private extraction of groundwater. But such a legal mandate is not sufficient. Outreach to and cooperation from stakeholders is also needed—a very high hurdle for a new agency.

Regardless of the solution—multiple agencies operating independently but cooperatively, multiple agencies cooperating in concert as a virtual basin-wide agency, or a single basin-wide agency replacing multiple agencies—a system for operating a single basin-wide management capability is necessary. Nowadays, complex combinations of computerized database systems have become the functional heart of most businesses including water agencies. Such systems—typically commercially sourced—are often highly proprietary and difficult to interoperate with competitive commercial solutions. Replacing multiple such complex computerized systems with an equally capable replacement computerized system may be nightmarishly difficult—witness the bring-up of the Federal "Obamacare" Health Care Insurance Exchange.

It is therefore apparent that an urgent need exists for a sustainable water agency management platform (WAMP). This improved WAMP must enable primary stakeholders—property manager(s) (e.g., farmers) and water agency sustainability manager(s)—to cooperatively, efficiently and cost-effectively manage the consumption of groundwater resources in a sustainable manner over a long term. Additionally, a WAMP must make it practical for multiple agencies combined or working cooperatively within a groundwater basin to operate utilizing a single common WAMP that provides a practical upgrade path from legacy operations systems. Such a WAMP must replace or integrate the capabilities of legacy operations systems, but also provide essential new capabilities such as regulating unmetered groundwater extraction.

SUMMARY

To achieve the foregoing and in accordance with the present invention, systems and methods for sustainable management of renewable water resources is provided. In particular, these systems and methods responsibly manage groundwater resources in a sustainable manner so as to ensure the long term health of aquifers.

In one embodiment, a water agency management platform (WAMP) provides an electronic exchange market for administering groundwater extraction rights and managing groundwater and surface-water resources in one or more trading-zones. The WAMP receive a plurality of offers to trade utilization of a groundwater extraction right (GWR), matches at least two of the plurality of offers, and intermediates the transfer of the GWR based on at least one transfer rule.

In some embodiments, transfer rules limits GWR transfers from a specific groundwater extraction zone to a specific destination water consumption zone, limits GWR transfers from a specific source zone regardless of the destination zone, and limits GWR transfers to a specific destination zone regardless of the source zone.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which:

FIGS. 7A and 7B are upper and lower portions (respectively) of an exemplary screen image illustrating the sustainability manager experience of a WAMP Water Use by Crops display page for the embodiment of FIG. 1;

FIGS. 8A and 8B are upper and lower portions (respectively) of an exemplary screen image illustrating the sustainability manager experience of a WAMP Water Use by APNs (Assessor Parcel Numbers) display page for the embodiment of FIG. 1;

FIG. 12 is an exemplary screen image illustrating the sustainability manager experience of a WAMP Water Use by Turnouts display page for the embodiment of FIG. 1;

FIG. 14 is an exemplary screen image illustrating the sustainability manager experience of a WAMP Advanced Reports display page for the embodiment of FIG. 1;

FIGS. 17A and 17B are upper and lower portions (respectively) of an exemplary screen image illustrating the sustainability manager experience of a WAMP Member Contact display page for the embodiment of FIG. 1;

FIGS. 20A and 20B are two views of an exemplary screen image illustrating the sustainability manager experience of a WAMP Lease Order display page for the embodiment of FIG. 1;

FIG. 21 is an exemplary screen image illustrating the sustainability manager experience of a WAMP Transfer Zone Management display page for the embodiment of FIG. 1;

FIGS. 22A and 22B are upper and lower portions (respectively) of an exemplary screen image illustrating the sustainability manager experience of a WAMP Registry Overview display page for the embodiment of FIG. 1;

FIGS. 23A and 23B are upper and lower portions (respectively) of an exemplary screen image illustrating the sustainability manager experience of a WAMP groundwater rights (GWR) List display for the embodiment of FIG. 1;

FIGS. 26A, 26B and 26C are portions of an exemplary screen image illustrating the sustainability manager experience of a WAMP GWR display page for the embodiment of FIG. 1;

FIGS. 29A and 29B are upper and lower portions (respectively) of an exemplary screen image illustrating the sustainability manager experience of a WAMP Registry Action display page for the embodiment of FIG. 1;

FIG. 30 is an exemplary screen image illustrating the sustainability manager experience of a WAMP Registry Documents Repository display page for the embodiment of FIG. 1;

FIGS. 31A and 31B are upper and lower portions (respectively) of an exemplary screen image illustrating the sustainability manager experience of a WAMP Dashboard display page for the embodiment of FIG. 1;

FIGS. 32A and 32B are upper and lower portions (respectively) of an exemplary screen image illustrating the sustainability manager experience of a WAMP Invoices display page for the embodiment of FIG. 1;

DETAILED DESCRIPTION

Figure 1:
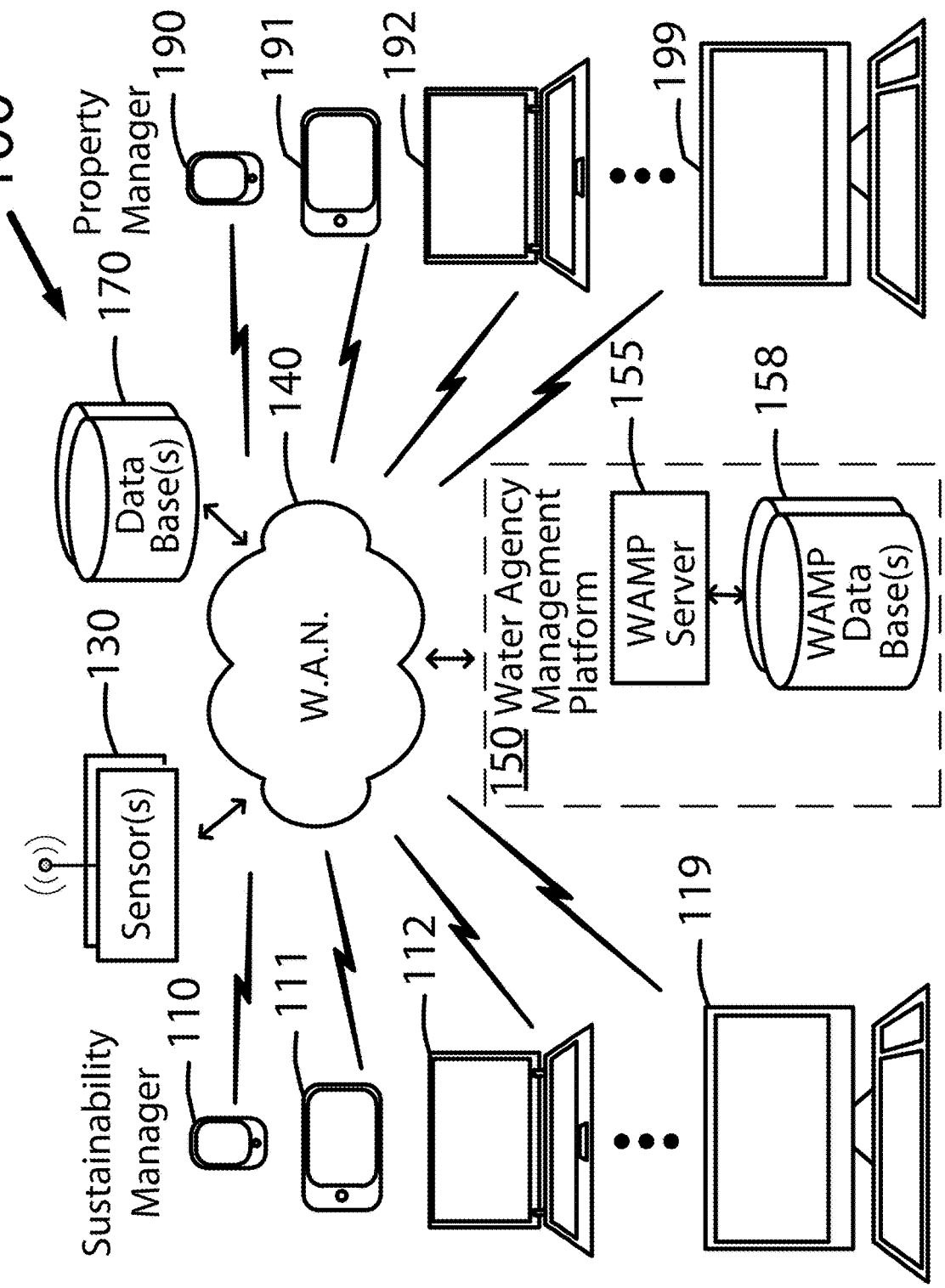
FIG. 1 illustrates an exemplary operating environment for one embodiment of a Water Agency Management Platform (WAMP), in accordance with the present invention.

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "always," "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

Embodiments of the present invention are intended to operate with all manner of consumer electronic network terminal devices including smart phones, computers, tablet computer systems, e-reader devices, and virtually any electronic device which includes WAN access and a user interface. These embodiments are also capable of operating with a wide range of interface types, including any combination of a visual display, tactile and audio output and a visual, tactile or acoustic user interface.

To facilitate discussion, FIGS. 1 through 34 illustrate the operation of a Water Agency Management Platform (WAMP) 150 in accordance with one embodiment of the present invention.

In some embodiments a WAMP 150 may facilitate the operation of a water agency and may facilitate such a water agency's regulatory compliance and implementation of a water resource regulatory body pursuant to corresponding regulation, compacts and law, such as a Sustainable Groundwater Management Act. The State of California for instance has legislated such a Sustainable Groundwater Management Act.

The Groundwater Foundation defines 'groundwater' (alternatively spelled 'ground water') as "the water found underground in the cracks and spaces in soil, sand and rock. It is stored in and moves slowly through geologic formations of soil, sand and rocks called aquifers." The United States Geological Survey (USGS) website says "Groundwater is a valuable resource both in the United States and throughout the world. Where surface water, such as lakes and rivers, are scarce or inaccessible, groundwater supplies many of the hydrologic needs of people everywhere. In the United States, it is the source of drinking water for about half the total population and nearly all of the rural population, and it provides over 50 billion gallons per day for agricultural needs." It continues by defining and describing 'ground water depletion': "Groundwater depletion, a term often defined as long-term water-level declines caused by sustained groundwater pumping, is a key issue associated with groundwater use. Many areas of the United States are experiencing groundwater depletion."

The Mojave Water Agency located in San Bernardino County California states on its website: "A groundwater basin is defined as an area underlain by permeable materials capable of furnishing a significant supply of groundwater to wells or storing a significant amount of water. A groundwater basin is three-dimensional and includes both the surface extent and all of the subsurface fresh water yielding material. For more information on groundwater basins and sub-basins, please visit the California Department of Water Resources Bulletin 118 website." Furthermore, the California State Department of Water Resources Bulletin 118— California's Groundwater (Update 2003) Chapter 6 states: "A groundwater basin is defined as an alluvial aquifer or a stacked series of alluvial aquifers with reasonably well-defined boundaries in a lateral direction and a definable bottom. Lateral boundaries are features that significantly impede groundwater flow such as rock or sediments with very low permeability or a geologic structure such as a fault. Bottom boundaries would include rock or sediments of very low permeability if no aquifers occur below those sediments within the basin. In some cases, such as in the San Joaquin and Sacramento Valleys, the base of fresh water is considered the bottom of the groundwater basin."

In contrast to groundwater, surface water is defined by the web-site version of Duhaime's Legal Dictionary as: "Waters falling on the land by precipitation or rising from springs." For the purposes of the discussion that follows, surface water may be further understood to be: precipitated water or spring water that is directly open to the atmosphere or is conveyed from such a water source that is directly open to the atmosphere (e.g., water from a reservoir conveyed in an aqueduct pipe).

In the USGS Circular 1186 dated 1999 and titled "Sustainability of Groundwater Resources", 'groundwater sustainability' is defined as "development and use of ground water in a manner that can be maintained for an indefinite time without causing unacceptable environmental, economic, or social consequences." Such unacceptable consequences clearly include groundwater depletion and aquifer collapse.

The California Sustainable Groundwater Management Act, according to University of California Davis: "consists of three legislative bills, Senate Bill SB 1168 (Pavley), Assembly Bill AB 1739 (Dickinson), and Senate Bill SB 1319 (Pavley). The legislation provides a framework for long-term sustainable groundwater management across California. Under the roadmap laid out by the legislation, local and regional authorities in medium and high priority groundwater basins will form Groundwater Sustainability Agencies (GSAs) that oversee the preparation and implementation of a local Groundwater Sustainability Plan (GSP). Local stakeholders have until 2017 to organize themselves in Groundwater Sustainability Agencies. Groundwater Sustainability Plans will have to be in place and implementation begun sometime between 2020 and 2022. GSAs will have until 2040 to achieve groundwater sustainability." Furthermore the State of California groundwater website states: "In September 2015, Governor Brown signed SB13, by Senator Fran Pavley. The Bill makes various technical, clarifying changes to SGMA including requirements for groundwater sustainability agency formation, the process for State Water Board intervention if no responsible agency is specified for a basin, guidelines for high- and medium-priority basins, and participation of mutual water companies in a groundwater sustainability agency."

Further describing the role of GSAs under California's SGMA, the Association of California Water Agencies website states: "The act requires the formation of local groundwater sustainability agencies (GSAs) that must assess conditions in their local water basins and adopt locally-based management plans." The University of California Berkeley website says: "A successful path to groundwater sustainability will require governance that is both fair and effective. GSAs will need to carefully consider the criteria shown here in their institutional design, each of which is necessary to achieve both fairness and efficacy in groundwater management." Additionally it proposes nine criteria to evaluate newly forming GSAs: "scale, human capacity, funding, authority, independence, participation, representation, accountability, and transparency."

For the purposes of the discussion that follows, the term 'groundwater management agency' (GMA) may connote: an agency that may include but not necessarily be limited to the functions and responsibilities of a groundwater sustainability agency as defined by a given Sustainable Groundwater Management Act or equivalent legal mandate.

For the purposes of the definition of GMA above and of the discussion that follows, the term SGMA' may connote: a Sustainable Groundwater Management Act or other legislation, regulation, legal finding, compact or other legal basis that may mandate or otherwise legally authorize and provide jurisdiction to a GSA or GSAs relative to groundwater sustainability.

The CA.gov website defines a number of terms used in California's SGMA including 'sustainable yield', which is defined as: "The maximum quantity of water, calculated over a base period representative of long-term conditions in the basin and including any temporary surplus, that can be withdrawn annually from a groundwater supply without causing an undesirable result." Where 'undesirable result' is defined: "One or more of the following effects caused by groundwater conditions occurring throughout the basin:

1. Chronic lowering of groundwater levels indicating a significant and unreasonable depletion of supply if continued over the planning and implementation horizon. Overdraft during a period of drought is not sufficient to establish a chronic lowering of groundwater levels if extractions and recharge are managed as necessary to ensure that reductions in groundwater levels or storage during a period of drought are offset by increases in groundwater levels or storage during other periods.
2. Significant and unreasonable reduction of groundwater storage.
3. Significant and unreasonable seawater intrusion.
4. Significant and unreasonable degraded water quality, including the migration of contaminant plumes that impair water supplies.
5. Significant and unreasonable land subsidence that substantially interferes with surface land uses.
6. Depletions of interconnected surface water that have significant and unreasonable adverse impacts on beneficial uses of the surface water."

In contrast to a GMA, a surface water agency may be concerned with the management of surface water supplies including the accumulation, conservation, distribution of such surface water. So, per the Louisiana Department of Water Resources website, a surface water management agency may: "coordinate the management, preservation, conservation and protection of the state's water resources and has given authority for the agency to enter into cooperative agreements with water users for the withdrawal of surface water from the state's water bodies". So as an example of a surface water management agency in California's southern central valley: "In 1909, the South San Joaquin Irrigation District was established to provide a reliable and economical source of irrigation water for agricultural use in, and surrounding rural areas of Escalon, Manteca and Ripon. SSJID's historic water rights allow for several hydroelectric power plants on a series of dams and reservoirs on the Stanislaus River. SSJID and Oakdale Irrigation District completed the original Melones Reservoir in 1926, and have co-owned the Tri-Dam Project, consisting of Donnells, Beardsley and Tulloch reservoirs and powerhouses since 1957." And as a further example of a surface water management agency, in northern California, the San Francisco Public Utilities Commission: "We manage a complex water supply system stretching from the Sierra to the City and featuring a complex series of reservoirs, tunnels, pipelines, and treatment systems. We are the third largest municipal utility in California, serving 2.6 million residential, commercial, and industrial customers in the Bay Area. Approximately one-third of our delivered water goes to retail customers in San Francisco, while wholesale deliveries to 26 suburban agencies in Alameda, Santa Clara, and San Mateo counties comprise the other two-thirds." Additionally, in contrast to groundwater, surface water is commonly delivered to surface water customers—particularly irrigators—through a known connection to the distribution system commonly termed a 'turnout'.

As a practical matter, in order to sustainably manage a groundwater basin, nearly all groundwater extraction (as well as injection) needs to be regulated. Unfortunately, most existing water agencies are surface water agencies rather than GMAs. Additionally, the jurisdictions of most water agencies correspond to surface boundaries rather than the underlying groundwater basin boundaries. In fact many water agencies have boundaries that are politically rather than physically determined—e.g., confined within a politically defined area such as a state, county or city. Therefore, in many instances a given groundwater basin is overlain by a quiltwork of two or more existing water agencies.

One solution to overcome such fragmented management of a groundwater basin is to consolidate all the water agencies overlying that basin into a single GMA that supersedes such consolidated water agencies. For example, the Pajaro Valley Water Management Agency, a water agency in coastal central California is described: "The purpose of the Agency has remained essentially unchanged since its creation in 1984. In 1980, the State Department of Water Resources issued Bulletin 118-80, which identified 447 separate groundwater basins, sub-basins and areas of potential groundwater storage throughout the State. More importantly, the Bulletin identified the Pajaro Valley basin as one of just eleven basins with critical conditions of overdraft. Community leaders in the area recognized that local management of the basin was needed to halt seawater intrusion, which was impacting the groundwater supply for large areas of coastal farmland as well as domestic water supply wells. They also recognized that no single agency had the jurisdictional authority to manage the entire groundwater basin which overlaps four major jurisdictions: the City of Watsonville, and Santa Cruz, Monterey and San Benito counties. The Agency's boundaries were drawn as closely as possible to match the same basin boundaries described in Bulletin 118-80. See Agency Boundary Map. An ad hoc group of local stakeholders formed and began meeting weekly over a period of several months to develop the new agency's goals and draft the state legislation necessary to form a new water management entity. State Senator Henry Mello spearheaded the required legislation in Sacramento. A local ballot measure to establish the Agency was approved by the local voters in the November 1984 election, which officially established the PVWMA as a new state-chartered water management agency."

Such voluntary combining of water agencies into a single new consolidating and superseding water agency is an extremely difficult task due to the many competing interests of numerous stakeholders. Thirty years ago agencies such as the Pajaro Valley Water Management Agency were managed primarily with manual paper-based file systems augmented with some computerization. In the $21^{st}$ century, complex combinations of networked database systems have become essential to the operation of most organizations including water agencies. Replacing multiple such complex computerized systems with a equally capable replacement computerized system may be a hugely daunting task. Additionally, increasingly severe political polarization—often pitting urban areas against rural constituencies—has made the sort of political compromise needed to charter new consolidated water agencies such as Pajaro Valley Water Management Agency nearly impossible. Clearly, another solution other than consolidation is needed.

An alternative approach to consolidation into a single basin-wide GMA is for a plurality of water management agencies (with jurisdictions that when considered together encompass an entire groundwater basin) to operate cooperatively so as to virtually synthesize key elements of the operation of a single consolidated basin-wide agency, but with fewer technical and political hurdles. For the purposes of the discussion that follows, such a cooperative basin-wide virtual agency may be referred to as a 'virtual groundwater management agency' (VGMA).

As opposed to a consolidation into a single basin-wide water agency, a VGMA may facilitate but not supercede or preempt multiple water agencies cooperating within a shared groundwater basin. A VGMA may facilitate such GMAs to cooperatively manage that basin's water resources and further may facilitate each of the cooperating GMAs to meet their respective sustainability reporting obligations under the governing SGMA. Furthermore, such reporting obligations may rest exclusively upon the individual cooperating GMAs and not the VGMA. A VGMA may not replace or explicitly limit or assume the governance powers or obligations of each individual GMA.

For the purposes of this discussion, the term 'district' may refer to: a specific geographic territory over which a given GMA may have authority, and that may include one or more water consumers under the jurisdiction of that GMA. Such water consumers may include groundwater extractors who directly consume such extracted groundwater or provide it to others to consume. Further, for the purposes of this discussion the terms 'member' or 'members' may refer to: property owners (as well as legal assignees and interest holders) under the jurisdiction of a given GMA. One or more such members within a GMA's district may be property owners with historical, deeded, optioned, leased, purchased or otherwise granted, awarded, claimed or otherwise acquired groundwater rights (GWRs). Being a member of a given GMA may be voluntary or mandated or a mix of both. A member may for example be a natural person or a legal entity such as a corporation, LLC, holding company or trust. A GMA may maintain information (e.g., owner(s), address, assessor's parcel number, size, etc.) pertaining to a given property within the GMA's district—i.e., a 'property account'. A GMA member may own (or otherwise control interests in) more than one properties in the GMA's district and therefore be associated with more than one property account.

In some embodiments, a VGMA may be thought of as a type of a GMA composed of participating constituent water agencies. For the purposes of the discussion that follows, when the term 'GMA' is used, it may be assumed unless stated otherwise that the discussion applies equivalently to a VGMA. Furthermore, the term 'GMA' may be assumed to apply equivalently to a surface water management agency (unless stated otherwise) should such a surface water management agency manage or utilize groundwater resources or anticipate doing so.

Additionally, for the purposes of the discussion that follows, the combined districts of the constituent water agencies of a given VGMA comprise the 'district' of that VGMA although such VGMA district may be virtual. Furthermore, the members of such constituent water agencies of a given VGMA may be termed 'VGMA members' (or similar) although such membership in the VGMA may be virtual. And unless stated otherwise, all discussions applying to a GMA's district and/or member(s) of GMA may apply equivalently to the district and/or member(s) of a VGMA. Furthermore, unless stated otherwise, all discussions applying to users of GMA's WAMP 150 may apply equivalently to users of a VGMA's WAMP 150.

For the purposes of the discussion that follows, the terms 'sustainability manager' or sustainability managers' may refer to: employee(s), contractor(s) and other worker(s) for a given GMA who may utilize the WAMP 150 to manage the resources of the GMA. Furthermore, for the purposes of the discussion that follows, the terms 'property manager' and 'property managers' may refer to: GMA member user(s) of the WAMP 150. For example, a property manager may be a property owner within the GMA district or may be an individual or commercial entity that works for such a property owner. In some instances, such an individual or commercial entity may be a property manager for more than one property within the GMA district.

A WAMP 150 may facilitate the operation of a GMA and facilitate the GMA's regulatory compliance and implementation of governmental and industry standards—such as the Californian, Sustainable Groundwater Management Act (SGMA). A given GMA's sustainability manager(s) may utilize a WAMP 150 to innovatively and reliably service properties and property managers within their district(s) including providing reasonable controls necessary for the GMA to manage their groundwater sustaining service and the system that provides that service. In addition to facilitating GMA sustainability managers to ensure the sustainable management of groundwater, a WAMP 150 may be utilized by property managers to manage their groundwater production and consumption and to monitor the overall state of the groundwater basin they draw from.

In some embodiments, a WAMP 150 may facilitate multiple GMAs with authority or commercial interests within a given basin to cooperatively and cost-effectively manage—to their mutual benefit—the groundwater sustainability of that basin and operate as a seemingly single integrated commercial entity while maintaining and protecting their separate commercial interests and carrying out their respective responsibilities. A WAMP 150 may for example facilitate a VGMA to configure and utilize common forms, letterhead, water utilization fee and regulatory policies, and regulatory agency(s) interface. Additionally, a WAMP 150 may facilitate generating reports that taken together may provide a comprehensive overview of the water usage and transfers within the VGMA's basin.

A VGMA may be facilitated by a WAMP 150 in some embodiments so as to assist two or more GMAs (or other water management agencies) within a basin district cooperatively manage their respective jurisdictions, protect the privacy of individual members within an individual GMA's specific district while enabling de-identified aggregated data to be reported to and utilized by the VGMA to assist the cooperating GMAs to administer the basin on a coordinated basis. In turn, such data aggregation by a WAMP 150 may support the VGMA to create and provide reports to, for example, a supervisory government authority in fulfillment of the requirements of a SGMA. Additionally, such reporting utilizing aggregated basin-wide data may in turn help the constituent GMAs make decisions about the management of groundwater resources within their basin segments and assist each GMA with auditing and regulatory reporting requirements.

A WAMP 150 may facilitate the constituent GMAs of a VGMA to maintain their relationships with their members while complying and contributing to the implementation of their region's groundwater sustainable management regulations by cooperating as a VGMA. In some embodiments, for a groundwater basin within a given VGMA's district and jurisdiction, a WAMP 150 may:

provide exclusive and relatively coherent regulatory mandated administration of the basin's groundwater resources, organize and service members of the participating agencies as members of the VGMA, provide a single uniform source of basin-wide accounting and reporting.

In order for a VGMA to function effectively (e.g., not injure the interests of the participating agencies) and yet sustainably manage shared groundwater resources, a VGMA-facilitating WAMP 150 in some embodiments may segment and group the authorities, functionalities and responsibilities (i.e., "powers") of each of the thusly participating agencies so as to group subset(s) of such powers that may be essential to groundwater sustainability while keeping segregated subset(s) of other powers that may be non-essential to groundwater sustainability (but may be of critical proprietary interest to each of the individual participating agencies within the VGMA). In some embodiments of a WAMP 150, such aggregated subset(s) and segregated subset(s) may be configurable such that the composition of such subsets may vary from VGMA to VGMA depending, for example, on the degree of cooperation or competition between the participating agencies within a given VGMA.

In many areas, GMAs (let alone VGMAs) don't yet exist and surface water management agencies seem a natural fit to be adapted to the role of GMA or VGMA constituent because they have existing:

Trained staff,

Political and community connections,

Long term relationships with property owners and managers,

Property account data including water use history,

Distribution systems to move water between sellers and buyers—including between basins, Revenue flows and access to capital, Relationships with neighboring agencies, Extensive surface water utilization data (very useful in instances where a property uses both surface water and groundwater), and Deep institutional and historical knowledge of drainage and basin conditions.

Also, in some instances existing surface water agencies may already be extracting groundwater and combining it with surface water supplies. Or a surface water agency may have customers that are pumping groundwater from private wells and using it in conjunction with water supplied from the surface water management agency. Clearly, a surface water management agency is a natural stakeholder in any groundwater basin that is drawn on by that agency or by its customers.

In some instances, a GMA may be a standalone entity whose governance structure consists of representatives from water agencies, local government and water users. The day to day activities of the GMA may be sub-contracted to existing water agencies or other third parties.

Unfortunately GMAs (as well as water management agencies in general) may have financial and commercial disincentives to share data or relationships—particularly when they overlap in watersheds and or groundwater basins. However, a WAMP 150 may facilitate creation of a VGMA combining, but appropriately firewalling data from multiple water management agencies cooperating as a seemingly single VGMA.

In some embodiments, a WAMP 150 may include facilities specific to the management of surface water resources. This for instance may allow a surface water agency to transform to a GMA (either immediately, or in a phased process, or sometime in the future) and manage both surface water and groundwater in an integrated fashion. Although a WAMP 150 may be utilized by a GMA to facilitate its operations, in some embodiments, a WAMP 150 may be configured to be utilized by a surface water management agency to facilitate its operations with or without configuring facilities for groundwater management. Such an adopting surface water management agency may thusly benefit from the state-of-the-art integrated water management facilities of a WAMP 150 and additionally benefit from a built-in WAMP 150 configurable path to groundwater management—perhaps as a GMA and/or as a constituent water management agency in a VGMA.

The two principal stakeholders of a given GMA—the GMA itself and the members—may be the primary users of a WAMP 150 utilized by the GMA. In addition to a given GMA's principal stakeholders, i.e., the GMA itself and the members of that GMA, a given GMA may have various additional direct or indirect stakeholders within the district. Such in-district GMA stakeholders may include, but not be limited to:

Surface water rights holders,
Surface water management agencies,
Non-agricultural water consumers and their water agencies,
Groundwater recharge area property owners,
Local politicians and/or government officials, and
Sovereign entities such as Native American reservations.

In addition to sustainability managers and property managers, other GMA stakeholders (some out of district) may be users of a GMA's WAMP 150. For example, water brokers might utilize services of the WAMP 150 on behalf of water consumers and possibly investors.

FIG. 1 provides a structural block diagram for an example of a Water Agency Management Platform (WAMP) 150 operating environment in accordance with an embodiment of the present invention. In some embodiments a WAMP 150 may be a multi-layered secure cloud based software solution that may facilitate the operation of a groundwater management agency (GMA), and may furthermore facilitate regulatory compliance and implementation of a water resource regulatory body pursuant to corresponding regulation, compacts and law, such as a Sustainable Groundwater Management Act (SGMA). Such a WAMP 150 may be accessed from any location—critical for example in the irrigation industry where the system needs to be accessed by a property manager at work out in the field—perhaps out in a feed lot or an almond orchard.

A WAMP 150 may be accessed using a mobile communication device or any other electronic network terminal device with a user interface. For brevity, an electronic network terminal device may be referred to as a 'terminal', which can either be a dedicated purpose-built device or a suitable general purpose device. FIG. 1 represents a variety of such potential terminals—110 to 119 for sustainability managers, and 190 to 199 for property managers.

Sustainability manager terminal choices, 110 through 119, represent the multiplicity of devices that may support access to WAMP 150. Often such terminals are mobile communication devices—i.e., devices that can be carried easily from place to place by the sustainability manager—typically with Wi-Fi or cellular data or other wireless connectivity and in numerous instances with built-in mobile telephone capability. However, less portable or fixed installation terminals may also support access to the WAMP 150.

Property manager terminal choices, 190 through 199, mirror the choices available to a sustainability manager. They differ specifically in the role of the WAMP 150 user, i.e., property manager rather than sustainability manager, and the specific device chosen by each individual user.

In some embodiments, a user's access to a WAMP 150 may not be bound to a specific terminal device. So for example, during the day, a sustainability manager may utilize a laptop 112 at their desk, while a property manager may utilize a smart phone 190 out in a farm field. Further by example, in the evening, a sustainability manager may utilize a home PC 119, while a property manager gets caught up on work from home utilizing a tablet computer 191.

When describing use of the WAMP 150 that is equivalent whether by a sustainability manager or a property manager, the term 'User' may be used in the discussion that follows to mean either of these two types of users.

At the level of network connectivity, a sustainability manager's terminal and a property manager's terminal may operate in equivalent ways, therefore for simplicity: the terms 'User's device' or 'User's terminal' may be used in the discussion that follows when operation of a WAMP 150 feature applies in the same or similar fashion to either a sustainability manager's terminal or a property manager's terminal.

Inter-communication between a User's terminal device and the WAMP 150 may use a wide area network (WAN) 140 such as the Internet. Communication between a User and the WAMP 150 may involve traversing more than one WAN (not shown). In some embodiments, WAMP-facilitated communication between a sustainability manager and a property manager may also involve a WAN or WANs such as the PSTN and/or the Internet. Depending on the embodiment, the WAMP 150 may use one or several models of connectivity including, but not limited to: client/server and peer-to-peer. In some embodiments, a WAMP 150 may utilize a client-server system model where the client may execute on the User's device—perhaps as a web app or a native app. Client/server connectivity may use a WAN 140 such as the Internet for access between the User's terminal device and a WAMP Server 155. Peer-to-peer connectivity, such as a WAMP-facilitated telephone call or a text message interaction between a sustainability manager and a property manager, may typically also use a WAN 140 such as the PSTN or the Internet.

In some embodiments, services of a WAMP 150 may be utilized via telephony—for example, using keypad menuing and/or automated natural language recognition as is easily apparent to one skilled in the art. In some embodiments, a live or automated operator (e.g., a chat bot) may provide WAMP service assistance or proxying. Furthermore, in some instances, a User's terminal device that is dedicated to providing data access, e.g., a desktop computer, 119/199, may be augmented for telephone communication by a separate telephony device (not shown) and/or third party telephony software (not shown) running on the terminal device. Such separate telephony devices may include, but not be limited to: a mobile cellular phone or a landline telephone, or a headset paired with third party telephony software running on the terminal device, e.g., Skype.

In some embodiments, communication between a sustainability manager and a property manager may be intermediated by a WAMP 150. In such intermediation—sometimes referred to as 'proxying'—a WAMP 150 may source, receive, reroute, multicast, broadcast or otherwise initiate or respond to and/or terminate communication: from a sustainability manager (or on a sustainability manager's behalf) intended for a property manager, and/or; from a property manager (or on a property manager's behalf) intended for a sustainability manager. In addition, a WAMP 150, may translate, clarify, expand, simplify, repeat, and/or generally modify or enhance the content communicated between Users in such a way as to improve or enhance comprehension or to increase the likelihood of successful completion of the communication. Such intermediation services may have varying mixes of automation and/or direct human participation depending on the embodiment.

Additionally, a WAMP 150 may translate, clarify, expand, simplify and otherwise modify or enhance what is communicated. At a signal content level, a WAMP 150 may amplify, filter, encode, decode, transcode, compress, expand, error correct and generally process the signal corresponding to the communication in ways well understood to one well versed in the art.

In some embodiments, data communication may be intermediated by a WAMP 150 in such a way that logical network addresses—e.g., web site URLs and email addresses—nominally routed directly to a User are actually routed to and/or sourced from and/or redirected by a WAMP 150. For example, the WAMP 150 may provide additional services to a GMA or on a GMA's behalf including, but not limited to: Web site, email, blog, on-line forum/social network posts, electronic newsletters, and push notifications to GMA members.

In some embodiments, text messaging communication may be intermediated by the WAMP 150 in such a way that logical texting addresses—e.g., Universal Resource Identifiers—nominally routed directly to a User are actually routed to and/or sourced by and/or redirected by and/or translated by the WAMP 150. For example, the WAMP 150 may provide additional services to a sustainability manager or on a sustainability manager's behalf including, but not limited to: text-email translation, text-voice translation, system-to-system gateway (e.g., between SMS and IM) and push text messaging notifications to members.

The services of the WAMP 150 may be provided by a WAMP Server 155, which may utilize one or more WAMP Database(s) 158 containing information regarding GMA members (and perhaps other users) who may utilize the WAMP 150. The primary users of a WAMP 150 may be sustainability managers and property managers. In some embodiments, WAMP data may be encrypted and/or physically secured in data centers complying with standards such as: FISMA, SSAE16 Type II and PCI DSS 2.0 standards.

Property-descriptive and member-descriptive data may be entered into the WAMP Database(s) 158 automatically by importing from one of more sources including: a legacy operations system, or manually by GMA staff, or in some instances voluntarily by property managers themselves. In some embodiments, this data may be augmented with data from third parties, which may be copied or simply utilized on a one-time basis. Such descriptive data for a given property, member or property manager may be referred to as a 'profile' or for multiple members/properties or in aggregate—'profiles'. Profiles may be stored in WAMP Database(s) 158 and may be organized, portioned, sorted, encrypted, firewalled, access-restricted, backed-up, transaction logged and otherwise managed, maintained and protected using techniques familiar to one skilled in the art.

The WAMP Database(s) 158 used by the WAMP 150 may be centralized or distributed. Generally, the WAMP Database(s) 158 utilized by a WAMP 150 may be remote from the User's terminal; however in some embodiments, portions of database(s) utilized by a WAMP 150 may reside on the User's electronic terminal device (not shown). For example, web browser cookies may be stored on a User's device. In some embodiments, the WAMP 150 may be coupled to one or more External Database(s) 170 via WAN 140.

In some embodiments, External Database(s) 170 may be queried by WAMP 150 to extract useful information. Such External Database(s) 170 may belong to various different government and private entities and may be distributed globally, and may for example include news sources such as Weather Channel, CNN, CBS & PBS and/or Federal and State governmental agencies such as FEMA. A given External Database 170 may contain publically available government data, such as NOAA climate data and GOES satellite images, or may contain MDA Information Systems EarthSAT images or other data available on a commercial basis. In some instances, a WAMP 150 may import data from a given External Database 170 such as a county government tax assessor's property roll. In some instances, a WAMP 150 may export data to a given External Database 170—for example providing a given GMA's basin-specific water sustainability reporting to an SGMA mandated regulatory authority.

A number of third party organizations, such as USGS, NOAA, Army Corp of Engineers, US Bureau of Reclamation as well as regional water authorities and universities maintain large databases containing water resource data, satellite terrestrial surface and subsurface images and/or climate and weather data—observed and/or modeled. The WAMP 150 may import and utilize data from such third party External Database(s) 170. Hence, a given GMA may have access to a very rich dataset distributed across a virtual aggregate database or virtual composite database comprised of WAMP Database(s) 158 plus data accessed and/or acquired from third party's External Database(s) 170. For simplicity in the following discussion, when referring to representative WAMP Database(s) 158, such a larger virtual aggregate or composite database including External Database(s) 170 may be taken to be referenced as well—as is apparent to one skilled in the art.

In some embodiments, Sensor(s) 130 may provide data to a WAMP 150. Sensor(s) 130 data such as well bore water level measurements or well water meter readings that may for example be utilized to quantify groundwater extraction. In some embodiments, Sensor(s) 130 may include meteorological instruments and weather equipment, such as barometers, humidity detectors, precipitation gauges, anemometers, thermometers and solar cells. Sensor(s) 130 may also include test wells located within aquifer(s) to monitor aquifer characteristics including current level and rate of water table change. In some instances, Sensor(s) 130 may be of many functional types distributed on a wide geographic basis within a GMA's jurisdiction. Wireless communication may provide a typical means for communications with Sensor(s) 130, but other means such as wired connectivity may be utilized as well. Most Sensor(s) 130 may be relatively small, simple and inexpensive devices owned by the GMA, or by vendors to the GMA, or perhaps by GMA members. In some instances, Sensor(s) 130 may be large, complex and expensive, e.g., an earth imaging satellite with ground-penetrating radar owned perhaps by the US government. Many Sensor(s) 130 may be statically located on a specific property. However, other Sensor(s) 130 may be moved about—perhaps my motor vehicle, or airplane, helicopter, balloon or aerial drone. Autonomous terrestrial and aerial drones may increasingly provide dynamic Sensor(s) coverage as technology evolves. Additionally, nano-technology may be expected to provide for a very low-cost means to blanket a GMA's jurisdiction with thousands, millions or perhaps billions of Sensors 130. In anticipation of nano-technology, Sensor(s) 130 may use marker chemicals or dyes to map out basin boundaries and measure aquifer flows.

In general, industry best practices may be applied so as to comply with any legal mandates, regulatory requirements, or industry consensus on the protection of private, sensitive and proprietary information or otherwise privileged information. Encryption may be applied to protect information in WAMP Database(s) 158 and also protect information communicated between Users and a WAMP 150, between other WAMP 150 users (such as third parties) and a WAMP 150, and between Sensor(s) 130 and a WAMP 150. In many embodiments, encryption may occur as appropriate using technologies familiar to one skilled in the art, such as Secure Sockets Layer (SSL), Transport Layer Security (TLS) and Virtual Private Network (VPN).

In some embodiments, a WAMP 150 may facilitate a GMA's operations with secure, auditable process(es) for managing and maintaining records of "Groundwater Extraction Rights" such as those rights created, mandated and/or recognized as a result of California's SGMA. Such systematic, verifiable and traceable process(es) may provide a GMA with a strong level of substantiation and therefore protection from potential conflict with GMA members—such as lawsuits due to asserted accounting errors on a given property's water extraction balance or ownership or other property or water rights interests. Furthermore, in some embodiments, a WAMP 150 may facilitate configuring, populating and maintaining a 'water extraction rights registry' (WER registry), which may be stored in a WAMP Database(s) 158. Such a WAMP 150 WER registry (not shown) may potentially be utilized as a single source of truth of groundwater extraction rights within a GMA's jurisdiction—thereby assisting in both comprehensive management and conflict resolution.

A WAMP 150 WER registry may for example combine extensive data for the properties within a given basin with mapping, Global Imaging Satellite (GIS) information and perhaps other measurements to provide a comprehensive overview of groundwater use within that basin including land ownership and acreage, crop-cycle information, water use requirements, actual and/or estimated water use and changes to water extraction rights (i.e., leased or purchased). Some such data collection and/or aggregation may be automated such that corresponding data in a WER registry may be updated on an on-going basis so as to keep it current—perhaps updating in real time. Such extensive water resource data may include but not be limited to location of extraction, volume of water use, and historical water use as well as: property location, boundary, and ownership information perhaps acquired from appropriate sources such as a county recorder's database. WER registry data (perhaps along with other measured, reported and imported data) may be aggregated, de-identified and analyzed by a WAMP 150 to provide an up-to-date basin-wide (or sub-basin-wide) comprehensive view of water use and groundwater extraction, including data from water meters and from participation in fallowing programs.

Litigation, financial audit or other time period specific inquiry may require a copy of a GMA's WAMP 150 WER registry as it existed at some prior date and time. In some embodiments a WAMP 150 may log changes to a GMA's WER registry or otherwise record incremental changes to such a registry such that a date/time instant-specific instance of that registry may be displayed or otherwise produced.

A WAMP 150 may be highly scalable: allowing multiple sustainability managers to simultaneously input, store, access, edit, update, and otherwise process and share (as appropriate) data for a multiplicity of GMA members. Furthermore, an WAMP 150 may provide service-configurating facilities to activate/de-activate one/some/all member services provided by WAMP 150, e.g., newsletter, reporting, WER registry, trading access and other WAMP services—perhaps district-wide or on a member or property account specific basis.

Utilizing contact information entered in WAMP 150 property accounts, a WAMP 150 may be utilized by a GMA as a powerful communications facility to interact with property managers. For example, SMS, email and or voice communications may be sent automatically or "at the click of a button", removing the requirement for integrating multiple third party systems and reducing overall costs. In some embodiments, a WAMP 150 may include facilities enabling:
  every sustainability manager to provide the highest possible standards of property manager engagement,
  per-property scheduling of billing, invoicing and notices,
  scheduling of automated contact reminders for property managers—such as emailed newsletters, event notifications and scheduled phone call cycles,
  logging and maintaining full per-property-account contact history—including recorded (and therefore reproducible evidence of) phone, voicemail, email and scanned.

In some embodiments, WAMP 150 may facilitate a GMA to record and subsequently access contact details as well as written, electronic and voice communications with property managers and/or third parties. By providing a historical record of all such communications, a WAMP 150 may save time and money while facilitating a comprehensive professional support and outreach service from a GMA to their served members and stakeholders as well as third parties such as a governmental regulatory department.

In some embodiments, A WAMP 150 may facilitate a sustainability manager to configure a set of one or more secure WAMP 150 facilities that a property manager (or an appropriately authorized third party) may utilize. In some embodiments, such a set of WAMP 150 facilities may be instantiated as a system default of a WAMP 150. Such a set of WAMP 150 facilities may for example facilitate a property manager to access, edit and update their profile and/or other information managed within a property account by a WAMP 150—for instance updating contact or billing information. For a given property account, a member may be a groundwater provider, a groundwater consumer, or both. Furthermore, a property manager may perhaps manage more than one separately owned property—each with separate property accounts. Consequently, a given property manager may be associated by a WAMP 150 with one or more property accounts where the given property manager may perhaps have differing management roles for each.

A WAMP 150 may have major advantages over third party Customer Relationship Management (CRM) systems in that a WAMP 150 may seamlessly integrate with the WER registry and therefore support complex property account changes such as transferring water rights interests. Nonetheless, in some embodiments, a WAMP 150 may configured to interoperate with a given third party CRM system utilized by a GMA. Such an incumbent CRM system may be strongly integrated into the business operations of such a GMA—with multiple staff trained on and loyal to the incumbent third party and perhaps resistant to change. A WAMP 150 may for example import and perhaps augment member-specific information managed by such a incumbent CRM system perhaps on a repeated basis to remain current with changes to a GMA's membership. In other embodiments, a WAMP 150 may overlay a user interface onto a third party CRM. By utilizing such an incumbent CRM analogous to an external data base for the WAMP 150, a WAMP 150 may import and export property account records between the WAMP 150 and the GMA's incumbent CRM. Furthermore, the data base record definitions of such an incumbent CRM may be augmented so as to support the operation of the WAMP 150 as a GMA migrates from away from a legacy CRM system.

In some embodiments, a WAMP 150 may facilitate a GMA to configure and produce custom-tailored reports. For example, a WAMP 150 may import surface water utilization data for a given property account in order to calculate and report how much of overall water utilization is supplied to that property by surface water as opposed to groundwater. A WAMP 150 may facilitate configuring reporting intervals for a given report and the method in which a given report is to be initiated (manually by a Sustainability Manager or automatically by a WAMP 150). A WAMP 150 may provide a range of sophisticated reporting facilities—allowing the generation of charts, diagrams, maps and various downloads to give sustainability managers instant access to and analysis of aggregated data pertaining water utilization in their groundwater basin.

In some embodiments, a WAMP 150 may facilitate producing unique district-specific or basin-specific groundwater analytics reports with access to and distribution of such reports controlled securely by the WAMP 150 as configured by the GMA. For example, a WAMP 150 may facilitate a given GMA to produce customized SGMA-compliant physical or electronic reports with WAMP system software updates supporting new SGMA-compliant report requirements as they become known. So for example in California, a WAMP 150 may facilitate the current and future needs of individual GMAs to provide reports to the state government authority to fulfill the requirements of the Sustainable Groundwater Management Act. Furthermore, all reporting requirements under California's Sustainable Groundwater Management Act may be automated through a WAMP 150. For example, a WAMP 150 may facilitate configuring reporting intervals as well as the method in which a given report is to be undertaken (physical or electronic). Such reports may be scheduled periodically for automatic production in addition to being produced on an as-needed basis. A WAMP 150 may be configured to distribute a given report internal to the GMA as well as potentially to a configured set of property accounts and/or third parties such as government agencies. Therefore, such reports including the groundwater analytics they may contain may assist GMA sustainability managers and/or their property managers counterparts with future business planning.

Reporting facilities in some embodiments of a WAMP 150 may be configured to meet the specific needs of a given GMA as dictated in part by its groundwater resources, commercial interests, its property account and property managers needs, and governmental edicts. Such a reporting facility thusly configured may provide precisely the required information as and when it is needed. Furthermore, reporting facilities may be configured to distribute for a limited time or to a proscribed list of distributees so as to support one-off circumstances such as experimental projects.

Reporting facilities provided by WAMP 150 may for example be configured to include, but not be limited to:
  Generation of automated emailed reports to GMA staff, property accounts and property managers or third parties on a regular (or demand) basis—ensuring everyone may stay informed and up-to-date,
  Automated distribution of reports to managers on financial management and expected expense outcomes. These may be individually configured such that variations from expected results are immediately picked up and reported to appropriate GMA staff or appropriate third parties, and
  Automated SMS and email of selected report notifications and/or reports, so for example a report may be successfully distributed even if the receiving property manager is in the field on a tractor.

In some embodiments, a WAMP 150 may facilitate a GMA to collect fees—i.e., calculate the amount of fees, distribute invoices, track payments and export fee data to external systems and applications such as a variety of accounting software packages. A GMA may configure a WAMP 150 to calculate and charge: a fixed fee, fee per acre foot, tiered fee, (or a mix of) based on an individual property or perhaps on a basin/sub-basin wide level.

In some embodiments, WAMP 150 billing analytic facilities may facilitate a GMA to obtain reports on overdue accounts, best/quickest payers and/or top payers. Furthermore, such billing analytics may compare current billing against prior bill runs and member payment performance to aid a GMA in revenue and water demand forecasting.

Additionally, a WAMP 150 in some embodiments may be custom configured by a GMA to accommodate the local circumstances of the irrigation industry so as to most effectively integrate into the GMA's business operations. Furthermore, a WAMP 150 may have major advantages over other more generic billing systems in that it may seamlessly integrate with the WAMP 150 WER registry. Therefore, once billing criteria may be configured by the GMA, a WAMP 150 may automatically apply all such criteria to every property account in the GMA's business domain as determined by factors such as: landholdings, water use, water rights or whatever other basis that may deemed appropriate by the GMA and/or regulators for determining fees billed.

In some embodiments, such fees may be configured for a subset of the complete set of property accounts served by the GMA thus allowing a given fee configuration to apply to an individual property account, an explicit list of property accounts, or a group of property accounts determined for example by a factor or factors such as sub-basin location, groundwater use efficiency, or perhaps alternative water sources. In some embodiments, a WAMP 150 may facilitate a financial incentive program, such as rebates or credits, that may incentivize groundwater sustainability or other desired behaviors by GMA members and/or by third parties.

It may be difficult for potentially competing water management agencies in a groundwater basin to cooperate to form a VGMA. To help overcome such difficulty, in some embodiments, a WAMP 150 may facilitate operating parallel secure billing facilities with a given such facility separately configurable and operable by one of the constituent water management agencies within the VGMA. In this way, the proprietary commercial information of each of the constituent water management agencies may be kept secure and private, but still allow for possible anonymization and aggregation of data to provide basin-wide analytics.

In some embodiments, a WAMP 150 may facilitate a GMA to configure and operate an 'electronic water rights exchange'—i.e., comprehensive water transfer/marketing, planning, management, analytics, monitoring and reporting facilities which may enable more efficient and sustainable management of groundwater resources within a given stressed groundwater basin. Such WAMP 150 facilities may for example enable and facilitate the transfer and/or settlement of water rights between willing buyers and sellers within such a groundwater basin. Access to such an efficient WAMP 150-facilitated electronic water rights exchange may benefit property accounts and property managers with without compromising the sustainability of the basin. Furthermore, such a configurable WAMP 150-facilitated electronic water rights exchange may facilitate a GMA to balance and/or benefit from water efficiency measures within the GMA's managed basin(s)/sub-basin(s). Therefore, a WAMP 150 may facilitate both sustainability managers and property managers in their respective WAMP-user roles to sustainably manage valuable finite groundwater supplies. Dynamic data collection and powerful report generation capabilities integrated with such a WAMP 150 water transfer/marketing facility may additionally enable sustainability managers to make intelligent and informed decisions about short- and long-term water usage within their basins. This may allow sustainability managers and property managers to maximize agricultural output while reducing costs and waste and ensuring the most efficient management and use of scarce groundwater resources.

In some embodiments, a WAMP 150-facilitated electronic water rights exchange may facilitate trading surface water rights in addition to groundwater rights. By facilitating trading of surface water rights and groundwater rights in the same exchange, a WAMP 150 may help lessen depletion of a given groundwater basin by increasing cost-efficient access to alternative water sources and distribution. In addition to a GMA's members benefiting from standardized, trusted and efficient processes for conducting water right transfers, a WAMP 150-facilitated electronic water rights exchange may facilitate a GMA to earn revenue—for example from market transaction fees. Additionally, a WAMP 150-facilitated electronic water rights exchange may enable partnerships with third party financial institutions such that water rights trades may perhaps be financed and/or insured.

In some embodiments, a WAMP 150 may facilitate a GMA to create or facilitate a market for trading water rights including but not limited to: extraction, distribution, storage and/or usage, thereby perhaps promoting more efficient (and perhaps more equitable and sustainable) water utilization. A WAMP 150 may for example provide an electronic water rights exchange facility where water extraction, distribution, storage, usage and/or derivative rights may be optioned, leased, sold or otherwise traded, securitized, capitalized or monetized. Such a WAMP 150-facilitated electronic water rights exchange may facilitate a GMA to configure sustainable trading rules and thereby, for example in California, allow for the activation of the water extraction rights trading powers of the Sustainable Groundwater Management Act. A WAMP 150-facilitated electronic water rights exchange may be configured so as to utilize trading rules that promote groundwater sustainability—for example, limiting the quantities of water that may be traded by a given property account utilizing the exchange. Furthermore, a WAMP 150 may facilitate the GMA to update and uniformly implement changes in policy and sustainable trading rules—for example suspending new groundwater transfers for a sub-basin that may be falling behind against GMA sustainability goals.

A WAMP 150 in some embodiments may be shared by two or more GMAs cooperating as a VGMA. Such a shared WAMP 150 may facilitate a virtual integrated electronic water rights exchange that may in turn facilitate the transfer of water rights within a multi-GMA groundwater basin.

In some embodiments, a WAMP 150 may be configured to facilitate parties outside a GMA's district to utilize the facilities of the GMA's WAMP-150 facilitated electronic water rights exchange. By facilitating the transfer of groundwater not needed within the GMA's district, willing buyers and sellers of water have access to an efficient, cost-effective and impartial marketplace that may permit water to be re-distributed to its highest value end use without compromising the sustainability of the GMA's basin. Such groundwater transfer may be actualized by utilizing existing groundwater distribution systems that may otherwise be fallowed due to regional water shortages.

In some embodiments, a WAMP 150 may facilitate a water trading news (and perhaps more general news) portal. A WAMP 150 may facilitate sustainability managers to access aggregated and perhaps curated information feeds including but not limited to: news, social media, research, and regulatory actions. Additionally, such news and information may be distributed by a WAMP 150 to members, property managers and other interested third parties. Such WAMP-accessed information may therefore assist a GMA and its members to better manage its water resources.

As stated previously, for the purposes of the discussion that follows, when the term 'GMA' is used, it may be assumed unless stated otherwise that the discussion applies equivalently to a VGMA; also the term 'GMA' may be assumed to apply equivalently to a surface water management agency (unless stated otherwise) should such a surface water management agency manage or utilize groundwater resources, or anticipate doing so or cooperating in a VGMA, or for any other reason utilize a WAMP 150.

In some embodiments, a WAMP 150 may facilitate a GMA to configure, operate, and in general in a systematic fashion adopt utilization of that WAMP 150 so as to migrate the GMA away from its current legacy operations system(s) and replace them with the thusly configured facilities of the WAMP 150. A WAMP 150 may facilitate different types of water agencies, including but not limited to:
 a surface water management agency,
 a groundwater management agency (GMA), and
 two or more GMAs (or other water agencies) cooperating in a VGMA.

Specific to the operation of a VGMA, a WAMP 150 may facilitate organizing, assembling and/or operating a VGMA. Such VGMA facilitation may include combining or keeping securely separate (as appropriate) the data, functions and responsibilities of the constituent water management agencies cooperating to form the VGMA so as to eliminate redundant operation while protecting constituent agencies' proprietary/commercial interests and facilitating de-identified aggregated data to be utilized by the VGMA. In turn, this may enable the respective GMAs to provide reports to a government authority to fulfill the requirements of a SGMA. Hence, the thusly WAMP 150-facilitated VGMA may facilitate existing GMAs to maintain their relationships with their members while complying and contributing to the implementation of the SGMA.

In some embodiments, a GMA may utilize its own staff to perform the migration process from the GMA's legacy operations systems to a WAMP 150. Or a GMA may utilize third parties to assist in or to totally perform such a migration process.

In some embodiments, a WAMP 150 may facilitate a systematic phased migration from a legacy operations system to a WAMP 150. In particular, a WAMP 150 may provide a GMA with facilities that educate, prepare and guide the GMA in a step-by-step fashion through such a phased process. For example, a WAMP 150 may provide facilities to import the data inputs and outputs of the legacy operations system (either automatically or if necessary manually) such that those same inputs may be processed by the WAMP 150 and the resulting WAMP 150 outputs may be compared by the WAMP 150 and by the GMA against the outputs of the legacy operations system.

The process of migrating two or more GMAs cooperating in a VGMA from their individual legacy operations systems to a WAMP 150 may be similar to the phased migration process for a single GMA—but typically more complex. A WAMP 150 may facilitate each of the GMAs to migrate their respective operations individually and separately to the WAMP 150 as was described above. As each GMA's migration to the WAMP 150 may be completed, the WAMP 150 may further facilitate that GMA to migrate to a VGMA configuration and operation of that WAMP 150.

Figure 2:
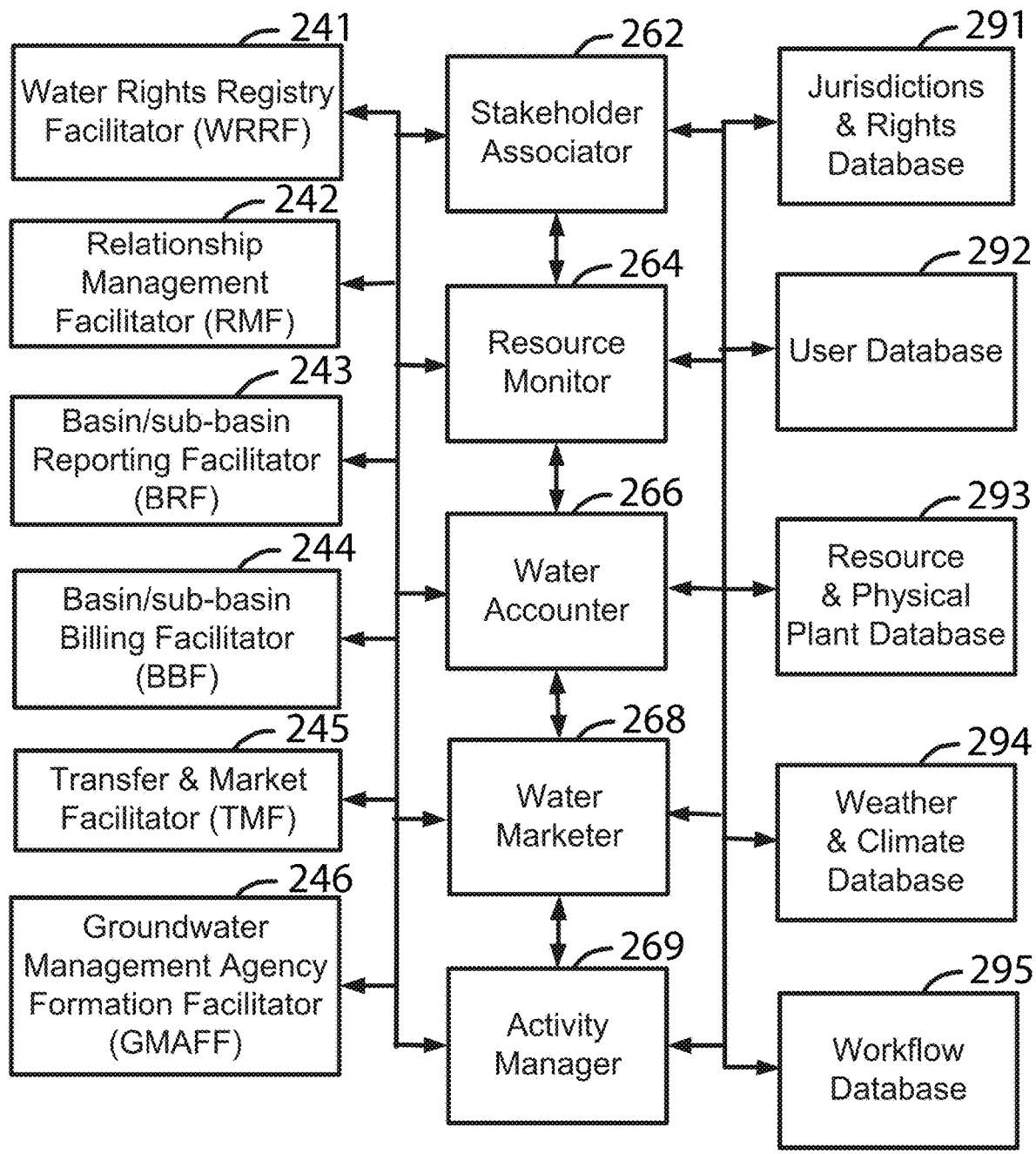
FIG. 2 is a functional block diagram further illustrating the WAMP of FIG. 1.

Referring to FIG. 2, a WAMP 150 may support a GMA's capacity to innovatively and reliably service members within the GMA's district while installing the reasonable controls necessary for a GMA to manage its operations. The GMA users of a WAMP 150 may be facilitated by the WAMP 150 to cost effectively and efficiently implement groundwater management requirements—for instance those mandated by California's Sustainable Groundwater Management Act.

In some embodiments, a WAMP 150 may include one or more 'facilitators' that may be utilized via user interface(s) to configure, monitor, test, control, manipulate and otherwise operate the user-apparent facilities of a WAMP 150. Such facilitators may integrate, interwork and seamlessly share data with each other and among WAMP 150 facilities. In some embodiments, data created, updated by, or otherwise associated with a given WAMP 150 facility may be accessed, utilized, replicated, modified, aggregated, associated, or otherwise utilized by one or more additional facilitators of a WAMP 150. Furthermore, a given screen display by a WAMP 150 facilitator may include data from one or more facilities of a WAMP 150 or information derived from such data from one or more such facilities. WAMP facilitators may include, but not limited to:

Water Rights Registry Facilitator (WRRF) 241,
Relationship Management Facilitator (RMF) 242,
Basin/sub-basin Reporting Facilitator (BRF) 243,
Basin/sub-basin Billing Facilitator (BBF) 244,
Transfer & Market Facilitator (TMF) 245, and
Groundwater Management Agency Formation Facilitator (GMAFF) 246.

For example, in some embodiments a Water Rights Registry Facilitator (WRRF) 241 may facilitate recording and updating information pertaining to members' and stakeholders' water rights and related property interests within or related to the jurisdiction of a GMA; a Relationship Management Facilitator (RMF) 242 may facilitate a GMA staying in contact with and providing services to its members; a Basin/sub-basin Reporting Facilitator (BRF) 243 may facilitate regulatory-compliant reporting by a GMA to governing or interested regulatory bodies; a Basin/sub-basin Billing Facilitator (BBF) 244 may facilitate billing for fees such as groundwater usage fees from members or appropriate third parties; a Transfer & Market Facilitator (TMF) 245 may facilitate a GMA providing a WAMP 150-facilitated water rights exchange market where for example options or rights for quantities of water might be offered for sale, negotiated, purchased, and recorded; and a Groundwater Management Agency Formation Facilitator (GMAFF) 246 may facilitate configuring a WAMP 150 and entering, importing and otherwise acquiring data utilized by such a WAMP 150 to facilitate the operation of a water agency such as a GMA, or facilitate the operation of two or more GMAs and/or other water agencies cooperating as a VGMA).

Water Rights Registry Facilitator (WRRF) 241.

In some embodiments, a WRRF 241 may be utilized for secure cloud based 'water extraction rights registry' (WER registry) services that may facilitate a GMA to log, monitor, regulate and otherwise manage water use rights. A WRRF 241 may facilitate accumulating, storing, updating and otherwise managing a comprehensive WER registry. Additionally, a WRRF 241 may facilitate a GMA's utilization of secure, auditable process(es) for managing and maintaining records of a WER registry. A GMA (as well as appropriately authorized third parties) may utilize such a WAMP WER registry facilitated by a WRRF 241 as a reliable source of groundwater extraction rights information within the GMA's jurisdiction.

In some embodiments, a sustainability manager may utilize a WRRF 241 to import property location, boundary, and ownership information from appropriate sources such as a county recorder's database. A WRRF 241 may additionally be configured so as to interface and obtain data from third party water-use reporting systems. Imported data along with other WER registry data and data managed by other WAMP 150 facilitators may be aggregated and analyzed to provide an easily comprehensible basin-wide overview of groundwater and/or surface water use.

In some embodiments, a WRRF 241 may facilitate a sustainability manager to retrieve data from an earlier date's WER registry that may have been logged or otherwise recorded by a WAMP 150. Additionally, a WRRF 241 may facilitate a sustainability manager to configure WER registry record access controls for one or more property managers. Such WER registry access controls may for example be configured to include, write only, read and write, read write and edit, approve and overwrite authorization for specific elements of WER registry data including read only access to prior date's WER registries.

Relationship Management Facilitator (RMF) 242.

In some embodiments, an RMF 242 may be utilized for secure cloud based member relationship management services that may facilitate a GMA's (or other agency's) sustainability manager to: input, store, access, edit, update, and otherwise process and share (as appropriate) member profile, contact and interaction details including written, electronic and verbal communication with property managers and/or third parties. In some embodiments, a RMF 242 may assign, perhaps automatically, a unique member ID number to each member. Such a member ID number may be then be utilized by a WAMP 150 to search WAMP Database(s) 158 for information pertaining to the member assigned that unique member ID number.

An RMF 242 may facilitate multiple sustainability managers to simultaneously input, store, access, edit, update, and otherwise process and share (as appropriate) a multiplicity of GMA member's water service accounts.

In some embodiments, an RMF 242 may facilitate configuring a WAMP 150 so as to activate or de-activate WAMP 150 services to a given member. Furthermore, a sustainability manager may utilize an RMF 242 to configure a set of secure WAMP 150 facilities that a property manager (or an appropriate third party) may utilize.

An RMF 242 in some embodiments may facilitate a sustainability manager to communicate (e.g., via SMS, email and or voice) with property managers utilizing the member contact facilities of a WAMP 150. Such member contact facilities may include a member-accessible web page and/or a mobile App made available for member's mobile devices.

An RMF 242, in some embodiments, may be utilized by a sustainability manager to add a contact note (or notes) to a member account record—for example preserving details of a conversation. In some embodiments, a RMF 242 may facilitate a sustainability manager to logically "attach" a contact note or other annotation to virtually any type of WAMP Database(s) 158 record. Such a flexible annotation facility may be thought of as the digital equivalent of a post-it note.

In some embodiments of a WAMP 150, an RMF 242 may integrate with corresponding WRRF 241 to provide an integrated interface to facilitate a sustainability manager to access and update a property account's personal and business information including their property water and land assets. Additionally, a sustainability manager may access and update a property manager's personal and business information including their per-property managed water and land assets Such an integrated interface may provide:

Personal and business data for every water consumer, water provider, and irrigation stakeholder within a basin, and A streamlined summary page for the WER registry data for every property account and every property manager.

Basin/sub-basin Reporting Facilitator (BRF) 243.

In some embodiments, a BRF 243 may be utilized for secure cloud based report generation and publishing services that may facilitate a GMA to configure and produce custom-tailored reports as well as configuring reporting intervals for a given report and the method in which a given report is to be undertaken (manual or electronic). A BRF 243 may provide a range of sophisticated reporting facilities—allowing the generation of charts, maps and downloads to give sustainability managers instant access to high level aggregated data pertaining to irrigation per property account in their groundwater basin.

In some embodiments, a BRF 243 may facilitate a GMA to create and report upon a groundwater sustainability plan (GSP) that may be specific to that GMA's jurisdiction. Furthermore, a BRF 243 may facilitate a GMA to cooperate with one or more additional GMAs to produce a single basin-wide GSP. A WAMP 150-facilitated VGMA may simplify and speed such GMA cooperation to produce and report out such a GSP. Additionally, a BRF 243 may facilitate a GMA or cooperating GMAs or VGMA to report a GSP and subsequent changes thereto to the appropriate overseeing government regulatory agency(s). In states such as California, such a reported GSP may be basin-wide reflecting the cooperation of GMAs within that basin.

In some embodiments, a GSP may be created and/or revised external to the WAMP 150. Any sustainability requirements derived from such an external GSP may be imported to the WAMP 150.

In some embodiments, a BRF 243 may facilitate a GMA to accumulate all data relevant to monitoring the GMA's performance relative to the GSP. Furthermore, a BRF 243 may be configured to generate corresponding sustainability reports and communicate such reports to the appropriate government regulatory authorities—thusly showing them how the GMA (or cooperating GMAs) are performing against their GSP.

In some embodiments, a BRF 243 may facilitate a sustainability manager to produce unique district-specific or basin-specific groundwater analytics reports. A sustainability manager may be further facilitated by numerous display options of a BRF 243 including: charts, diagrams and annotated maps—thus providing instant access to aggregated and analyzed data with granularity options ranging from basin-wide down to per property account. Additionally, a BRF 243 may facilitate a sustainability manager to configure reporting intervals as well as the method in which a given report is to be undertaken (physical or electronic). BRF 243 reporting facilities may also be configured to distribute reports for a limited time or to a proscribed list of distributees.

In some embodiments, BRF 243 groundwater analytics reports may assist GMA sustainability managers and/or their property managers counterparts with future business planning. For example, a BRF 243 may interwork with a TMF 245 to facilitate reporting on water market trends within the GMA's basin, but also potentially regionally, nationally and/or world-wide.

In some embodiments, a sustainability manager may utilize a BRF 243 hundreds of times a day to generate reports. Some such reports might be as simple as a table with one or a few entries. Other BRF 243-facilitated reports may be much longer and more complex and in some embodiments may even include active display elements such as XML. Additionally, a sustainability manager may utilize the facilities of a BRF 243 to save a record of a BRF 243-facilitated report and make it accessible so it may be shared with others—i.e., to publish the report. In some instances, a report may be published in a relatively passive fashion. For example, it may be posted on a GMA members web site or provided to a government agency. Or it may simply be archived perhaps with a quick added annotation by the sustainability manager.

In some embodiments, a BRF 243 may archive some or all reports generated by the BRF 243. So for example, a sustainability manager may browse through the archive for the previous day to find an interesting crop distribution pie chart he glimpsed. Finding the report with that pie chart, the sustainability manager may then publish the report containing that pie chart or perhaps publish just the pie chart as a mini-report in order to share it with colleagues or with third parties as appropriate. In this fashion, a BRF 243 may augment a sustainability manager's memory and knowledge and perhaps provide an ex-post facto means to publish a report that would otherwise be lost or need to be regenerated or recreated based on the sustainability manager's recollection.

Basin/Sub-Basin Billing Facilitator (BBF) 244.

In some embodiments, a BBF 244 may be utilized for secure cloud based member (and appropriate third parties) bill generation, distribution, analysis, accounting and payment services that may facilitate a sustainability manager to configure and operate the billing facilities of a GMA's WAMP 150 (e.g., calculate fees, send invoices, track and facilitate payments and export data to external systems and applications such as a variety of accounting software packages.) A BBF 244 may facilitate a sustainability manager to configure a WAMP 150 to calculate and charge: a fixed fee, fee per acre foot, tiered fee, (or a mix of) on an individual member or on a basin/sub-basin wide level. A BBF 244 may for example facilitate configuring the billing criteria utilized for fee determination including but not limited to: landholdings, water use and water rights. A sustainability manager may also be facilitated in custom configuring the application of fees—for instance: to an individual property account, an explicit list of property accounts, or a group of property accounts. Additionally, a BBF 244 may facilitate a sustainability manager to obtain reports on account status and performance as well as other billing analytics that may for instance facilitate forecasting water demand and revenue based perhaps in part on historical trends.

Furthermore, in some embodiments, a BBF 244 may be utilized by a GMA to assemble payment information, distribute invoices and collect payments, as well as notify and track the entire billing process (e.g., accounts receivable aging, cash received, etc.). The sustainability manager may also configure invoices to be sent out by a WAMP 150 either electronically or via paper mail or perhaps both.

In some instances, different areas within a GMA's district may utilize water from differing sources and perhaps with differing costs to the GMA or differing impacts on groundwater sustainability. Therefore, in some embodiments, Water Accounter 266 may facilitate a GMA to configure a 'billing area' such that a groundwater extractor and/or water consumer in a given billing area may be invoiced utilizing different billing rates and/or fees than in another such billing area. Furthermore, the WAMP 150 'boundary mapping tool' may be utilized to configure the geographical boundaries of a given billing area. Such a boundary mapping tool may facilitate a sustainability manager to place virtual pins on a map image of the district or a portion of the district, where straight virtual lines between virtual pins represent segments of the area boundary. Should a more jagged boundary need to be drawn, an additional virtual pin may be placed along an existing virtual line and then that virtual pin may be "dragged and dropped" to a new map location, stretching and redrawing the straight line segments on each side of the newly added and moved virtual pin. The process may be repeated with additional virtual pins for numerous zigs and zags. Such a technique for placing and modifying "rubber band lines" to create a complex outline may be familiar to one skilled in the art. In some embodiments, a WAMP 150 may integrate and utilize third party-sourced boundary drawing facilities.

Additionally, subsequent to configuring the boundaries of a billing area, in some embodiments, a sustainability manager may utilize a BBF 244 to create a new billing line, enter in the appropriate billing rate(s) and/or fee(s) and attached the billing line to the billing area.

Transfer & Market Facilitator (TMF) 245.

In some embodiments, a TMF 245 may be utilized for secure cloud based water rights exchange management services that may facilitate a GMA to configure, monitor, and operate a WAMP 150-facilitated electronic water rights exchange. Utilizing a TMF 245, a sustainability manager may for example configure the trade offering categories and classes of such a WAMP 150-facilitated water rights exchange. Configurable trading categories may include, but not be limited to: extraction, distribution, storage, usage, securitized and/or derivative rights. Configurable trading classes may include but not be limited to: options, leases, conservation credits, sales and swaps.

In some embodiments, a TMF 245 may facilitate a sustainability manager to configure a WAMP 150-facilitated water rights exchange to automatically update the GMA's WER registry to reflect trades made via the exchange. Additionally, a TMF 245 may facilitate a GMA configurable external user interface (perhaps web-based and/or mobile app based) for property managers and possibly other third parties such as water brokers to access and utilize the exchange.

In some embodiments, a TMF 245 may facilitate a sustainability manager to monitor the operation of a WAMP 150-facilitated electronic water rights exchange. Additionally a TMF 245 may be configured to monitor external markets. In addition to configuring market analytics and reports, a sustainability manager may configure a TMF 245 to provide notifications and alerts when a monitored event or events occur.

Additionally, in some embodiments a TMF 245 may facilitate a sustainability manager to manually manage the operation of the WAMP 150-facilitated electronic water rights exchange. For example, a sustainability manager may utilize facilities of the TMF 245 to shut down the exchange due to an emergency, tragedy or disaster—e.g., an earthquake resulting in an aqueduct breach.

Furthermore, in some embodiments, a TMF 245 may be configured to facilitate interworking of a GMA's WAMP 150-facilitated electronic water rights exchange with other GMA's WAMP 150 water rights exchanges. Additionally, a sustainability manager may configure a TMF 245 to facilitate interoperation with third party water/commodity exchanges.

Groundwater Management Agency Formation Facilitator (GMAFF) 246.

In some embodiments, a GMAFF 246 may be utilized for secure cloud based WAMP 150-bring-up and management services that may facilitate a GMA to plan for, configure, operate, evaluate, upgrade, and in general adopt utilization of a WAMP 150 so as to migrate that GMA away from its current legacy operations systems and replace them with the thusly configured, data populated and tested facilities of a WAMP 150. A GMAFF 246 may for example facilitate phased planning, configuration, operation and testing of a GMA's migration to a WAMP 150 by facilitating a comprehensive checklist and progress reporting system to allow tracking of and enhanced confidence in the migration process facilitated by the WAMP 150. A GMAFF 246 may support different types of water agencies, including but not limited to:

a surface water management agency,
a groundwater management agency (GMA), and
two or more GMAs (or other water management agencies) cooperating in a VGMA.

A GMAFF 246 in some embodiments may facilitate a GMA and its sustainability manager(s) to study, plan for, prepare for, and undertake migration from the GMA's legacy operations systems to a WAMP 150. A GMAFF 246 may for example facilitate migration planning by providing on-line training, visualization aids, printing of manuals, pamphlets, quick guides, check lists and other documentation. Such planning facilitation and documentation may help to prepare both GMA staff and GMA members for the migration to a WAMP 150.

Additionally, in some embodiments, a GMAFF 246 may facilitate a GMA to configure a GMA user account individually for each sustainability manager—with privileges and access controls controlling which WAMP 150 facilities a given sustainability manager may access and utilize. Similarly, a GMAFF 246 may facilitate a GMA to configure data access controls for WAMP Database(s) 158 records on a per-sustainability-manager basis. So for example, a GMA may configure WER registry record access controls to various privileges to include: no access, write only (i.e., new records only), read and write, read write and edit, approve and overwrite authorization for specific elements of WER registry data as well as controlling read only access to prior date's WER registries.

In some embodiments, a sustainability manager of a GMA may utilize a GMAFF 246 to configure facilities of a WAMP 150 that the GMA may be in the process of migrating to. The process of initially configuring such facilities may result in a GMAFF 246 generating checklist(s) and documentation that the sustainability manager may utilize to guide and monitor the migration process. As the sustainability manager further utilizes the GMAFF 246 to configure facilities of a WAMP 150, additional checklist(s) and documentation may be generated by the GMAFF 246. So for example, such a GMAFF 246 may be utilized to guide the sustainability manager step-wise through a phased process of planning, configuring, inputting data to, operating, testing and evaluating operation of the WAMP 150. Additionally, a GMAFF 246 may facilitate a GMA to generate migration plans, and subsequently back-annotate those plans to provide a record of the decision making and process outcomes and insights.

A GMAFF 246 may facilitate the constituent water agencies of a VGMA to migrate from their legacy operations systems to a WAMP 150. For example, each GMA may separately migrate its own operations to the WAMP 150 and having successfully done so may utilize a GMAFF 246 to cooperatively integrate each GMA's operations with the operations of the other constituent GMAs so as to effectively and successfully assemble and migrate the operations of the constituent GMAs to VGMA facilitated by the WAMP 150.

In some instances, one or more WAMP 150 facilitators 241-246 may be embodied as a web application(s) or native application(s) that may execute on a WMAP 150 user's terminal device.

Referring further to FIG. 2, in some embodiments, WAMP database(s) 158 may include, but not be limited to:
Jurisdiction and Rights Database 291,
User Database 292,
Resource and Physical Plant Database 293,
Weather and Climate Database 294, and
Workflow Database 295.

In some embodiments, Jurisdiction and Rights Database 291 may function as a reliable depository for information pertaining to a GMA district and properties within that GMA district, e.g., property accounts including historical, deeded, optioned, leased, purchased or otherwise granted, awarded, claimed or otherwise acquired groundwater and/or surface water rights and interests.

In some embodiments, User Database 292 may function as a reliable depository for information pertaining to a GMA district and members and non-member users within the GMA district, e.g., property owners, property managers, the GMA's sustainability managers, third party data providers and consumers.

In some embodiments, Resource and Physical Plant Database 293 may function as a reliable depository for inventory records of water resources and physical plant utilized for the pumping, storage, measurement (including Sensor(s) 130) and distribution of water resources. Additionally, Resource and Physical Plant Database 293 may store measurements and other data related to water resources and physical plant, e.g., 3-D maps, satellite images, well sample results and other water resource measurements, including estimated volume, flow rates, utilization, accessibility, and recharge and depletion rates.

In some embodiments, Weather and Climate Database 294 may function as a reliable depository for information pertaining to weather and climate—both current year and longer term, e.g., measurements, statistics, history, projections and models.

In some embodiments, Workflow Database 295 may function as a reliable depository for information pertaining to day-to-day operation of a GMA—particularly the work tasks of sustainability managers—including schedules of future activities, records of ongoing activities and contacts, and archival logs of completed activities and contacts.

In some embodiments, a WAMP 150 may include one or more WAMP facilities. Such WAMP 150 facilities may integrate, interwork and seamlessly share data with each other and also with WAMP 150 facilitators 241-246. A WAMP 150 facilitator 241-246 may utilize and perhaps display data from one or more facilities of a WAMP 150. WAMP 150 facilities may include facility logic and/or control data/metadata related for example to configuring, maintaining and utilizing the WAMP database(s) 158. WAMP 150 facilities may include, but not limited to:
Stakeholder Associator 262,
Resource Monitor 264,
Water Accounter 266,
Water Marketer 268, and
Activity Manager 269.

In some embodiments, Stakeholder Associator 262 may function as associative and analytic nexus for data relating to a GMA's stakeholders. Stakeholder Associator 262 may utilize one or more of WAMP Database(s) 158. Stakeholder Associator 262 may facilitate services provided to or otherwise related to the stakeholders of a GMA where such services may be made apparent to a WAMP 150 user via WAMP 150 facilitator(s) 241-246. As discussed previously, a GMA's stakeholders may include, but not be limited to:
The GMA including sustainability managers,
GMA district members—e.g., property owners and property managers,
Surface water rights holders,
Surface water management agencies,
Non-agricultural water consumers and their water agencies,
Groundwater recharge area property owners,
Local politicians and/or government officials,
Sovereign entities such as Native American reservations,
Neighboring GMAs,
State/provincial and national agriculture, water and environmental agencies,
Regional watershed management agencies,
Regional water storage and distribution agencies (e.g., Bureau of Reclamation, California Department of Water Resources),
Water brokers,
Non-agricultural large scale water consumers,
Non-local non-agricultural water consumers (e.g., large city dwellers),
Geothermal power producers,
Politicians, government officials, lobbyists, scientists, cartographers,
Non-governmental organizations,
Irrigation industry service and equipment vendors,
Water and beverage bottling companies,
Right of way holders, and
Neighboring geo-political entities (e.g., cities, states, provinces and countries).

Clearly, a GMA may have many more stakeholders than just the GMA district members, property owners and property managers. It is important to a GMA that a WAMP 150 offer appropriate facilities reflecting, managing, and as utilized, catering to the interests of a multiplicity of stakeholder types. In some embodiments, Stakeholder Associator 262 may be utilized by a WAMP 150 to determine a given user's stakeholder type and therefore what facilities (as may be further constrained by configuration) may be appropriate for utilization by that given user. Stakeholder Associator 262 may facilitate a sustainability manager to record in the WAMP 150 database(s) 158 relevant contact information for members, and to associate selected subsets of members so as to facilitate external communication or internal reporting, and track all communication (internal and external) with or about a member (via e-mail, phone calls or in person). Additionally, Stakeholder Associator 262 may utilize User Database 254, Workflow Database 295, Jurisdiction and Rights Database 251 (and perhaps to a lesser extent Resource and Physical Plant Database 252 and Weather and Climate Database 253) to determine stakeholders, their stakeholder type and various other sorts of stakeholder characteristics and service requirements.

In some embodiments, facilitating communication and good working relations with a GMA's many stakeholders may be further facilitated by Stakeholder Associator 262. A GMA may for example utilize a WAMP 150 to provide numerous reports and notifications to GMA stakeholders. However, whether or not a given stakeholder may be provided a specific report or notification may be determined by the type of stakeholder. For example, a notice of a water fee rate increase may be sent to GMA members, but not to neighboring GMAs. Stakeholder Associator 262 may for example facilitate such automated determinations based on stakeholder type.

Stakeholder Associator 262 in some embodiments may be utilized to configure and subsequently determine—based on a given stakeholder's characteristics—what WAMP facilities and/or data that given stakeholder's network access account may utilize. Such a determination may perhaps facilitate safeguard(s) against accidental mis-granting of access to sensitive WAMP 150 facilities and/or data.

A property account within a GMA's district may have more than one property manager user—for instance, the owner of the property in addition to an individual or firm hired by the property owner. In some embodiments, Stakeholder Associator 262 may facilitate a GMA to configure shared network access for such 'joint property managers'. Stakeholder Associator 262 may for example facilitate each such joint property manager user to have their own WAMP 150 log-in credentials—e.g., unique user name and password—and yet associate them with the same property account. Or perhaps a given property account's network access may have a single user name for that property, but separate passwords for each joint property manager user for that property.

Furthermore, a GMA member may own (or co-own) more than one property within the jurisdiction of the GMA. In some embodiments, Stakeholder Associator 262 may facilitate a GMA member to have a 'property manager master account' such that that GMA member may manage one or more 'property manager auxiliary account(s)' for use for example by an individual or firm authorized by the GMA member to manage aspects—perhaps configurable—of the GMA member's business dealings with the GMA relative to a given property. Additionally, in some embodiments, a GMA member owning (or co-owning) more than one property within the jurisdiction of the GMA may be facilitated by Stakeholder Associator 262 to have their own GMA-configured property manager auxiliary account for each property within the jurisdiction of the GMA. In some instances, such a multi-property owner might 'switch' from one property manager auxiliary account to another via a Stakeholder Associator 262-facilitated WAMP 150 menu. Perhaps an account specific log-in may be required for such a property manager auxiliary account switch or perhaps more conveniently such a property manager master account user may make such a switch without an additional log-in to the WAMP 150.

Furthermore, an individual or firm may act as property manager for two or more properties where the ownership of two or more of those properties may be separate or disjoint. So for example, ABC Property Management may work for both Aiello Family Vineyards and Fujimoto Kobe Beef. Accordingly, in some embodiments ABC Property Management may have separate WAMP 150 user names and passwords for Aiello and for Fujimoto—facilitated by Stakeholder Associator 262. Alternatively perhaps, ABC Property may have a single Stakeholder Associator 262-facilitated user name and password and then a WAMP 150 menu of authorized properties where each such authority has been pre-ok'd (again facilitated by Stakeholder Associator 262) from the master account for the corresponding property.

In some embodiments, Stakeholder Associator 262 may facilitate a GMA to associate one or more persons and/or legal entities—utilizing a WAMP 150 grouping abstraction for those persons/legal entities. Typically, such a grouping abstraction may be utilized because those persons/legal entities have something in common—perhaps they all grow crops adjacent to an irrigation canal. Or that something in common may for instance be a legally recognized relationship such as marriage or a business contract. A WAMP 150 may utilize a grouping abstraction as if it were an individual, such that facilities of a WAMP 150 utilized for an individual may be similarly utilized for those grouped together by a grouping abstraction.

So for example in some embodiments, Stakeholder Associator 262 may facilitate a sustainability manager to group several property owners into a so called 'property group' and assign that property group a unique group name and perhaps also a unique nickname (i.e., a name that is typically short, easy to remember and/or easy to spell.) Such a property group may then be utilized by a WAMP 150, as appropriate, as if it were an individual property owner. So for example, a sustainability manager may group twenty property owners that have a grape growing co-op. She may group name the group "Sheldon Valley Grape Co-op" and nickname it "SV grapes". Further by example, the sustainability manager may utilize a WAMP 150 to generate a water utilization forecast report entering in the name Sheldon Valley Grape Co-op rather than each of the individual property owners' names. A WAMP 150 may correspondingly generate a forecast report for the grouped properties as if they were a single property. Furthermore, in some embodiments, the WAMP 150 may additionally generate a forecast report individually for each of the constituent properties in the property group. The way(s) in which a property group or other grouping abstraction may be utilized by a WAMP 150 may vary based on configuration of that WAMP 150.

In some embodiments, Stakeholder Associator 262 may facilitate operations of a GMA with thousands of data records pertaining to members, their properties, their water extraction rights and numerous other member (and/or third party) related things. Selecting a specific WAMP Database(s) 158 record may be a daunting task for a sustainability manager (or other WAMP 150 user), therefore Stakeholder Associator 262 may provide a "quick search" facility to assist in easing such selection. So for example, Stakeholder Associator 262 may facilitate a sustainability manager to search for a record by typing in one or more entry fields in a search input array, where each input field may be utilized by a WAMP 150 as a search key—either independently and/or in concert. Stakeholder Associator 262 may facilitate quick search wherein a list of multiple search results may be presented to a sustainability manager—each as a clickable link—and the sustainability manager may select one by clicking on it. Such a list may have ranked ordering based on the quality of the match and other considerations. In some instances, a WAMP 150 may be utilized to attempt a perfect search match and should no match occur and therefore no corresponding data record be retrieved, a WAMP 150 may facilitate a sustainability manager to create a new data record. In some embodiments, a WAMP 150 may integrate and utilize third party-sourced search facilities.

In some embodiments, Stakeholder Associator 262 may facilitate utilizing geographic subdivisions to configure a district into one or more 'zone(s)'. Such zone-based subdivision of a GMA's district may for example simplify and speed record searches by narrowing them to a smaller geographic area. Sustainability managers—just as the average person—may have an easier time remembering the region that a property is located in rather than the street name or exact address. Therefore, Stakeholder Associator 262 may be utilized to subdivide a district into geographic zones with each such zone uniquely named. Such subdivision may be facilitated for example by utilizing hydrological features such as sub-basins or by utilizing existing third party subdivisions such as political zoning. In some instances, Stakeholder Associator 262 may import political zone boundary description data from a third party organization such as a county government.

In some embodiments, Stakeholder Associator 262 may facilitate a sustainability manager to create new zones utilizing a WAMP 150 boundary mapping tool—for example outlining a geographic area for such a new zone on a district map. In addition to creating named zones within a GMA, such a WAMP 150 boundary mapping tool in some embodiments may be utilized by a sustainability manager as a visual search tool. So for example, the boundary mapping tool may be utilized to identify a property or properties outlined in whole or in part by the sustainability manager. Additionally, in such a map assisted search mode, a WAMP 150 boundary mapping tool may cause a boundary outline to "snap" to the boundary of enclosed the property (or enclosed adjacent properties). Furthermore, such a WAMP 150 boundary mapping tool facility for selecting a property or properties may utilized by a sustainability manager to designate a property group. Additionally, where appropriate, a WAMP 150 boundary mapping facility may be utilized to redraw a property parcel boundary on WAMP 150 parcel maps of the GMA's district.

In some embodiments, Stakeholder Associator 262 may facilitate a sustainability manager to record in and make updates to WAMP Database(s) 158 capturing the potentially complex and manifold legal relationships impacting ownership of, control of, and/or interest in property and/or water extraction rights. In perhaps the simplest instance a property owner in a GMA's district may also own the ground water extraction rights associated with that property. However, ownership and/or control of the two different rights may be split between parties. For example, a home owner may have title to the property his house is situated on, but a corporation may hold extractive rights including ground water extraction rights. As well as a split in ownership between property rights and groundwater extraction rights, Stakeholder Associator 262 may be configured to capture and track shared rights. A simple case is joint ownership. For example, a married couple may share rights as tenants in common. Or, partners in a business—say siblings—may share rights as tenants in common. Additionally, non-owner third parties may have effective control over property rights and/or groundwater extraction rights. For example, the executor or a trustee may control such rights while the ownership is held in trust or passes between owners. Or a court may enjoin control of such rights, say in a divorce, bankruptcy or perhaps a criminal case. Additionally, a property owner who may also hold the groundwater extraction rights may lease the property to a farmer who may pump groundwater to irrigate crops. Technically that farmer may not hold either the property or the groundwater extraction rights, but the farmer may have a clear cut interest in those rights and in management of groundwater extraction by a GMA. Stakeholder Associator 262 may facilitate a GMA to capture, record and revise any and all of the above described variations on rights ownership and interests.

Consequently, in some embodiments, Stakeholder Associator 262 may be configured to record in and make updates to WAMP Database(s) 158 capturing the relationships between rights owners and other potential interest holders so that all may be served fairly, and as may be required by legal statutes and mandates in force in the GMA's district. Changes in ownership rights and or interests may require corresponding changes in WAMP Database(s) 158 including both Jurisdictions and Rights Database 291 (e.g., WER registry) and User Database 292.

More specifically to VGMAs, many constituent GMAs (as well as surface water management agencies joining in VGMAs) may have financial and commercial disincentives to share data or relationships—particularly when they overlap in watersheds and or groundwater basins. However, Stakeholder Associator 262 may facilitate formation and operation of a VGMA—combining, but appropriately firewalling data from multiple water management agencies cooperating as a seemingly single VGMA.

In some embodiments, Stakeholder Associator 262 may utilize a 'shared data access control engine' capability with configurable rules to enforce how GMAs' shared data is accessed, copied, anonymized, aggregated, communicated and secured. Such rules may for example be configured and managed by a third party consultant employed by the GMAs under the auspices of the VGMA. Such a shared data access control engine capability may enable multiple GMAs to share the facilities of a WAMP 150, while protecting the privacy of individual property accounts within a given GMA's specific district and still enabling anonymized aggregated data to be appropriately utilized by the VGMA. So for example, for a WAMP 150 shared by two or more GMAs cooperating as a VGMA, Stakeholder Associator 262 may utilize the shared data access control engine capability to synthesize a virtual VGMA-wide WER registry by appropriately accessing the WER registries of each of the constituent GMAs; or perhaps to assemble a VGMA WER registry by appropriately anonymizing, filtering and combining data from those GMA WER registries.

Figure 34:
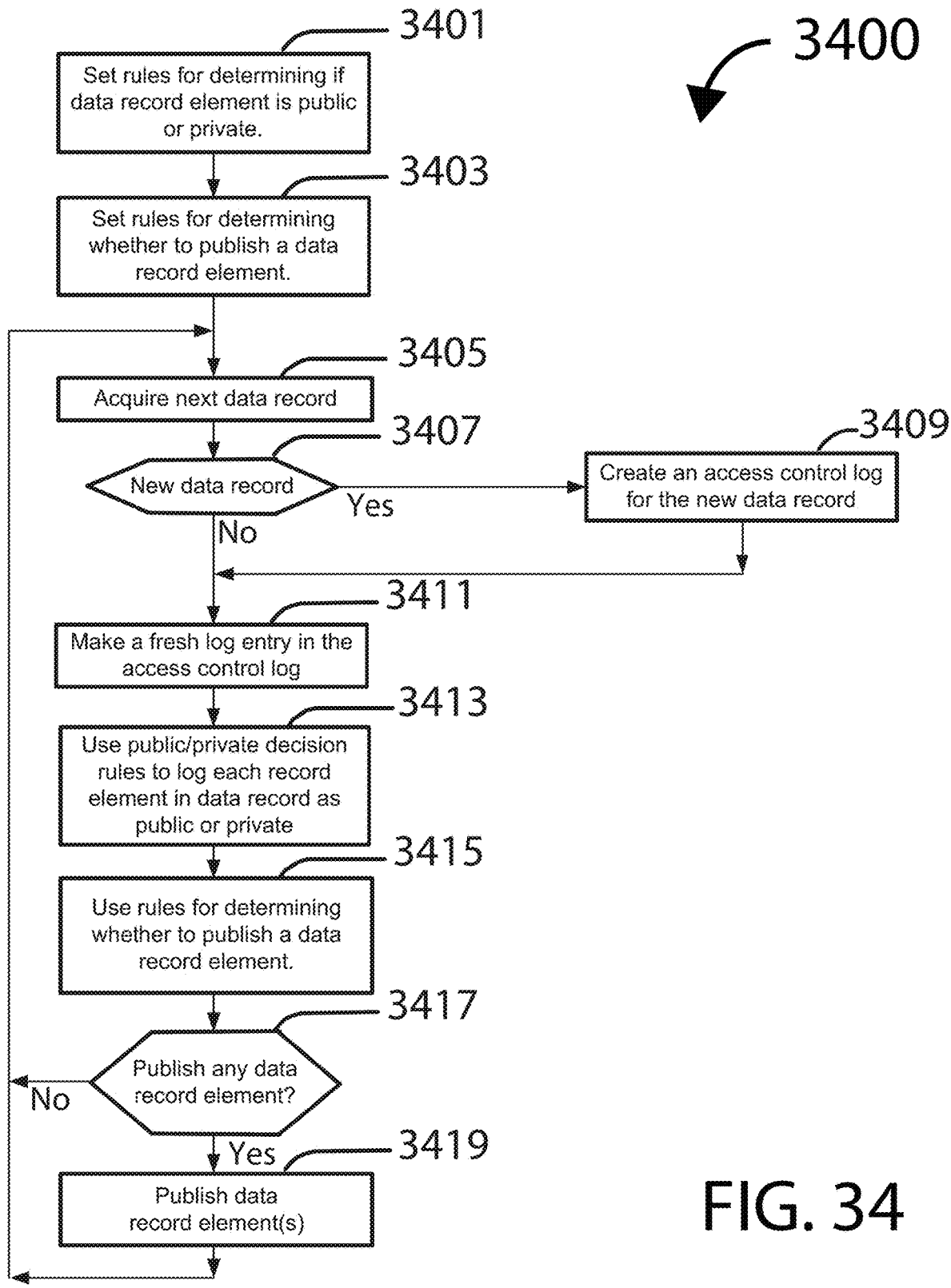
FIG. 34 is a Logic Flow Diagram illustrating an embodiment of a shared data access control engine for the embodiment of FIG. 1.

Referring to FIG. 34, logic flow diagram 3400 illustrates an embodiment of a WAMP 150 shared data access control engine. Referring to step 3401, the WAMP 150 may facilitate a GMA to configure rules for automatically determining if a given data record element is public or private. A given data record may contain one or more data record elements. A data record element is indivisible into smaller components such that one component may be public and one private.

Referring to step 3403, the WAMP 150 may facilitate the GMA to configure rules for determining whether a data record element may be published. Typically, the minimum requirement for publishing a data record element may be that that data record element is determined to be public. Such a data record element once published may be utilized as deemed appropriate by the GMA. For example, a published data record element may be shared—without being anonymized—between GMAs within a VGMA.

Referring to step 3405, the WAMP 150 may facilitate the GMA to acquire a new data record to be analyzed by the WAMP 150. Such a data record may for example be so analyzed at the time such a data record is newly acquired as well as each time such a data record is updated.

Referring to step 3407, the WAMP 150 may facilitate the GMA to distinguish a newly acquired data record from an update to an existing data record previously acquired by the GMA and stored for instance in the WAMP database(s) 158. Typically a given data record may contain one or more data record elements which when examined together may uniquely identify a data record—i.e., commonly referred to as a record identifier. For example, such a record identifier may be a unique numeric value such as a member ID number. Furthermore, typically such a record identifier may be read-only—i.e., protected from being over-written with a new value (other than perhaps to delete the entire data record).

Referring to step 3409, for a data record that is determined to be newly acquired, the WAMP 150 may facilitate the GMA to create a WAMP 150 access control log corresponding to that data record. Such an access control log may contain fields for information corresponding to each data record element within that data record, in which may be recorded, for example, when the data record element was most recently updated (e.g., a time/date stamp) and whether it was determined by the WAMP 150 to be public or to be private.

Referring to step 3411, for each data record—whether an update to an existing data record or newly acquired—the WAMP 150 may facilitate the GMA to add a fresh log entry for that data record and for each record element found in it. (Consequently, each time an update to the data record is acquired an additional log entry may be added such that the log may grow larger with more entries over time).

So for example, the fresh log entry may record the source of the data record (e.g., country recorder's database), a time/date stamp for the update, whether or not the source was a public source (i.e., making the entire data record potentially public). Furthermore, a WAMP 150 may optionally be configured by the GMA to place a copy of a given data record in the corresponding entry in the access control log.

Referring to step 3413, the WAMP 150 may facilitate the GMA to utilize "public or private" decision rules to log each data record element in the data record as public or private. So for example, one such rule may be that a data record element that is unchanged and previously public shall remain public even if the source of the data record update may be a private one. In this way, each of the data record elements may have its own record of determinations of being public or private. Therefore, a data record may contain both public and private data record elements; and a given data record element may change from private to public and/or public to private over time with successive updates to the data record containing that data record element.

Referring to step 3415, the WAMP 150 may facilitate the GMA utilize rules for determining whether to publish a data record element. So for example, one such rule may be that a data record element even if public may not be published if the data record contains one or more private data record elements.

Referring to step 3417, the WAMP 150 may facilitate the GMA to distinguish a data record determined to contain a newly publishable data record element from a data record determined not to contain a newly publishable data record element.

Referring to step 3419, for a data record that is determined to contain a newly publishable data record element, the WAMP 150 may facilitate the GMA to publish—at the GMA' discretion—each data record element newly determined to be publishable.

Whether or not a data record that is determined to contain a newly publishable data record element, the process may continue at step 3405.

In some embodiments, for a given data record element stored in WAMP Database(s) 158 or otherwise stored within a WAMP 150, such a data record element may be secured utilizing encryption and/or other means of security regardless of whether that data record element may be determined to be public, to be publishable, or to be published.

Referring back again to FIG. 2, in some embodiments, Resource Monitor 264 may function as associative and analytic nexus for data relating to a GMA's water resources—i.e., groundwater in particular, but also possibly surface water—and relating to Sensor(s) 130. Resource Monitor 264 may utilize one or more of WAMP Database(s) 158. Resource Monitor 264 may facilitate services related to water utilization within a GMA's district where such services may be made apparent to a WAMP 150 user via WAMP 150 facilitator(s) 241-246.

Resource Monitor 264 may utilize Resource and Physical Plant Database 252, Jurisdiction and Rights Database 251, User Database 254 and Weather and Climate Database 253 to determine water availability, distribution, utilization, loss, quality and other water-resource related characteristics for a given GMA district property or member.

As indicated previously, private access to and depletion of groundwater goes largely unmeasured, unmetered and unregulated. This clearly presents a key challenge to a GMA's sustainability mandate. Resource Monitor 264 may facilitate a GMA to locate, monitor, measure, charge fees for, and/or otherwise regulate and limit extraction of groundwater—both private and public.

In order to locate groundwater extraction, in some embodiments a WAMP 150 may utilize Resource Monitor 264. In addition to utilizing WAMP Database(s) 158 such as Resource and Physical Plant Database 292, Resource Monitor 264 may access External Database(s) 170 including but not limited to: local government records of permits for drilling wells, private well drilling and service company records, as well as insurance, loan, title, credit bureau and other "big data" sources as pertain to water wells, well equipment, well services and power run well pumps. Additionally, Resource Monitor 264 may utilize state and national governmental databases—i.e., data identifying wells derived from image analysis of satellite and aerial imagery or from sources similar to those listed above. Furthermore, as Resource Monitor 264 acquires and analyzes such External Database(s) 170-sourced data, it may update the GMA's Resource and Physical Plant Database 292 to record the location of groundwater wells in the GMA's district.

Furthermore, for a given well, additional well-related information may be acquired, correlated and recorded by Resource Monitor 264 in the Resource and Physical Plant Database 292 and/or other WAMP Database(s) 158. Such additional well-related information may include: ownership, well permit status, well drilling company, property water rights, well age, well depth, well bore size, well continuous-pumping capacity, well water level history, pump location (submerged or groundlevel), pump horsepower rating, source of pump power (e.g., generator, solar or line power), associated storage of extracted groundwater (e.g., water storage ponds or tanks), sharing or distribution of extracted groundwater (e.g., water cooperative) and property or properties served by the extracted groundwater. A GMA's Resource and Physical Plant Database 292 may contain such data for planned, active and decommissioned wells.

Additionally, in some embodiments a WAMP 150 may utilize Resource Monitor 264 to monitor groundwater extraction and utilization. So for example Resource Monitor 264 may access External Database(s) 170 such as those of public water extractors. For example, a state college may operate a well or wells and make available recorded measures of such groundwater extraction. Large private institutions may also provide similar groundwater extraction measurement data. Such public and large private institutions may in many instances have the largest number of wells per property with the largest diameter, deepest bores and highest capacity pumps. Such data may provide a GMA an accurate measure of groundwater extraction for that fraction (i.e., public and large private) of overall groundwater basin utilization. Additionally, by acquiring, analyzing and recording historical groundwater data, Resource Monitor 264 may derive a model of prior groundwater capacity and extraction and similarly synthesize a model(s) that may be utilized to estimate and forecast future groundwater capacity and extraction.

In some embodiments, Resource Monitor 264 may utilize telemetry facilities to communicate with Sensor(s) 130 so as to configure, control and acquire data from such Sensor(s) 130 with which to further populate WAMP Database(s) 158. Utilizing increasingly common geo-location facilities incorporated in sensor devices, a WAMP 150 may integrate sensor sourced data with map displays indicating the geographic location of the corresponding Sensor(s) 130. Such Sensor(s) 130 may be mobile such that their position changes over time. Resource Monitor 264 may facilitate moving such mobile Sensor(s) 130—e.g., a miniature drone aircraft—from location to location. In some embodiments, mobile Sensor(s) 130 may be semi- or fully autonomous. Time stamping and geo-location information may perhaps be acquired, maybe mixed with sensor data, by Resource Monitor 264. In some embodiments, Resource Monitor 264 may correlate acquired data from a plurality of Sensor(s) 130 so as to synthesize a "virtual sensor" of larger scope (and perhaps capability) than any one individual Sensor 130.

In some instances, WAMP 150-acquired measurement data may be statistically sufficient to support modeling by Resource Monitor 264 that is credibly indicative of overall groundwater capacity and amounts of extraction. However, in GMA districts with a preponderance of private wells—e.g., in rural/agricultural areas, such WAMP 150-acquired measurement data may not be statistically sufficient—perhaps because the statistical sample size is just too small. Therefore, in such GMA districts, a WAMP 150 may utilize Resource Monitor 264 to derive measures of private well groundwater extraction. In some instances, physical meters (i.e., Sensor(s) 130) may be attached to private wells and the corresponding usage data imported to the GMA's WAMP Database(s) 158. However, adding meters to wells may be a slow process—hampered by political resistance as well as practical issues of complexity and cost. One need only consider attempts to meter water use of previously unmetered residential water users to get an idea of how difficult and time consuming such a meter retro-fit may be. Consequently, Resource Monitor 264 may utilize an 'imputation engine' capability (not shown) to derive (rather than physically meter) a measure of water extraction by an unmetered well (or group of unmetered wells). Such an imputation engine capability may be utilized by a GMA to either augment or to totally replace the requirement and cost of installing, maintaining and reading physical meters.

A WAMP 150 imputation engine may utilize numerous 'imputation factors' (e.g., computational variables or constants) to derive measurements of a groundwater extraction and/or consumption related to a specific well (or group of wells). Such imputation factors may in part be sourced as data from Sensor(s) 130, External Database(s) 170 and WAMP Database(s) 158. In some embodiments, a WAMP 150 may calibrate and otherwise verify the reliability of imputation engine derived measurements by measuring one or more 'imputation verification wells' with both physical meters and the derived measurement of the WAMP 150 imputation engine. By utilizing imputation verification wells in hydrologically differing areas throughout a GMA's district, a WAMP 150 may be utilized to judge and tune the weighting of a given imputation factor and thereby improve the accuracy of an imputation engine and refine its derived measurements to best suit that particular GMA district. The results of comparisons of imputation verification wells meter readings and imputation engine derived measurements may be recorded in WAMP Database(s) 150 and shared as appropriate with regulators, GMA members and other district stakeholders and thereby build community experience and trust with the GMA and the WAMP 150.

In some embodiments, a imputational factors utilized by a WAMP 150 imputation engine may include but not be limited to:

Evapotranspiration:
   Evapotranspiration data for specific crops in different geographical areas. Note that evapotranspiration data are published and readily accessible by one skilled in the art of agriculture and/or climatology,
   Crops (type) planted at each property,
   Density of plantings per acre (estimated, measured or member reported) for each property,
   Total area of plantings of a given density,
   Area of bare or fallow land (which generally may have a very different evapotranspiration rate)
   Age of trees and plantings (younger growing trees may have different evapotranspiration rates relative to mature trees)
Weather including:
   Precipitation,
   Humidity,
   Wind,
   Temperature,
   Sunshine hours,
   Evaporation (often measured in mm/inches, calculated as the drop in level of standing water in sunshine due to evaporation)
Any evaporation/evapotranspiration mitigation, including greenhouses, indoor hydroponics, and plastic covers (e.g., for ground crops such as strawberries)
Irrigation type:
   Above ground drip,
   Sprinkler,
   Flood,
   Hydroponic,
   Underground drip.

Soil type:
- Clay
- Sandy
- Loam
- Combination of the above types.

Soil moisture/salinity (monitoring devices may measure the water in the soil and also the salinity.) Generally, if the soil is salty, then plants typically need to absorb and transpire more water)

Surface water delivered (e.g., rivers, canals and pipelines)

As needed, farm channel water loss (more applicable when the channels are not adjacent to the crops, since water from adjacent channels tend to seep through the canal walls into the crops, thereby watering them)

Size of property, e.g., total acreage, and

Percentage of property cultivated (planted).

In some instances, a given well may be metered but may lack a telemetry link to a WAMP 150. In some embodiments, such a meter lacking a telemetry link may be read manually and that meter reading data may be uploaded to the WAMP 150. For example, such manually acquired meter reading data may be entered into a template such as a spreadsheet and then uploaded to the WAMP 150—perhaps in comma separated value (CSV) file format.

In some embodiments, a WAMP 150 utilizing Resource Monitor 264 may facilitate a GMA to determine, analyze, manage, regulate, record and report the state of water resources within the GMA's district—particularly groundwater, but also possibly surface water. A GMA may for example report details of its water resources to district members and stakeholders, government regulatory agencies, and interested organizations such as universities and government research organizations.

A WAMP 150 may for instance utilize Resource Monitor 264 to synthesize model(s) of the complex subsurface conditions of a GMA district's groundwater basin. So for example, Resource Monitor 264 may analyze measurements of a groundwater basin to generate one or more three-dimensional aquifer system model(s). Such three-dimensional models may then be utilized by Resource Monitor 264 to simulate and measure complex sub-surface conditions within the basin. So for example, utilizing hydrological assessments made within the basin, Resource Monitor 264 may facilitate a sustainability manager to adjust the basin model to incorporate various macro-level variables (such as maximum sustainable yield, inputs and outputs etc.) so as to determine more widespread effective and efficient sustainable management practices for the basin.

In some embodiments a WAMP 150 may utilize Resource Monitor 264 to maintain sustainable groundwater yields facilitated by WAMP 150 'water balance modeling'. Water balance modeling may analyze and extrapolate groundwater extraction and use data—imputed as well as measured—to analytically project water consumers needs (e.g., the volume of water an irrigator needs to keep his crop alive) and forecast potential future changes in groundwater sustainability. Such modeling is not static, but rather a highly dynamic set of facilities, whereby a sustainability manager may revise models and/or update and filter data sets. Furthermore. Resource Monitor 264 may enable a sustainability manager to compare prior water balance modeling forecasts to the corresponding realized real world outcomes. Such comparison combined with re-running of the water balance modeling with alterations to the modeling algorithm and/or dataset, may facilitate a sustainability manager to evaluate, refine and calibrate WAMP 150 water balance modeling over time so as to get improved forecasts.

In some embodiments, WAMP 150 water balance modeling may be highly scalable—from the entire district down to an individual property or even an individual crop on a portion of one property. In fact, utilizing shared data from additional GMAs or third parties, water balance modeling can be scaled up to a regional, statewide or even global scope. Water balance modeling may be scalable in other ways—a model may span a week, a month, a season, a year or multiple years. For example, data from drought years may be utilized while skipping intervening wetter years. Additionally, datasets utilized for modeling can be set to reflect expected future conditions—perhaps reflecting worst-case climate change scenarios. Multiple incremental changes may be modeled yielding a spectrum of forecasts.

Consider for example a sustainability manager who wants to estimate the change in groundwater extraction resulting from a change in the mix of crops a farmer grows. She can vary the hypothetical crop mix, maturity of trees in orchards, disease conditions, rainfall and climatic conditions and numerous other variables.

In some embodiments, Resource Monitor 264 may integrate economic factors (e.g., crop yields and commodity pricing) into water balance modeling so as to forecast economic consequences of various groundwater extraction and utilization scenarios. For instance, decreasing irrigation per acre of filbert nuts might decrease yields—however a smaller harvest in a tight market might boost prices more than enough to compensate. In addition to experience-based scenario adjustments by a sustainability manager, a WAMP 150 may automatically generate and model millions of scenarios and rank those with exceptional outcomes for review by a sustainability manager.

Resource Monitor 264 may integrate with numerous report generation facilities of a WAMP 150 such that the predictive results of groundwater basin modeling, water balance modeling and/or economic modeling may be quantified in tables of selected data sets and visualized with powerful easy to comprehend graphics. Such an ability to translate results data to information comprehensible by lay-people may be critical to aid GMA stakeholders such as the filbert farmer, the farmer's neighbors, local politicians and community leaders to grasp the scope and urgency of adjusting to changes in groundwater sustainability.

In some embodiments, a sustainability manager may configure Resource Monitor 264 so as to set an action notification or notifications based on comparison of real world measurements to water balance modeling forecasts, such that congruency between the two may be brought to the manager's attention. (See Activity Manager 269 description further below for a discussion of action notifications.)

In some embodiments, Water Accounter 266 may function as associative and analytic nexus for data relating to a GMA's water resource management (e.g., consumption, conservation, regulation and revenue generation)—particularly as relates to groundwater, but possibly as relates to surface water as well. Water Accounter 266 may utilize one or more of WAMP Database(s) 158. Water Accounter 266 may facilitate services related to water consumption, billing and reporting within a GMA's district where such services may be made apparent to a WAMP 150 user via WAMP 150 facilitator(s) 241-246.

Water Accounter 266 may utilize Resource and Physical Plant Database 252, Jurisdiction and Rights Database 251, User Database 254 and Weather and Climate Database 253 to determine water consumption, conservation, water use patterns, availability, distribution, utilization, loss, quality and other water-resource related characteristics for a given GMA district property or member, which may for example be utilized as a source of data for water balance modeling and/or for determining billing rates and/or fees.

Similar to Resource Monitor 264, Water Accounter 266 may in some embodiments of a WAMP 150 utilize an imputation engine capability to measure groundwater consumption from unmetered wells. To conceptually distinguish the two WAMP 150 facilities, Resource Monitor 264 may for example be thought of as relating to the water resources of a GMA's district (e.g., how much water may be there and where, how much may be extracted and what it may be utilized for); whereas Water Accounter 266 may for example be thought of as relating to the water consumption within a GMA's district (e.g., how much water may be being extracted and consumed and who may be consuming it). In some embodiments of a WAMP 150 Resource Monitor 264 and Water Accounter 266 facilities may be logically combined. In fact, grouping and naming facilities of a WAMP 150 as described herein may be intended to aid in understanding of the utility of such facilities as opposed to any specific embodiment.

In some embodiments, a WAMP 150 utilizing Water Accounter 266 may facilitate a GMA to determine, analyze, manage, regulate, derive revenue from, record and report water consumption—particularly of groundwater, but also possibly surface water—on a property-by-property granularity within the GMA's district—but which may additionally be aggregated to give a broader perspective up to and including district-wide.

In addition to utilizing imputation engine capability, Water Accounter 266 may utilize a WAMP 150 shared data access control engine capability. For example for a WAMP 150 utilized by a VGMA, the shared data access control engine may facilitate parallel secure billing facilities with a given such facility—separately configurable and operable by each one of the constituent water management agencies within the VGMA such that they may protect proprietary financial information.

A WAMP 150 Water Accounter 266 may in some embodiments utilize an 'external system interworking engine' capability that may facilitate interoperation with third party systems such as a CRM system and/or a business financials system. So for example, such an external system interworking engine may be utilized by a WAMP 150 to export property-specific fee information to an incumbent business financials system utilized by a GMA. Such a business financials system may for example utilize such property-specific fee information to prepare unified utility bills (e.g., water and electricity) or to calculate taxes or perhaps a revenue split. Similar to an incumbent CRM system, a business financials system may be deeply integrated into the operation of a GMA and GMA staff may be trained on and loyal to such an incumbent business financials system. However, a WAMP 150 may provide unique facilities—for example groundwater extraction fee calculation—that may not be practically performed by such a business financials system. In some instances, Water Accounter 266 may utilize an external system interworking engine to import data from a legacy operation system perhaps on a repetitive basis, for example, to remain current on the status of GMA members' accounts. For example, a WAMP 150 may perhaps utilize an external system interworking engine to overlay a user interface onto a business financials system so as to make it easier for a sustainability manager to navigate back and forth between the VGMA 150 and the legacy business financials system. Or perhaps the data base record definitions of a business financials system may be augmented so as to support the operation of the WAMP 150 and minimize the utilization of a WAMP 150 to manage the production and distribution of bills to a GMA's members. Water Accounter 266 may perhaps utilize data base record definitions compliant with such a business financials system such that member records from such a business financials system may be more easily imported and exported between a WAMP 150 and a business financials system.

In some embodiments, Water Marketer 268 may function as associative and analytic nexus for data relating to a GMA's WAMP-150 facilitated electronic water rights exchange. Water Marketer 268 may utilize one or more of WAMP Database(s) 158 including but not limited to Jurisdictions and Rights Database 291, User Database 294 as well as Resource and Physical Plant Database 292. Additionally, Water Marketer 268 may utilize Weather and Climate Database 293—for example to analyze and predict water demand.

In some embodiments, Water Marketer 268 may facilitate a GMA to create or facilitate a WAMP 150-facilitated water rights exchange for GMA members (and possibly third parties) to utilize to trade water rights on a temporary (i.e., lease) or permanent (i.e., sale) basis. Furthermore, Water Marketer 268 may utilize a WAMP 150 WER registry to pre-validate and record such water rights transfers. Additionally, Water Marketer 268 may automatically enforce water rights trading rules configured by a GMA—for example to encourage groundwater sustainability.

A WAMP 150 in some embodiments may utilize Water Marketer 268 to facilitate a GMA to plan, monitor, analyze, manage and report upon operations of a WAMP 150-facilitated electronic water rights exchange. Water Marketer 268 for example provide GMA configured notifications and alerts when for example an important indicator threshold has been crossed.

In some embodiments of a WAMP 150, Water Marketer 268 may utilize an external system interworking engine capability to facilitate a portal service to external markets. Water Marketer 268 may provide a GMA access to and perhaps share appropriate water rights data with one or more third party water rights market facility (or perhaps commodity exchange(s)). Water Marketer 268 may perhaps facilitate a GMA itself to trade in water rights market(s) or to raise capital based on GMA-owned or regulated water rights assets. Additionally, Water Marketer 268 may provide a GMA visibility into local, regional and/or global markets and may therefore provide support for a GMA's pricing, fee and/or sustainability policies for in-basin water extraction and/or usage.

In some embodiments, a WAMP 150 may utilize a combination of synergistically interworking WAMP 150 facilities to provide easy-to-use powerful services to users of a GMA's WAMP 150. For example, a WAMP 150 may utilize Resource Monitor 264 to model and analyze the GMA's groundwater basin and then utilize Water Marketer 268 to derive trading rules for utilization in a WAMP 150-facilitated electronic water rights exchange—perhaps managing transfers of water extraction rights between properties in different zones. Further by example, 3-D modeling of sub-surface conditions by Resource Monitor 264 may be utilized by Water Marketer 268 to facilitate a sustainability manager to configure various trading regions within the GMA's jurisdiction (and possibly outside that jurisdiction as well) and define corresponding rules which may govern water transfers within and/or between such trading regions.

In some embodiments, Activity Manager 269 may function as associative and analytic nexus for data relating to a GMA's WAMP-150 facilitated operational activities and workflow. Activity Manager 269 may utilize one or more of WAMP Database(s) 158 including but not limited to Workflow Database 295, Jurisdictions and Rights Database 291, User Database 294 and Resource and Physical Plant Database 292. Additionally, Activity Manager 269 may utilize Weather and Climate Database 293—for example to anticipate changes in workflow due to weather and climactic impact on water demand.

In some embodiments, a sustainability manager may utilize WAMP 150 notification facilities, whereby a WAMP 150 may notify a sustainability manager of a requirement for an action. Such an 'action notification' may be scheduled by a sustainability manager, by a WAMP 150 or may perhaps be triggered by an unscheduled event as determined by a WAMP 150. Furthermore, a WAMP 150 may facilitate a sustainability manager to manage action notifications. For example, a sustainability manager may utilize WAMP 150 generated list(s) of pending action notifications as well as action notifications that may have been delivered but perhaps have not yet acted upon.

In some instances, a sustainability manager and/or a WAMP 150 may determine a requirement to take an action or a series of related actions where such a requirement may not be immediate and where in some instances it may be inappropriate to take such action immediately. For example, a farmer may pull a permit to drill a new well, but the action to start monitoring (and perhaps billing for) groundwater extraction by that well may not be taken until the well is completed and placed in service. It is perhaps likely that many action notifications may cause a sustainability manager to communicate and work with GMA members so as to accomplish GMA goals.

In some embodiments, a WAMP 150 may facilitate a sustainability manager to annotate a given action notification to reflect completion of the corresponding action, or other action taken (or perhaps canceled or deferred). Furthermore, a WAMP 150 may facilitate a sustainability manager to inspect, visualize or otherwise comprehend the quantity and nature of pending action notifications. So for example, a sustainability manager may utilize a WAMP 150 calendar displaying date and time and descriptions of scheduled action notifications. In some instances, individual action notifications displayed in such a calendar may be color coded or otherwise marked for importance and/or urgency such that a sustainability manager may anticipate peaks and valleys in his or her pending workload. A WAMP 150 may perhaps set or update the urgency or the importance attributed to a pending action notification; and/or a WAMP 150 facilitate a sustainability manager to do so.

Furthermore, in some embodiments, a WAMP 150 may facilitate a log of delivered action notifications (and any corresponding annotations) that may perhaps be organized to be displayed as a calendar as well. Additionally, a WAMP 150 may facilitate a sustainability managers management of daily tasks by providing a list (or lists) of active action notifications (i.e., action notifications delivered by the WAMP 150, but not yet designated as completed or otherwise deferred or cleared). In this way, a sustainability manager may be facilitated by a WAMP 150 to keep an eye on pending work load, organize day-to-day activity, and also be able to research past activity and determinations by the WAMP 150 and by that sustainability manager and perhaps other GMA staff. In some instances, an action notification may be utilized by a sustainability manager to signal an occurrence that perhaps does not actually require an action by the sustainability manager, e.g., an FYI.

WAMP 150 action notifications may prove to be essential in the operation of a large and/or busy GMA such that staff workload can be visualized and allocated effectively and in a timely fashion. In some embodiments, a WAMP 150 may facilitate a given GMA sustainability manager or other decision maker to direct WAMP 150 assignment and subsequent delivery of an action notification to a sustainability manager or other GMA staff member. In this way for example, a sustainability manager may distribute tasks to subordinates and subsequently utilize the WAMP 150 to monitor the status of those tasks.

In many work organizations, the overall effectiveness of the organization depends on the individual initiative and productivity of workers. Increasingly, organizations expect and facilitate their workers to be self-enabling with the assistance of automated tools such as a WAMP 150. Therefore, in some embodiments a WAMP 150 may be provide facilities that may be custom configured by an individual sustainability manager to best suit his or her work style. A key WAMP 150 facility for managing the day-to-day work of a sustainability manager may be a WAMP 150 dashboard.

In some embodiments, a WAMP 150 may facilitate copying by a sustainability manager of display elements from a given WAMP 150 display page onto that sustainability manager's WAMP 150 dashboard. Furthermore, such a copied display element may be an active display object—perhaps including XML or other active components—such that the copied display may change over time as changes occur to the data displayed by the active display object—as may be understood by one skilled in the art.

In some embodiments, the facilities of a WAMP 150 may be utilized as Software as a Service (SAAS) where the WAMP Server 155 may be owned and operated by a third party providing the "WAMP Service" to GMAs—i.e., as a "cloud service". So for example, the WAMP 150 may be hosted on a fault tolerant WAMP Server 155 in a secure data center in North Dakota, while the GMA customers for the WAMP service may be located in another state—say California. Multiple GMAs may thusly share the same WAMP Server 155. Each GMA's WAMP service may effectively run independently on the shared WAMP Server 155 as if it were a dedicated server. Although utilizing the same server hardware, each GMA's data may be securely protected from accidental or intentional access by another GMA, or by another GMA's property managers and other users, or by a third party. However, for instances of a VGMA, the data for multiple GMAs participating in that VGMA may be accessed and aggregated as appropriate for the purposes of that VGMA with safeguards and restrictions on data access and data utilization by a WAMP 150 shared data access control engine as described previously. Additionally, data may be exported from a given GMA's WAMP Database(s) 158 and imported to another GMA's WAMP Database(s) 158—perhaps both on the same WAMP Server 155—in instances when both such GMAs have appropriately configured such an exchange of data.

The following discussions and references to figures are provided to illustrate a set of exemplary scenarios for some embodiments of a WAMP 150. The examples may include particular limitations which are unique to the given example and are not intended to extend to the invention as a whole. Likewise, some examples may have been simplified in order to aid in clarity. It is understood that while the foregoing examples aid in explanation and clarification of the present invention, these examples do not limit the scope or function of the present invention.

In some instances, graphic representations with the appearance of screenshots from a personal computer terminal screen may be provided by way of example to aid in the illustration of some embodiments. This is not intended to imply that personal computer terminals are preferred to the exclusion of other terminal device types. The exemplary display screen narrative that follows may exemplify the experience of a sustainability manager user. Other user types may access displays appropriate to their use and to their terminal devices; and therefore such displays may potentially differ in appearance and facilities from those displayed to a sustainability manager.

So, to provide an exemplary utilization of a cloud-accessible WAMP 150, let us consider a hypothetical sustainability manager-Wally Watermaster—who works for the Water Agency of Rogers Meadow (WARM), a California GMA.

Figure 3:
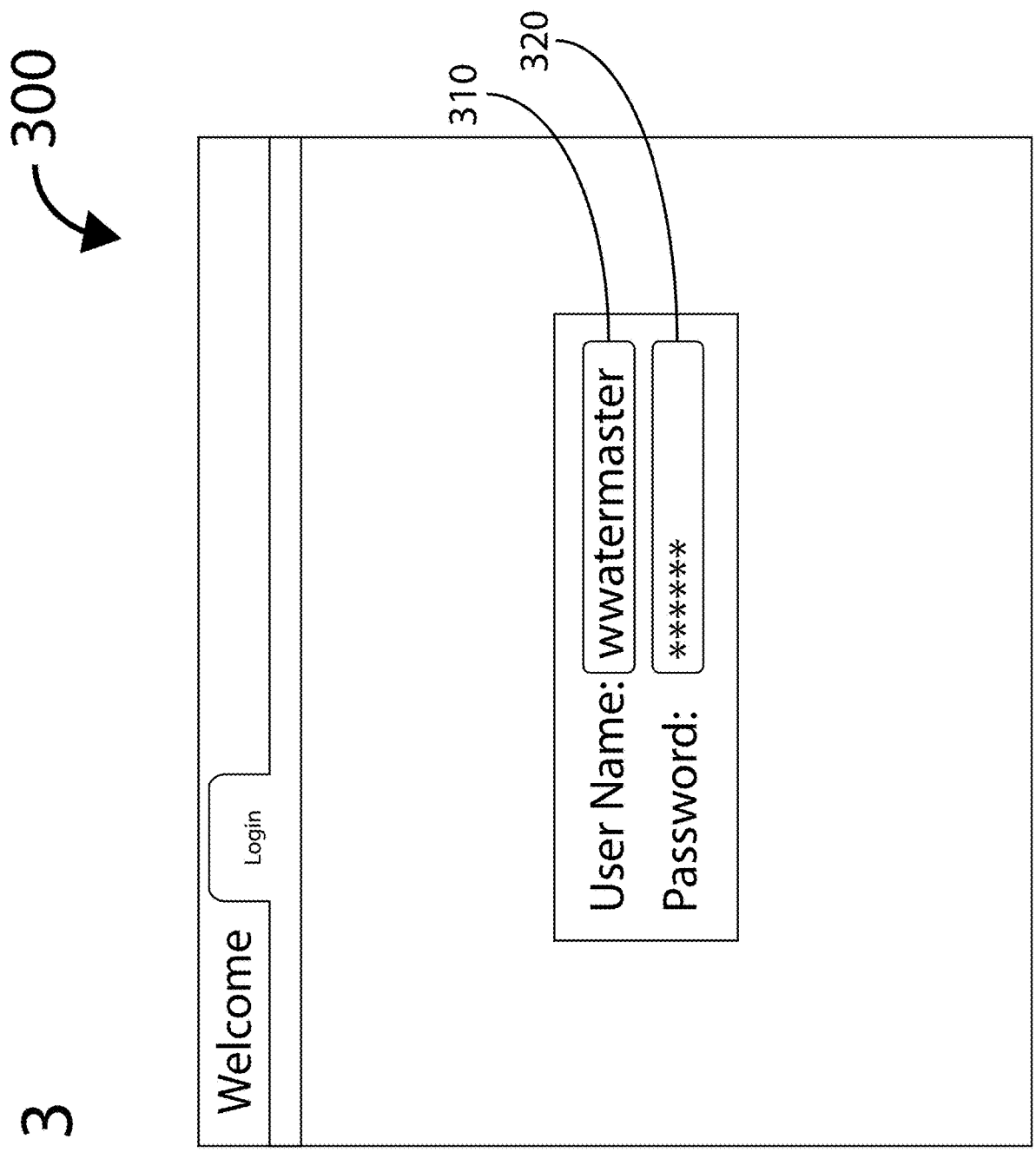
FIG. 3 is an exemplary screen image illustrating the sustainability manager experience of a WAMP Login display page for the embodiment of FIG. 1.

Referring to FIG. 3, Wally sits at a laptop computer (i.e., a WAMP terminal 112) and navigates to a log-in page of a WAMP 150. Wally logs into the WAMP 150 using his username 310 and login password 320. Upon logging in, the WAMP 150 validates Wally's username and login password, which has been correctly entered.

Figure 4:
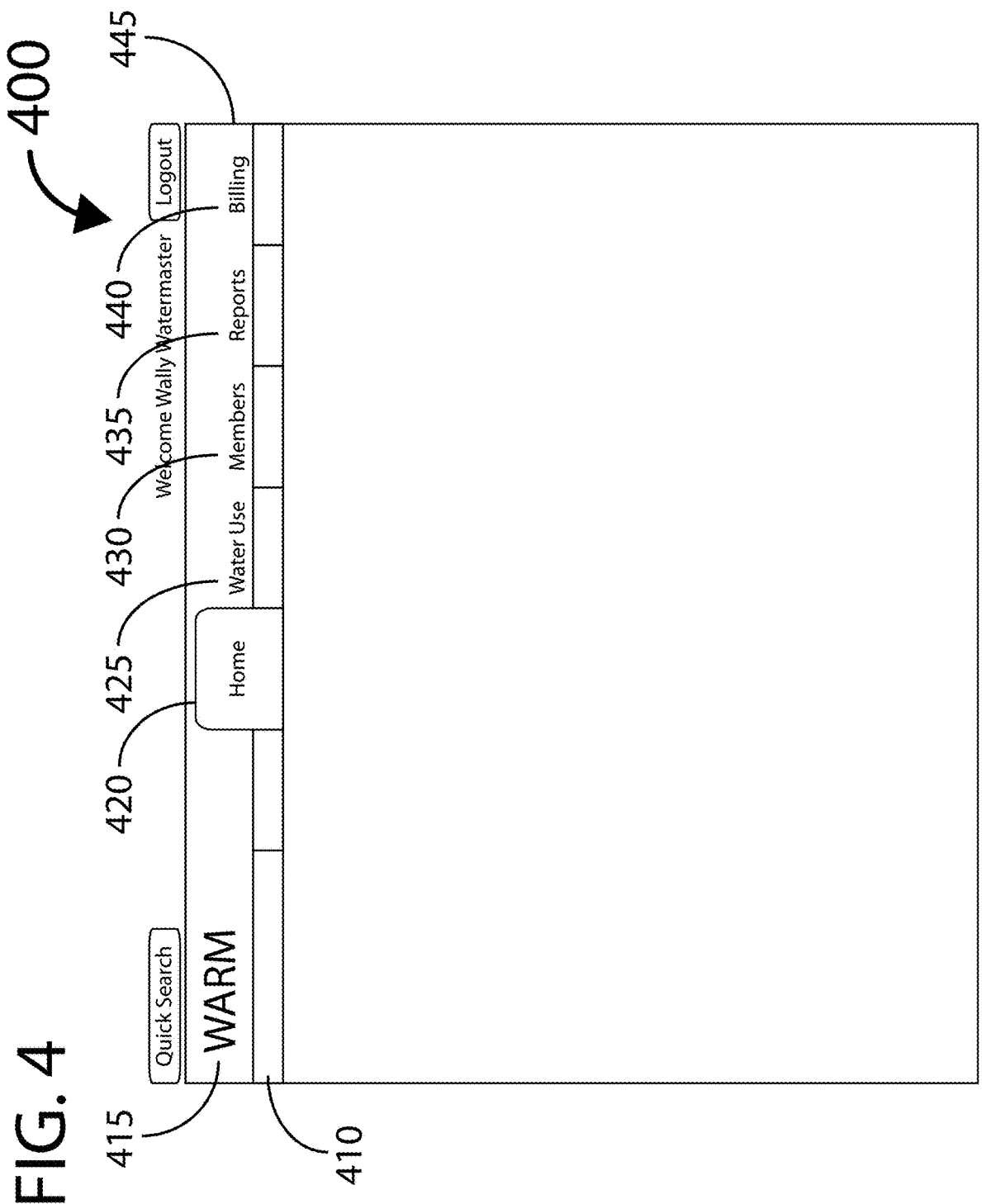
FIG. 4 is an exemplary screen image illustrating the sustainability manager experience wherein a generic WAMP display page layout is depicted for the embodiment of FIG. 1.

Referring to FIG. 4, this generic WAMP 150 display page 400 provides an example of the design template for most display pages of a WAMP 150. Such a WAMP 150 display page design template may be custom configured for a given GMA—e.g., for Water Agency of Rogers Meadow—and may even have the GMA's logo 415 at the top corner of the display pages.

Along the top of the generic display page 400 may be a navigation menu tray 445 with a set of navigation menu tabs 420-440—the first in a set of hierarchically navigated menus. Each such navigation menu tab may be 'clicked' (i.e., selected) to navigate to a corresponding family of related display screens. The Home tab 420 may be used to navigate to a WAMP 150 display page in the Home page family (see FIG. 5 below). Other navigation menu tabs may navigate to families of display pages corresponding to facilitator(s) of an embodiment of a WAMP 150 (as shown in square brackets below). The additional navigation menu tabs may include [and navigate to]:

Water Use tab 425->[Water Rights Registry Facilitator (WRRF) 241 and Transfer and Market Facilitator (TMF) 245],
Members tab 430->[Relationship Management Facilitator (RMF) 242],
Reports tab 435->[Basin/sub-basin Reporting Facilitator (BRF) 243], and
Billing tab 440->[Basin/sub-basin Billing Facilitator (BBF) 244].

A Groundwater Management Agency Formation Facilitator (GMAFF) 246 may perhaps lack a navigation menu tab on such a screen top navigation menu tray. A GMAFF 246 may be utilized for configuration and bring-up of a WAMP 150 and may be inappropriate for day-to-day utilization. Furthermore, a GMAFF 246 may potentially re-configure operation of a WAMP 150 and/or WAMP Database(s) 158 and therefore access to a GMAFF 246 may need to be carefully controlled and limited. So for example, a GMAFF 246 may be accessed utilizing a privileged log-in as may be well understood by one skilled in the art.

Below the navigation menu tray 445 may appear a submenu tray 410 that may facilitate additional granularity in navigation selection (i.e., the next level down in the hierarchically navigated menus). Submenu tabs (not shown) populating a submenu tray 410 may vary depending on the navigation menu tab selected above. Additionally, within some display pages, a sub-submenu tray (not shown) may appear below a submenu tray (i.e., providing a third level in the hierarchically navigated menus). Sub-submenu tabs (not shown) populating a sub-submenu tray (not shown) similarly may vary depending on the navigation menu tab and submenu tab selected above. Furthermore, submenu tabs (not shown) and/or sub-submenu tabs (not shown) populating a given tray may vary corresponding to the set of display functions of the given WAMP 150 display pages to which they facilitate navigation.

In some embodiments, a sustainability manager clicking on a given navigation menu tab (i.e., 420-440) may automatically cause the WAMP 150 to display the WAMP 150 display page previously selected by the sustainability manager utilizing that navigation menu tab. So for instance, a sustainability manager may be able to "bounce" back and forth between WAMP 150 display pages simply by clicking on the corresponding navigation menu tab.

Furthermore, in some embodiments, a sustainability manager may "double-click" (i.e., click twice quickly in succession) on a given tab (e.g., navigation menu tab, submenu tab or sub-submenu tab) which may automatically cause the WAMP 150 to display a pre-selected WAMP 150 display page where such a pre-selection may be a WAMP 150 default or may perhaps be user-configured by the sustainability manager.

Figure 5:
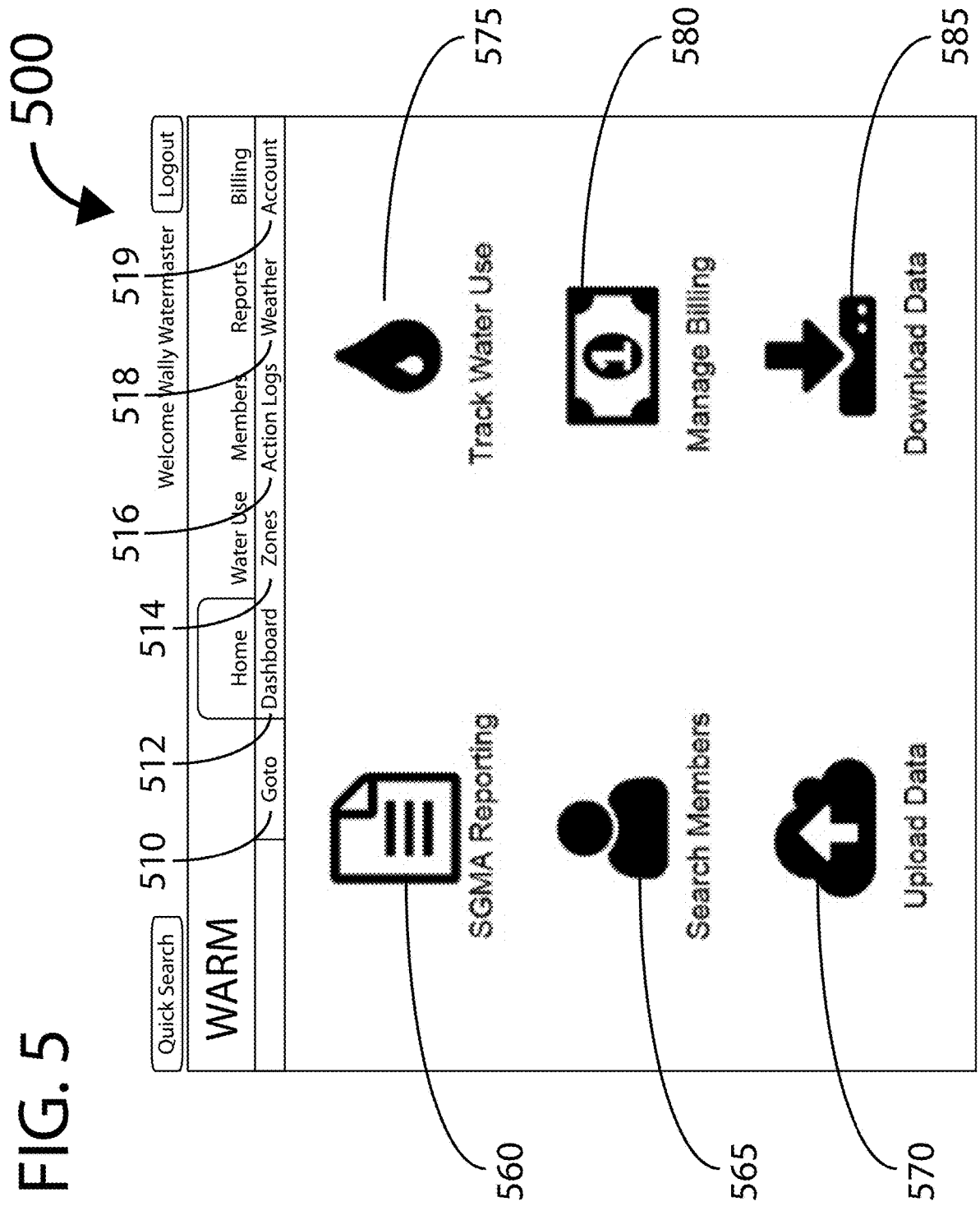
FIG. 5 is an exemplary screen image illustrating the sustainability manager experience of a WAMP Goto display page for the embodiment of FIG. 1.

Referring to FIG. 5, WAMP 150 displays Goto display page 500. In addition to the Goto submenu tab 510 which selects for Goto display page 500, additional submenu tabs arrayed along the submenu tray may navigate when clicked to WAMP 150 display pages with the following functions in square brackets:

Dashboard submenu tab 512->[selects WAMP 150 user-configurable display page which may include news and information about groundwater in California, individual member data, water supply data, weather information as well as relevant water agency information (meeting schedules, gatherings, teach-ins, etc).],
Zones submenu tab 514->[selects WAMP 150 display page for managing portions of the GMA district by zones],
Action logs submenu tab 516->[selects WAMP 150 display page for tracking and updating statuses of actions created by and/or assigned to sustainability managers],
Weather submenu tab 518->[selects WAMP 150 display page for obtaining weather information and related impacts on water supplies], and
Account submenu tab 519->[selects WAMP 150 display page for managing a sustainability manger's account including customizing WAMP 150 display pages].

A WAMP 150 Goto display page 500 may display 'quick navigation icons' representing clickable links that a sustainability manager user may click to navigate directly (and therefore quickly) to a specific display page. In some embodiments, a WAMP 150 may facilitate a sustainability manager user to create a customized Goto display page 500 with quick navigation icons configured by that user. In other embodiments, a WAMP 150 may facilitate configuration of a Goto display page 500 that may appear the same for all sustainability manager users. In some embodiments of a WAMP 150, a Goto display page 500 may have a default configuration of quick navigation icons.

In some embodiments, in instances where the number of quick navigation icons is too many to easily display on a screen (particularly a small mobile device screen), a Goto display page 500 may provide a scroll bar (not shown) to access extended portions of the display page that may not be immediately visible on the users display device screen as may be familiar to one skilled in the art.

In this exemplary FIG. 5, Wally's Goto display page 500 displays six quick navigation icons:

SGMA Reporting icon 560,
Search Members icon 565,
Upload Data icon 570,
Track Water Use icon 575,
Manage Billing icon 580, and
Download Data icon 585.

Wally has been contacted by one of his members, Grace Naito. Grace told Wally that she and her brother Tom intend to plant several hundred acres of new alfalfa on previously fallowed land. Wally is concerned about the impact these new plantings will have on water demand relative to supply. He decides to investigate. The WAMP 150 so Wally clicks the Track Water Use quick navigation icon 575.

Figure 6A:
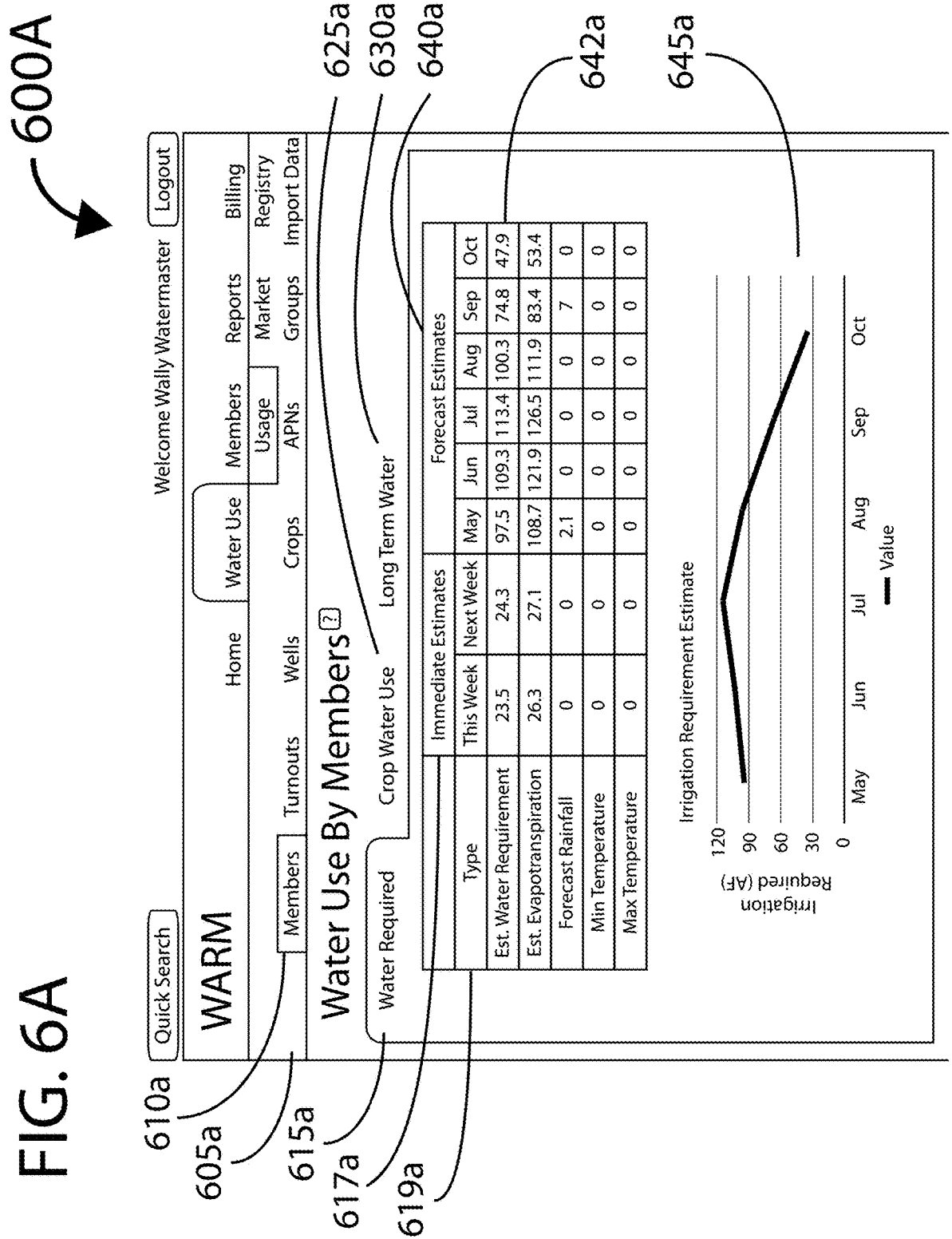
FIGS. 6A, 6B and 6C are portions of an exemplary screen image illustrating the sustainability manager experience of a WAMP Water Use by Members display page for the embodiment of FIG. 1.
Figure 6B:
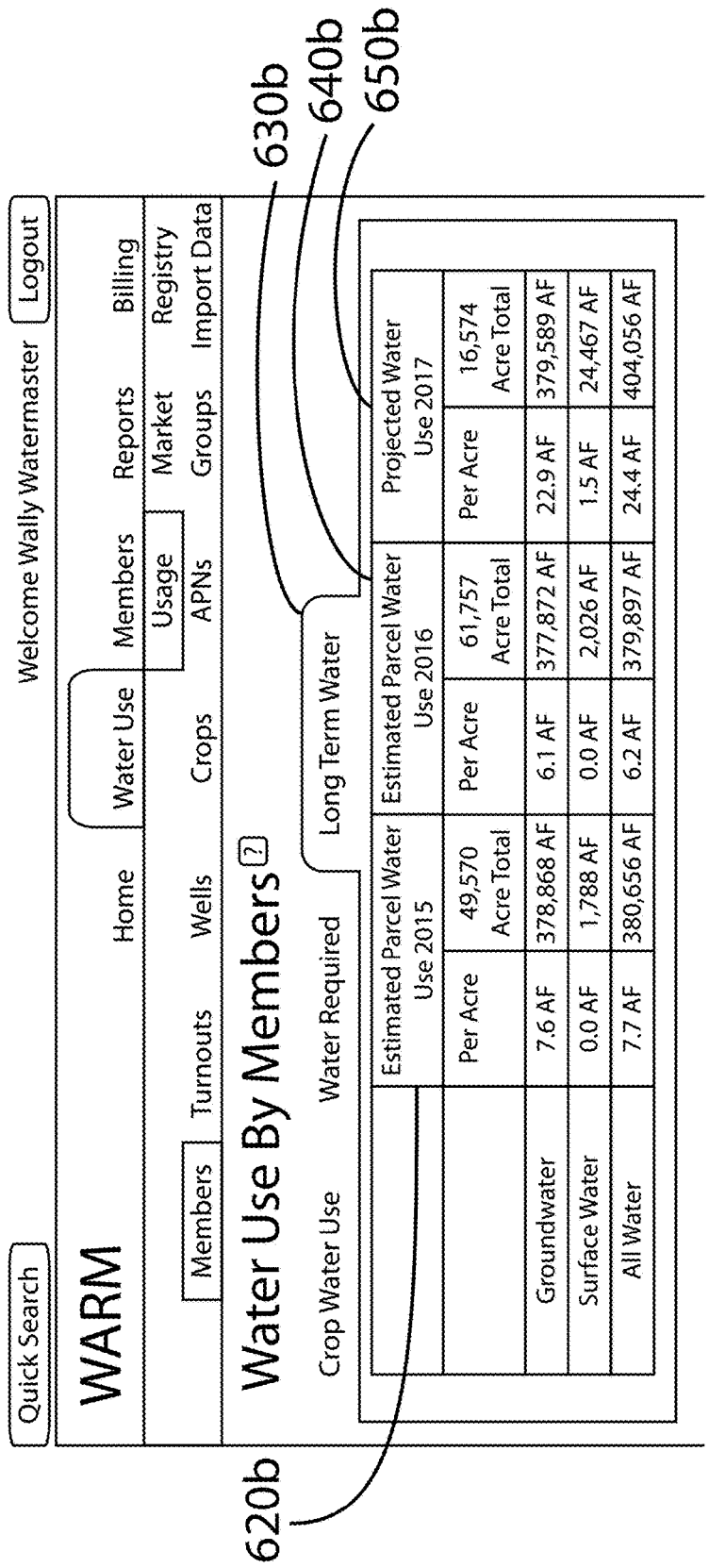
Figure 6C:
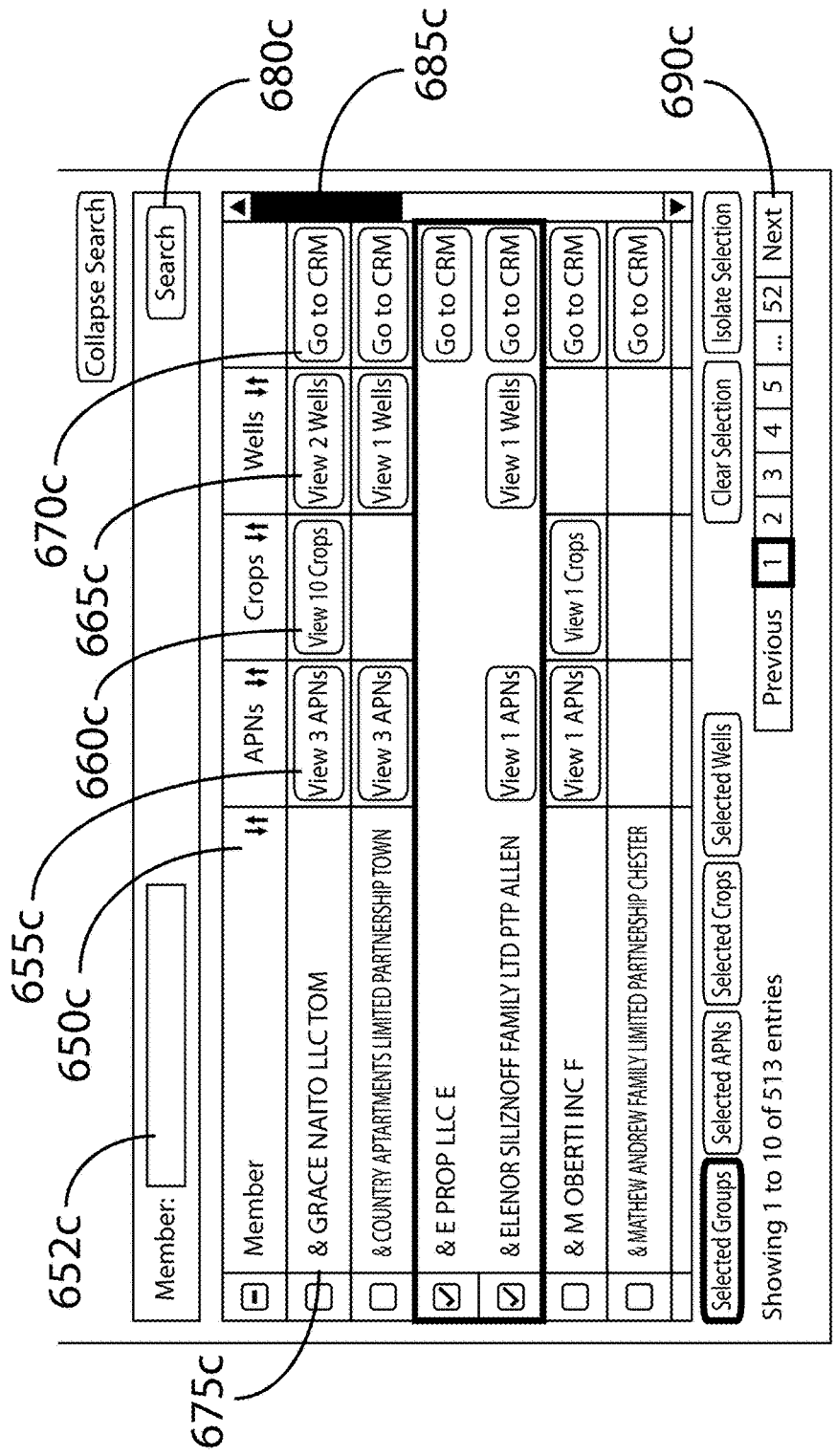

Referring to FIGS. 6A, 6B and 6C, WAMP 150 displays Water Use by Members display page 600A/600B/600C. FIG. 6A shows the upper portion of the page 600A (FIG. 6B shows an alternative upper portion 600B and FIG. 6C shows the lower portion 600C). Utilizing sub-submenu tray 605a in FIG. 6A, Wally may select from a number of different types of water use including: Members 610a (currently selected), Turnouts, Wells, Crops, APNs (i.e., assessor's parcel numbers), Groups or Import Data—each resulting in a different display page displaying WAMP 150 measurement and modeling of water use. Each water use type may utilize a different filter(s) to examine segments of water use determining the district's water balance as scalably modeled for the GMA's district by the WAMP 150.

So, for example, a sustainability manager can scale (not shown) water balance modeling to a scope larger than the GMA's district—i.e., multi-district, regionally or even potentially globally. On the Goto page 500, the Upload Data 570 and Download Data 585 quick navigation icons select facilities to exchange WAMP 150 data with other water agencies' WAMP 150s and/or External Database(s) 170 so as to facilitate such larger water balance modeling scalability.

Referring further to FIG. 6A, in this example, the Member sub-submenu tab 610a has been selected. The Water Use by Members display page 600A/600C that Wally is viewing provides several display options selectable by display option tab. In this example, the Water Required Table 615a has been selected. Other display option tabs are visible which include: Crop Water Use (i.e., by crop) 625a and Long Term Water (use) 630a. The Water Required table 615a has two columns: Immediate Estimates 617a and Forecast Estimates 640a. The Water Required table 615a has labeled rows 619a that include: Estimated Water Requirement, Estimated Evaporation, Forecast Rainfall, Minimum Temperature and Maximum Temperature. The Forecast Estimates column 640a has sub-columns for the months May through October. The Irrigation Requirement Estimate graph 645a displays a visual representation of the estimated water requirement (in acre feet) for the months May through October corresponding to sub-row 642a.

Referring to FIG. 6B, an exemplary alternative upper portion of the Water Use By Members page is displayed. Alternative upper portion 600B displays Long Term Water table 630b, which shows historical and forecasted groundwater vs. surface water use by member. Long Term Water table 630b has three columns: Estimated parcel water use 2015 (i.e., for prior year) 620b, Estimated parcel water use 2016 (i.e., for current year) 640b and Projected water use for 2017 (i.e., the coming year) 650b.

Referring to FIG. 6C, the lower portion of the Water Use By Members page is displayed. Lower portion 600C displays a table of GMA members 650c with water use quantified corresponding to several different characteristics: APNs, Crops and Wells. Other than in a trivial application, the GMA members table may be windowed so as to display a subset of members wherein the window can be adjusted to different areas of the GMA members table in a fashion that allows any given portion of the table to be visibly displayed. Several mechanisms are provided for positioning the table window including a member search 652c/680c, a slider 685c and a paging control panel 690c. Such windowing of a large table (or other large display) is a technique well understood by one skilled in the art.

Scanning through the displayed portion of the GMA members table 650c, Wally takes a closer look at the entry for GMA member Tom & Grace Naito LLC 675c, which like each such entry has several table fields. The APNs field 655c shows that the LLC owns 3 properties in the GMA's jurisdiction (i.e., 3 APNs). The Wells field 665c shows that the LLC has 2 wells. Wally surmises that two of the properties may be adjacent and share a well. But what catches Wally's eye and makes him curious is the number of crops—10—shown in the Crops field 660c. Wally wonders what the crops are and how they affect water use. Wally is also interested in knowing more about Tom & Grace Naito LLC and is tempted to click the Goto CRM field button 670c to look at the LLC's member data, but he decides instead to click the View 10 Crops button in field 660c and look at their water use by crop.

Figure 7A:
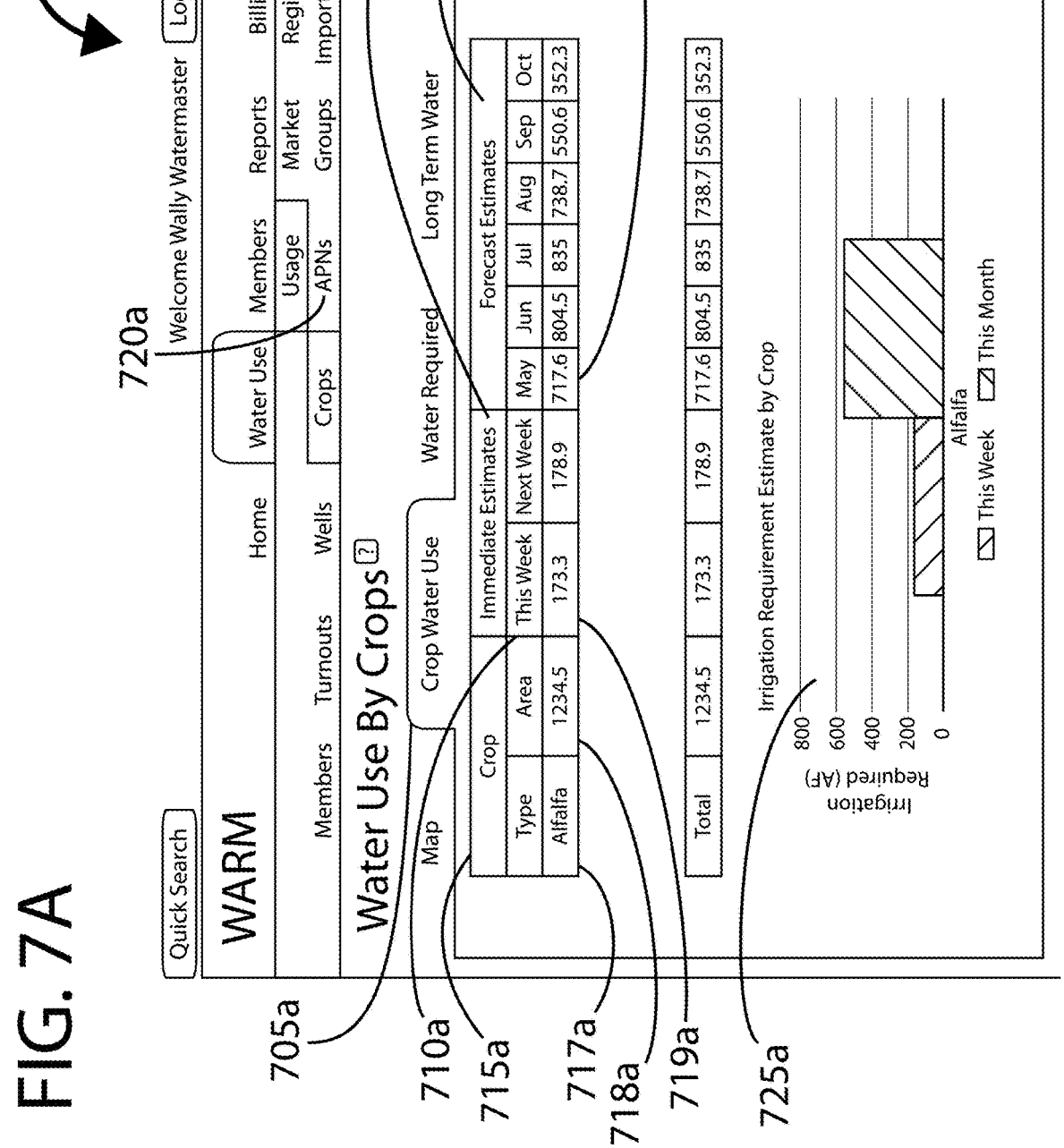

Referring to FIGS. 7A and 7B, WAMP 150 displays Water Use by Crops display page 700A/700B. FIG. 7A shows the upper portion of the page 700A (and FIG. 7B shows the lower portion 700B). The Water Use by Crops page 700A/700B offers several display options selectable by display option tab. In this example, the Crop Water Use Table 705a has been selected. Other display options tabs are visible that include: Map, Water Required and Long Term Water (use). The Crop Water Use Table 705a has three major columns: Crop 715a, Immediate Estimates 730a and Forecast Estimates 740a. Under Crop 715a, the table indicates the type is Alfalfa 717a and the area (of alfalfa) is 1234.5 (acres) 718a. Under Immediate Estimates 730a, the table shows estimated water use for This Week is 173.3 (acre-feet) 719a and under Forecast Estimates 740a the estimate for the month of May is 717.6 (acre-feet) 745a. Below Crop Water Use Table 705a, a corresponding graph 725a visually represents estimated water use for the week and the month—corresponding to water use estimates 719a and 745a respectively. These real-life water use numbers for alfalfa can be used to estimate the water use of the Naito's new alfalfa. Even if the Naitos were not already growing alfalfa, water use figures for a neighbor's alfalfa might be used instead.

Referring to FIG. 7B, the lower portion of the Water Use By Crops display page is displayed. Lower portion 700B displays a table 750b of GMA members producing the same crop as quantified in the Crop Water Use Table 705a in upper portion of the Water Use By Crops display page 700A—i.e., Alfalfa in this example. Each table entry includes information about a member producing that crop including: Member, APN, Crop, Acres, Plant (date) and Pull (date). The first entry 755b in the table 750b is for Tom & Grace Naito LLC. The number of entries 760b in table 750b is 311. Therefore the display size of table 750b is not large enough to display all the entries at once. A slide control 780b is provided to window the table 750b. A paging control panel 790b is provided as well.

Referring again to FIG. 7A, Wally clicks on the APNs sub-submenu tab 720a to have a look at Water Use by APNs for Tom & Grace Naito LLC.

In this example, Wally does not need to type in the APN because WAMP 150, in some embodiments, automatically determines the APN for Tom & Grace Naito LLC (based on prior View 10 Crops selection 660c) and displays the corresponding data.

Referring to FIGS. 8A and 8B, WAMP 150 displays Water Use by APNs display page 800A/800B. FIG. 8A shows the upper portion of the page 800A (and FIG. 8B shows the lower portion 800B). The Water Use by APNs display page 800A/800B offers several display options selectable by display option tab. In this example, the Crop Water Use Table 810a has been selected. Other display options tabs are visible that include: Map, Water Required and Long Term Water (use). The Crop Water Use Table 810a has the same organization as the Crop Water Use Table 705a in FIG. 7a—however, instead of displaying data for one selected crop, the table 810a contains entries for each of the crops grown on the property corresponding to the selected APN (not shown)—in this example, APN 023-230-004 for Tom & Grace Naito LLC. The display size of the Crop Water Use Table 810a is not large enough to display all the table entries at once. Therefore, a slide control 845a is provided to window the table 810a (as described previously for table 650b in FIG. 6B). Just below the Crop Water Use Table 810a is a corresponding bar graph 820a that visually represents estimated water use—both for the week and for the month—corresponding to each crop entry in the Crop Water Use Table 810a—in this example, 10 crops. This graph gives Wally a good overview of the crops Tom & Grace Naito LLC have selected and how much water use may be associated by the WAMP 150 with each of those crops.

Referring to FIG. 8B, the lower portion of the Water Use By APNs display page is displayed. Lower portion 800B displays a table 850b of GMA members producing the same crops as quantified in the Crop Water Use Table 815a in upper portion of the Water Use By APNs display page 800A—i.e., 10 crops in this example. Each table entry includes information about a member producing one of those crops including: Member, APN, Crop, Acres, Plant (date) and Pull (date). The first entry 855b in the table 850b is for Tom & Grace Naito LLC. The number of entries 860b in table 850b is 947—more than can be displayed practically at once. A paging control 890b and/or a slide control 880b provide display windowing controls for the table 850b.

Figure 9A:
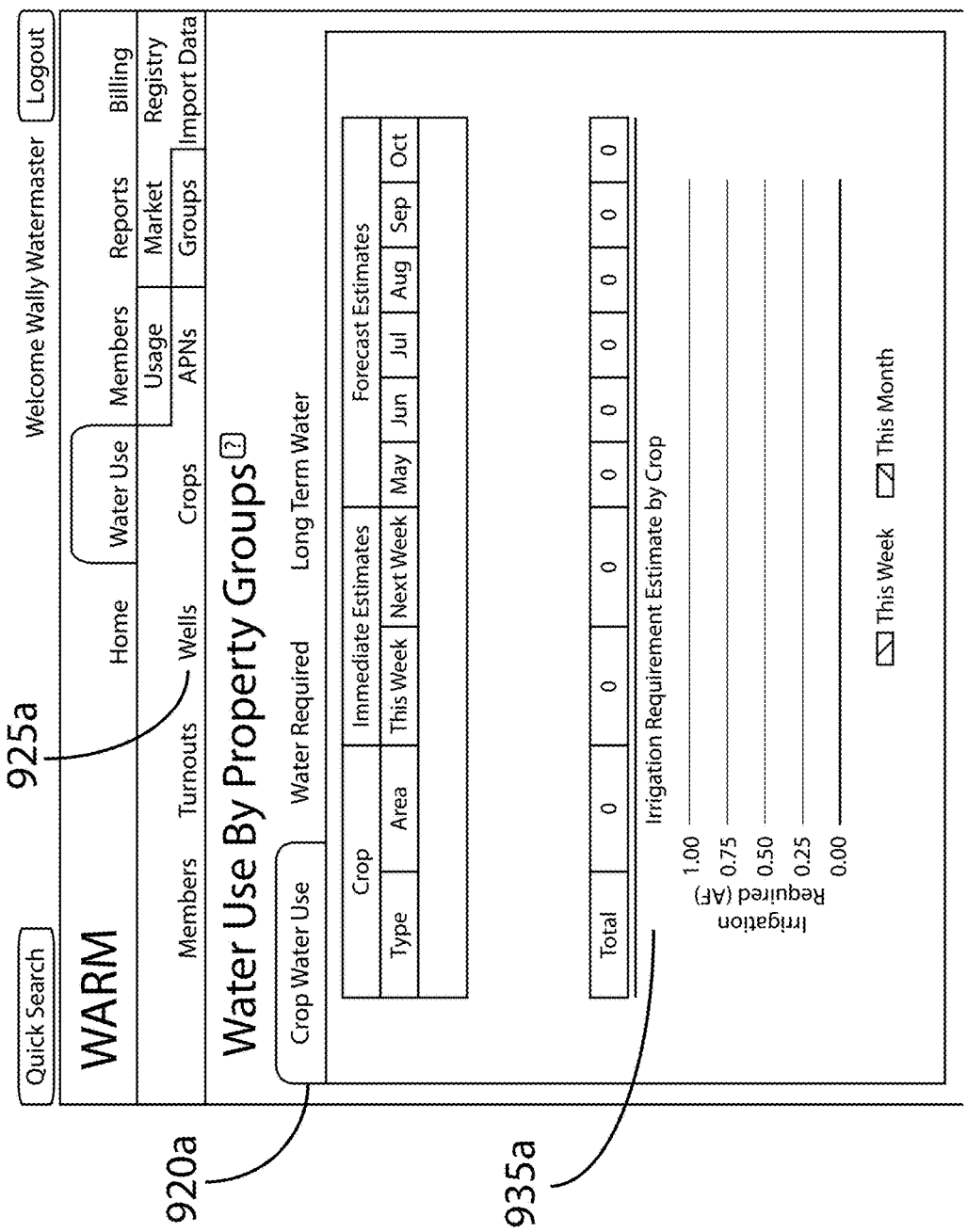
FIGS. 9A and 9B are upper and lower portions (respectively) of an exemplary screen image illustrating the sustainability manager experience of a WAMP Water Use by Property Groups display page for the embodiment of FIG. 1.
Figure 9B:
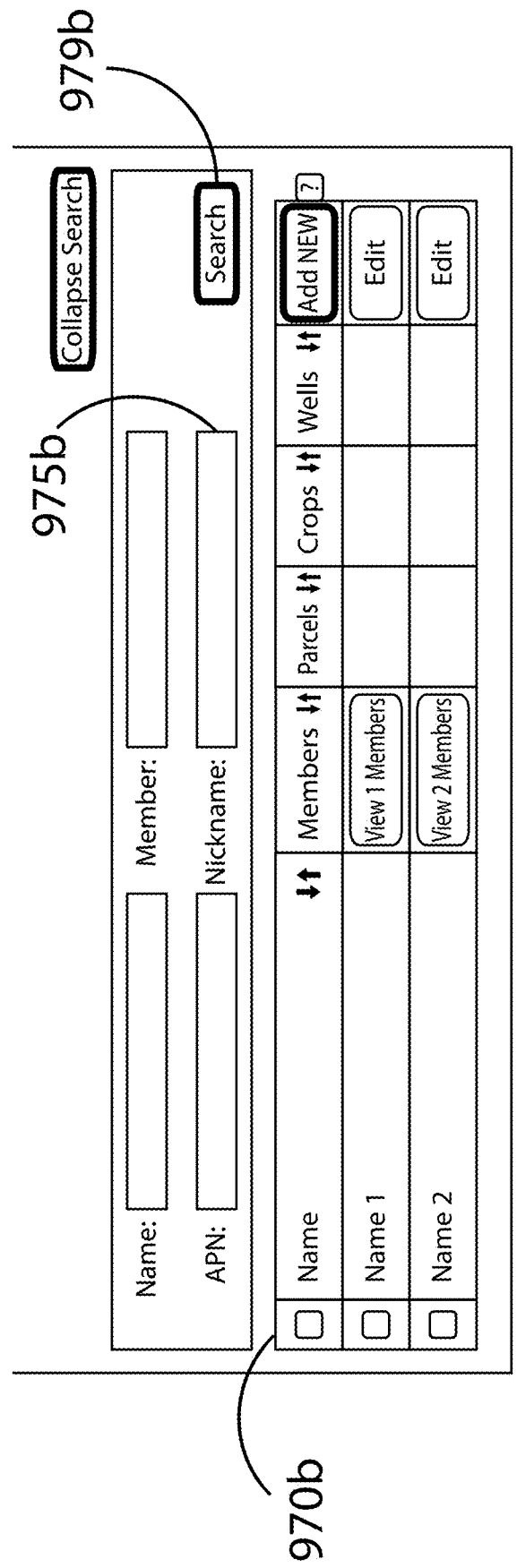

Referring again to FIG. 8A, Wally clicks on the Groups sub-submenu tab 825a to navigate to the Water Use by Property Groups page 900A/900B shown in FIGS. 9A and 9B. Wally knows that the Naitos share use of their wells with two other farmers and he is thinking about creating a property group including Tom & Grace Naito LLC's properties and those two other farmer's properties. The group—perhaps named "Naito's well users"—may allow Wally to conveniently pull water use reports for all the properties using the Naito's wells.

Referring to FIGS. 9A and 9B, WAMP 150 displays Water Use by Property Groups display page 900A/900B, which shows data for a given property group created by a sustainability manager. Such a property group may include any set of property accounts a sustainability manager chooses. In essence property groups provide a sustainability manager a highly adaptable and convenient mechanism to associate properties. FIG. 9A shows the upper portion of the Water Use by Property Groups display page 900A (and FIG. 9B shows the lower portion 900B). The Water Use by Groups display page 900A/900B is organized very similar to the preceding water use pages. As with those pages, the Water Use by Groups display page 900A/900B offers several display options selectable by display option tab. In this example, the Crop Water Use Table 920a has been selected. Other display options tabs are visible that include: Map, Water Required and Long Term Water (use). The Crop Water Use Table 920a is organized with the same columns as the Crop Water Use Table 615a utilized in the Water Use by Members display page 600a. However, the entries in the table 920a in this instance are for the crops grown on the properties in the selected property group. And again, similar to Water Use by Members Page 600a, a graph 935a is displayed below the Crop Water Use Table 920a that visually presents the weekly and monthly water use estimates displayed in table 920a. In this instance the Crop Water Use Table 920a and the corresponding graph 935a are not populated because Wally has not yet selected a property group to display.

Referring to FIG. 9B, the lower portion of the Water Use By Property Groups page is displayed. Lower portion 900B displays a table 970b of GMA members. Wally can display information for the set of properties in a given property group by entering the property groups' nickname in the search window 975b and then searching for it by clicking Search button 979b. Other search options are supported for table 970b including: by (Group) Name, by Member (name) and by APN. In some instances, a Property Group may correspond to a single member, for example a farmer who incorporates a portion of his farm for liability protection might be Property Group: "Fred Smith Farms Corporation".

Figure 10:
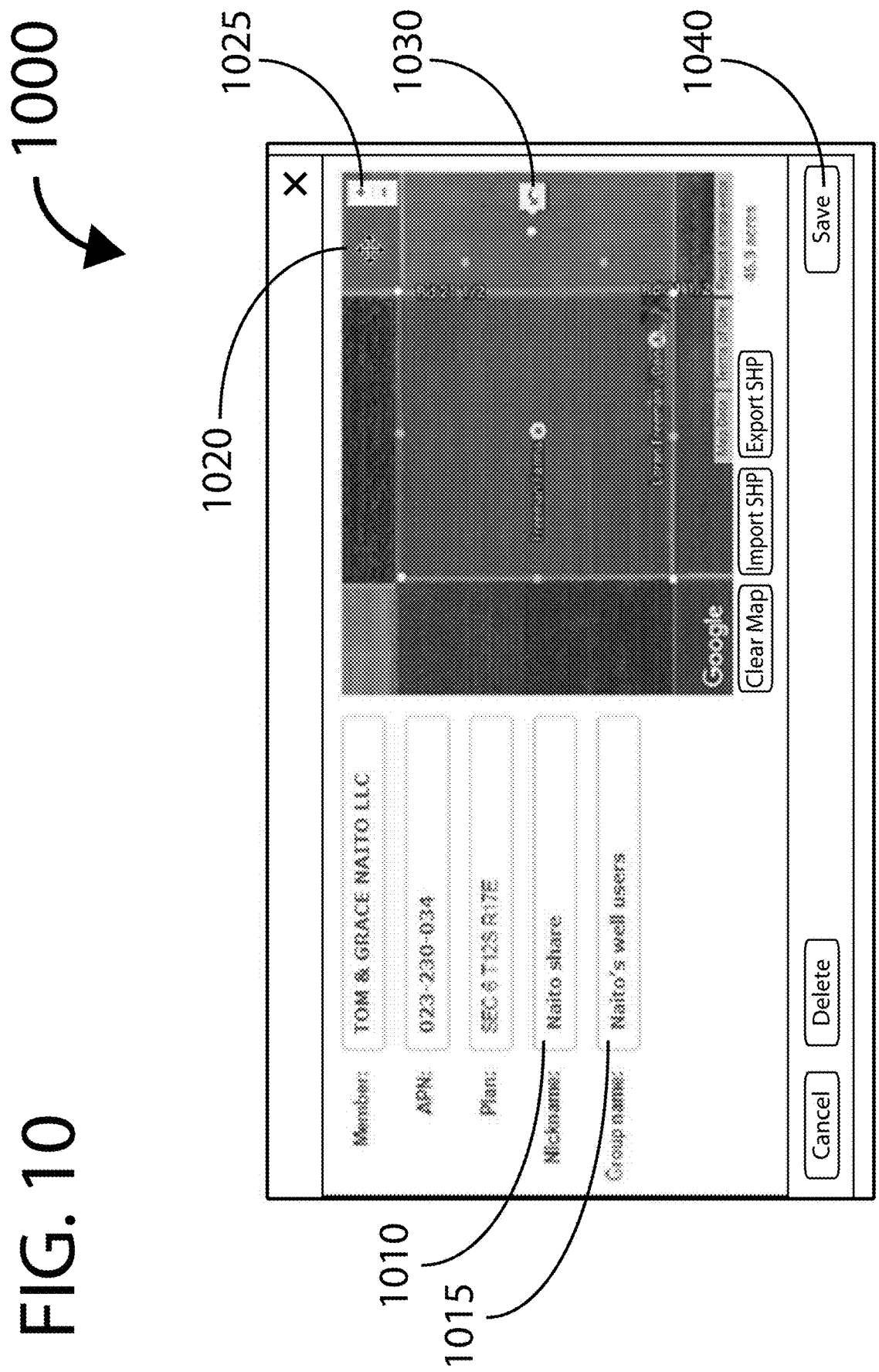
FIG. 10 is an exemplary screen image illustrating the sustainability manager experience of a WAMP property group associating subpage for the embodiment of FIG. 1.

Referring to FIG. 10, Wally decides to create a new property group for the Naitos and their neighbors sharing water from the Naitos' wells. The boundary mapping tool 1000A provides Wally a convenient way to select the properties to include in the new property group. Wally starts by bringing the Naito's property up in the tool's map image. A mover 1020 and magnifier 1025 may be used to position and zoom respectively. Additionally, once the additional properties are selected, Wally may click on, view and edit (not shown) property information for any property in the property group. So using the tool 1000A, Wally locates and outlines the Naitos' and the well sharing neighbors' properties 1030. He then types the new nickname—"Naito Share"—into the Nickname box 1010 and the new group name—"Naito's well users" into the Group name box 1015. He saves the new property group by clicking the Save button 1040. The WAMP 150 automatically associates the information for the included property accounts with the new property group. So next time, Wally can now check out the water use for all the properties at once using Water Use by Property Groups page 900A/900B and the property group nickname: Naito Share.

Wally is curious about some of the other wells on properties bordering the Naitos. Referring again to FIG. 9, Wally clicks Wells sub-submenu tab 925a.

Figure 11A:
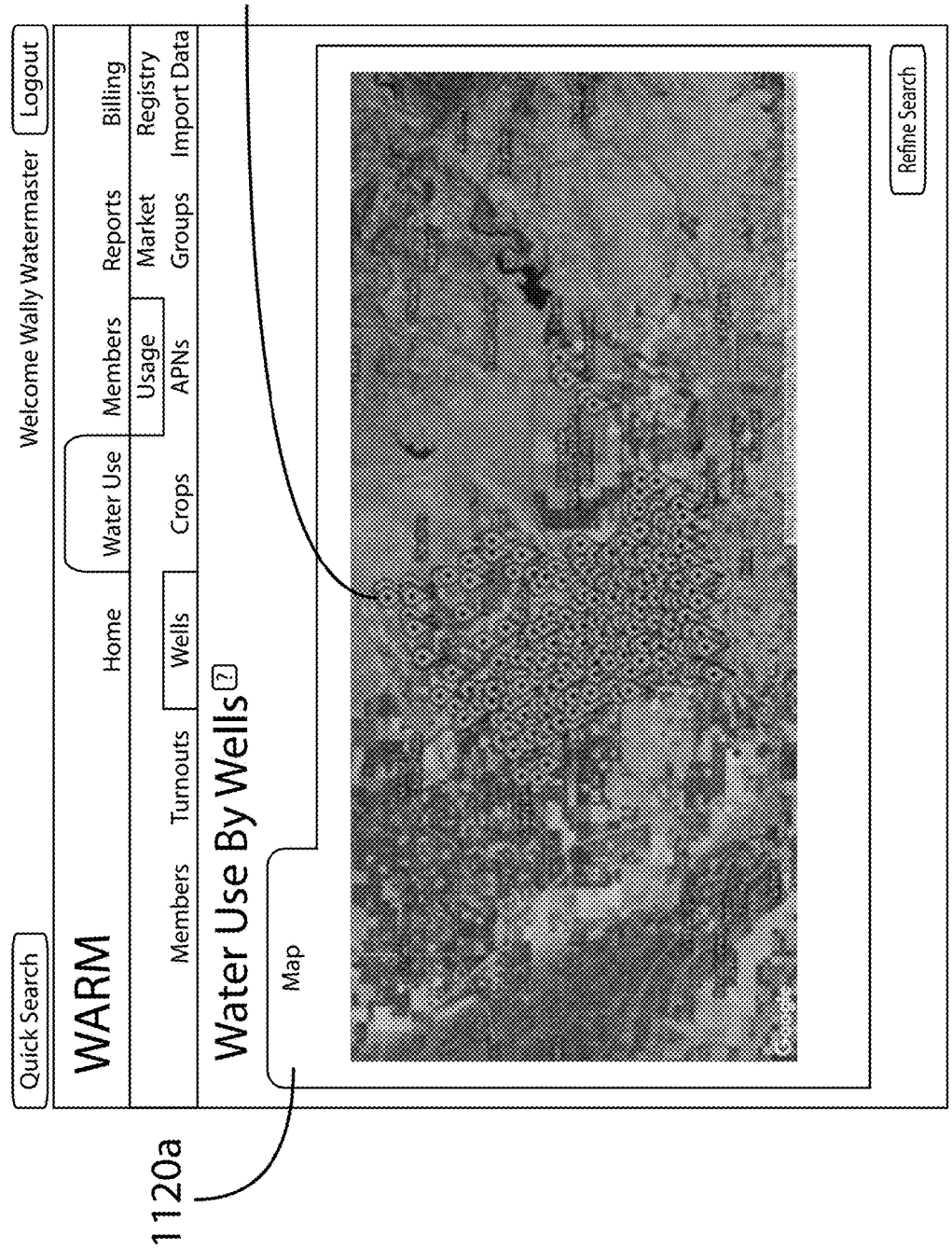
FIGS. 11A and 11B are two views of an exemplary screen image illustrating the sustainability manager experience of a WAMP Water Use by Wells display page for the embodiment of FIG. 1.
Figure 11B:
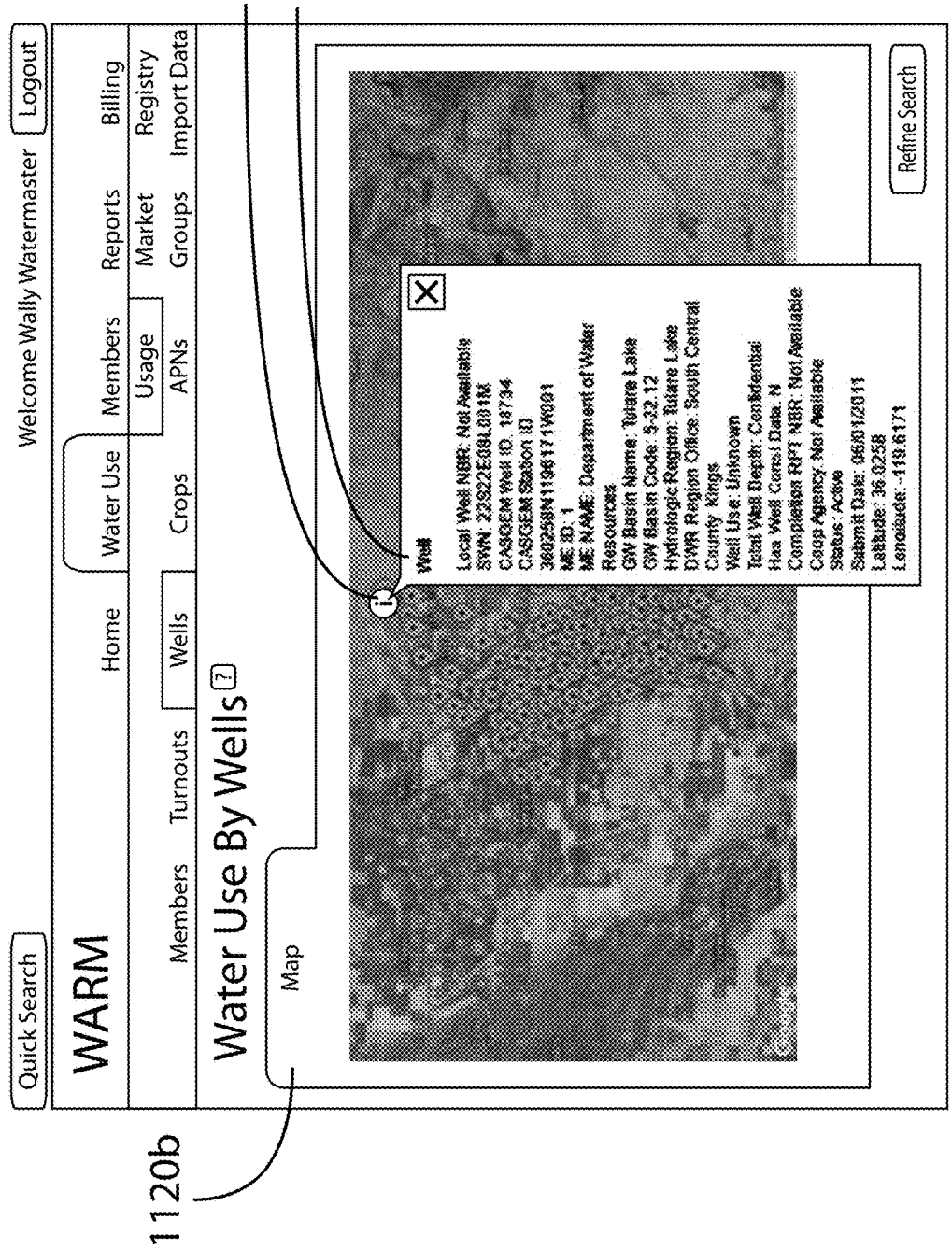

Referring to FIGS. 11A and 11B, WAMP 150 displays the Water Use by Wells display page 1100A/1100B, which displays a user-scalable aerial map of district wells 1120a/b. As shown in FIG. 11A, the map 1120a is scaled to show a district-wide view. Wally can use the WAMP 150 to narrow the view to show just the properties immediately adjacent to the Naitos or to just one property (not shown). Each "Well Balloon" on the map 1120a/b indicates the location of a well—for example Well Balloon 1140a/b. Each Well Balloon is a clickable link. Referring to FIG. 11B, clicking on Well Balloon 1140a/b causes the WAMP 150 to display information about that well 1160*b* as well as property account (and/or property group) information corresponding to that well and in some embodiments provides navigation links (not shown) to water use pages such as the Water Use By Members Page 600A/600B.

Referring to FIG. 12, WAMP 150 displays the Water Use by Turnouts display page 1200, which displays a user-scalable aerial map of district water turnouts 1230 that is equivalent to Water Use by Wells Page 1100 except that surface water turnouts are displayed rather than wells. Each Turnout Balloon on the map 1230 indicates the location of a turnout—for example Turnout Balloon 1250. Clicking on a Turnout Balloon causes the WAMP 150 to display information (not shown) about that turnout as well as to display property account (and or property group) information (not shown) corresponding to that turnout and in some embodiments provides navigation links (not shown) to water use pages such as the Water Use By Members Page 600A/600B.

Wally's GMA district—WARM—overlaps an area historically supplied with surface water by the US Bureau of Reclamation (USBR). From time to time, new turnouts are added to the USBR's distribution system and reflected in their database. Wally decides to update the WAMP Database(s) 158 to match the latest turnout data from the USBR in WARM's district. Wally clicks the Import Data sub-submenu tab 1270.

Figure 13A:
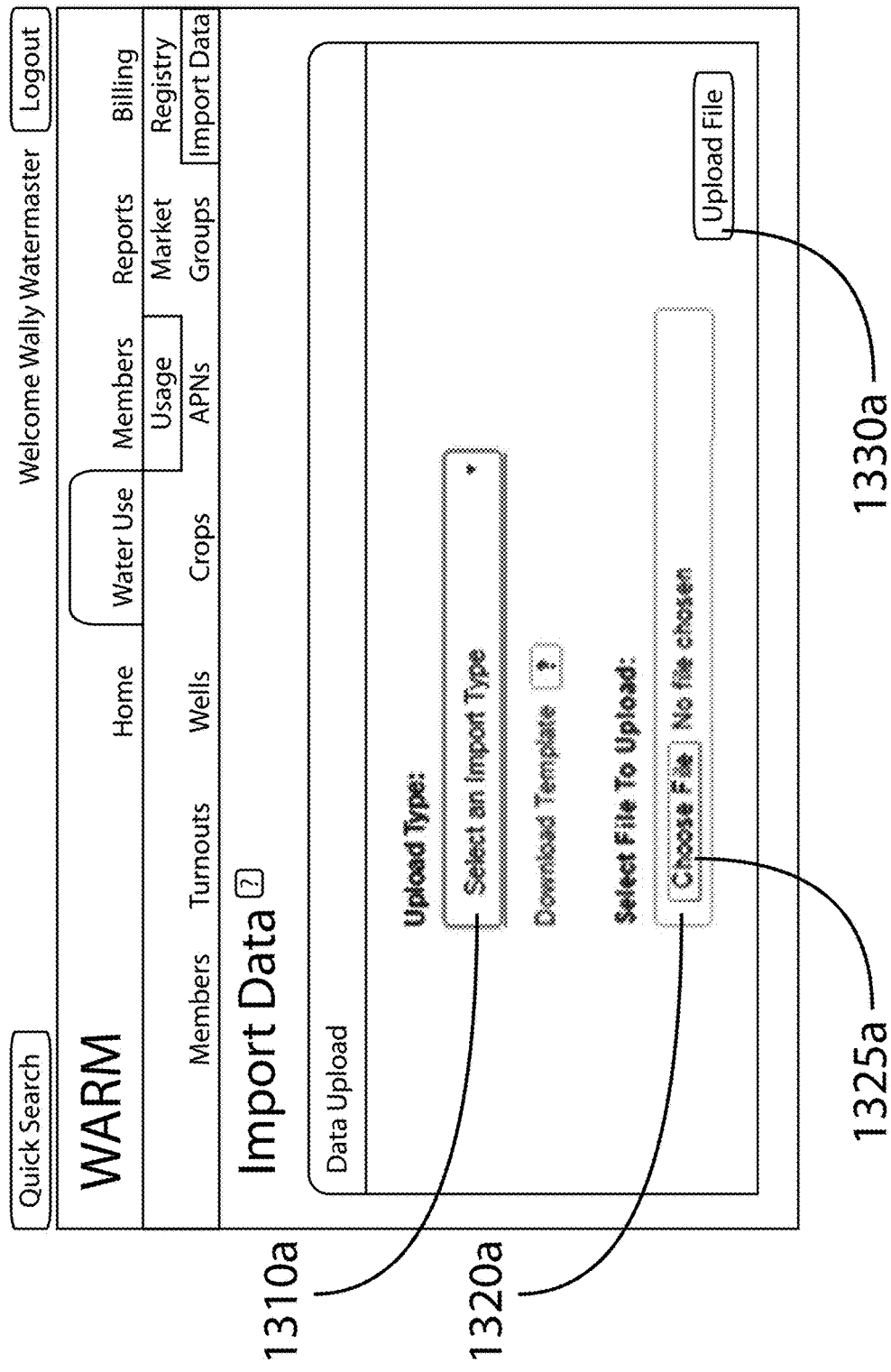
FIGS. 13A and 13B are two views of an exemplary screen image illustrating the sustainability manager experience of a WAMP Import Data display page for the embodiment of FIG. 1.
Figure 13B:

Referring to FIGS. 13A and 13B, WAMP 150 displays Import Data display page 1300A/1300B, which facilitates a sustainability manager to import data from third parties. Additionally, in some embodiments, a WAMP 150 may support (not shown) numerous data formats (including but not limited to CSV files) either by explicit configuration or auto-detecting the format type. For instance, a sustainability manager can download a template (not shown), with the header names indicating what data to include, and then upload the same file once the remote data source has populated the template with their data (not shown). Referring to FIG. 13A, Wally has to select a upload type utilizing the Upload Type drop down menu 1310*a*. Wally clicks on drop down menu 1310*a*. Referring to FIG. 13B, Wally chooses the Turnout upload type 1315*b*. Referring again to FIG. 13A, Wally clicks on the Choose File button 1325*a* in the Select File to Upload input box 1320*a*. Wally then selects the turnout connections data file (not shown) to import from the USBR database, which may then be uploaded to the WAMP 150 once Wally clicks the Upload File button 1330*a*.

Having utilized the WAMP 150 to thoroughly research the Naitos' and other members historical and current water use—particularly as applies to Alfalfa, Wally utilizes the WAMP 150 to determine how much additional water the Naitos will need to extract from the groundwater basin (not shown). Based upon the WAMP 150 analysis of the Naito's sources of water supply (i.e., wells and turnouts) and assuming this new Alfalfa crop is added and everything else remains the same, the WAMP 150 provides Wally the information he needs—i.e., if the new plantings are made and no water rights are transferred, projected extractions will be above sustainability caps (not shown).

Now that Wally realizes that the Naitos will have to purchase water from other members in order to plant their new alfalfa, he wonders what impact this repurposed groundwater use will have on the economic production of the district.

Referring to FIG. 14, Wally selects a commodity production report to view (see 1440) utilizing the Advanced Reports display page 1400 of the WAMP 150. This report (not shown) takes the area under production for each crop and the prevailing commodity prices to estimate the gross value of irrigated product. The water balance modeling tool has an economic forecasting facility (not shown). Utilizing the economic forecasting facility of WAMP 150 water balance modeling, Wally can repeatedly model move water from one crop type to some other crop type and for each change the WAMP 150 water balance modeling automatically determines the economic optimal change in water resources for the remaining crop types (not shown).

Wally generates a forecasting report showing the result of the WAMP 150 water balance modeling (not shown). The forecasting report demonstrates that the new alfalfa plantings can increase the overall economic production of the GMA district if the water is purchased from pistachio and tomato growers. Wally knows that the pistachio and tomato growers are cutting back on production due to highly competitive imports; and he hopes the water sales will help their bottom lines as they switch to new crops. The forecasting report also tells Wally that the Naitos' new alfalfa plantings may put the district's economy further at risk to a fall in the alfalfa price due to concentration of alfalfa as a percentage of overall production. Utilizing the WAMP 150, Wally publishes the report for GMA-internal distribution (not shown).

While dwelling on the GMA's new sustainability concern regarding the Naitos, Wally decides to review how his district is performing overall against its sustainability goals in its Groundwater Sustainability Plan for the Sustainability Groundwater Management Act ("SGMA"). Wally knows the annual report to the DWR has been scheduled to be sent out. He decides to have a look at the report.

Figure 15:
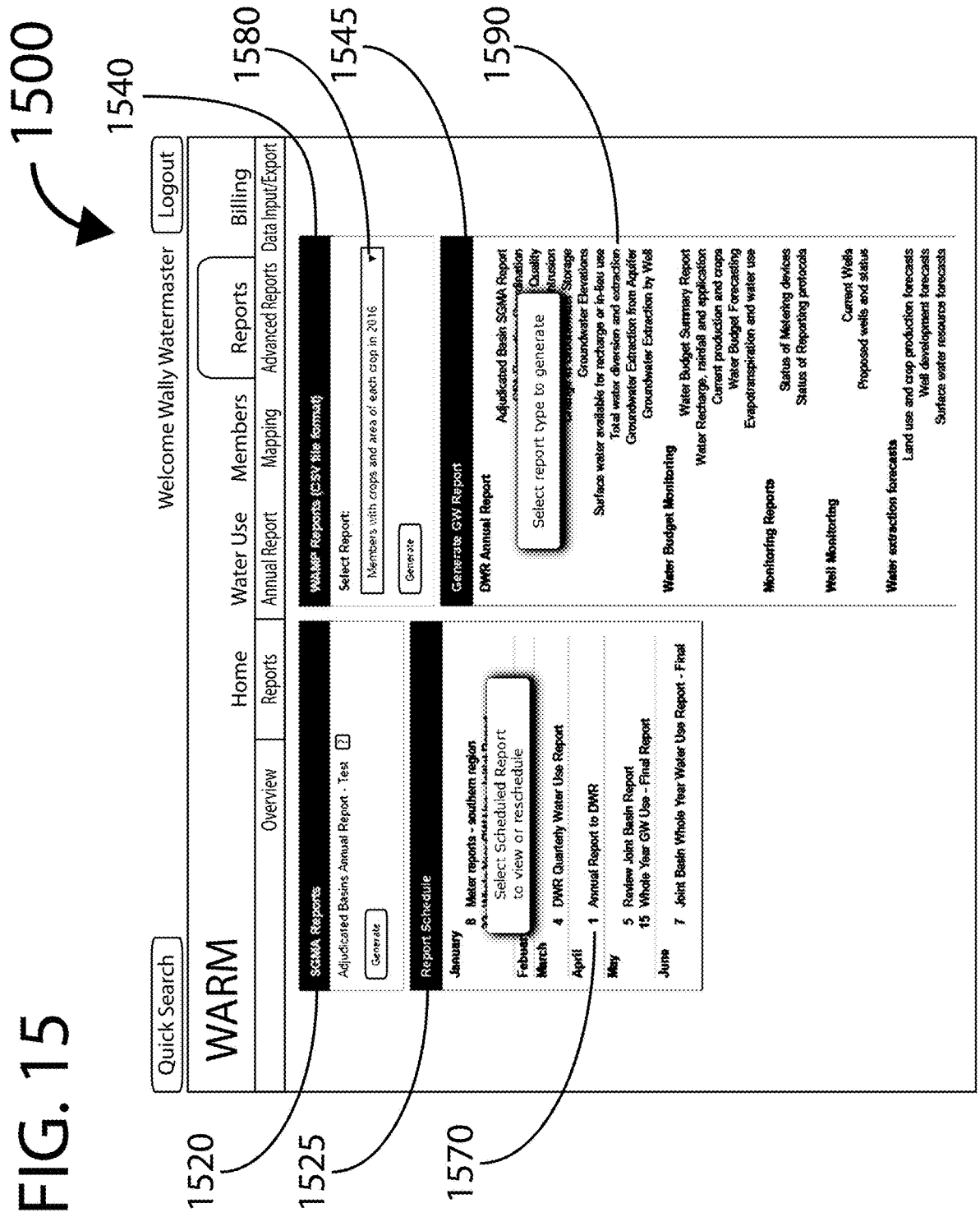
FIG. 15 is an exemplary screen image illustrating the sustainability manager experience of a WAMP Reports display page for generation and/or scheduled publishing from lists of reports for the embodiment of FIG. 1.

Referring to FIG. 15, WAMP 150 displays Reports display page 1500. In the left hand column, Wally may choose to generate a new SGMA report utilizing the SGMA reports menu 1520—where a WAMP 150 generating a given SGMA report may utilize a pre-configured SGMA report form template, wherein the template may be filled in correctly by WAMP 150 with data generated by WAMP 150 analytics such that the SGMA report is ready to view and/or to file with the California Department of Water Resources (DWR). Or lower in the left hand column, he may choose to view or reschedule a given SGMA report utilizing the Report Schedule menu 1525. In the right hand column, Wally may choose to generate a WAMP 150 report utilizing the WAMP Reports menu 1540—such a report may for instance show the water balance as modeled, groundwater use by member, crop and property, etc. Lower in the right hand column, he may choose generate a groundwater report utilizing the Generate GW Report menu 1545.

Visually scanning the Report Schedule menu 1525, Wally locates the Annual Report to DWR 1570. Wally confirms the report is scheduled to meet the due date—April 1—and knows that the WAMP 150 will generate the report to the DWR automatically. To do so, the WAMP 150 may utilize a report template provided by the California DWR and automatically populate fields within that template utilizing the WAMP Database(s) 158 data and WAMP 150 water balance modeling results.

Periodically Wally utilizes the WAMP 150 to generate a total water diversion and extraction report for the GMA (not shown). Such a report may provide a macro view of all the groundwater use in the district. Furthermore, Wally may have the option to display how individual usage data for certain members compares to the average, median, mode, percentile, etc. for the district as a whole (not shown). Scanning the Generate GW Report Menu 1545, Wally clicks on the Total water diversion and extraction report link 1590.

Studying the charts and tables of the latest WAMP 150 water balance modeling shown in the report, Wally sees that the total extractions for the district are within the targets set by the Groundwater Sustainability Plan (not shown). Wally wants to share this around the office so he utilizes the WAMP 150 to save the version of the report he just generated and publish it within the GMA (not shown), This makes the new water diversion and extraction report available to other sustainability managers. They may access it utilizing the Reports display page 1500 where it can be selected and viewed along with other published reports utilizing the Select Report drop-down menu 1580 in the WAMP Reports menu 1540.

Wally also wants to share the new water diversion and extraction report with his Board of Directors. Based on their contact information in the WAMP Database(s) 158, Wally utilizes the member contact facilities of the WAMP 150 to email the report to each of the Directors (not shown). He does the same with the Annual Report to DWR and the report forecasting the Naitos' new water needs. He knows the Naito issue will likely come to their attention and he wants them to be prepared.

Figure 16:
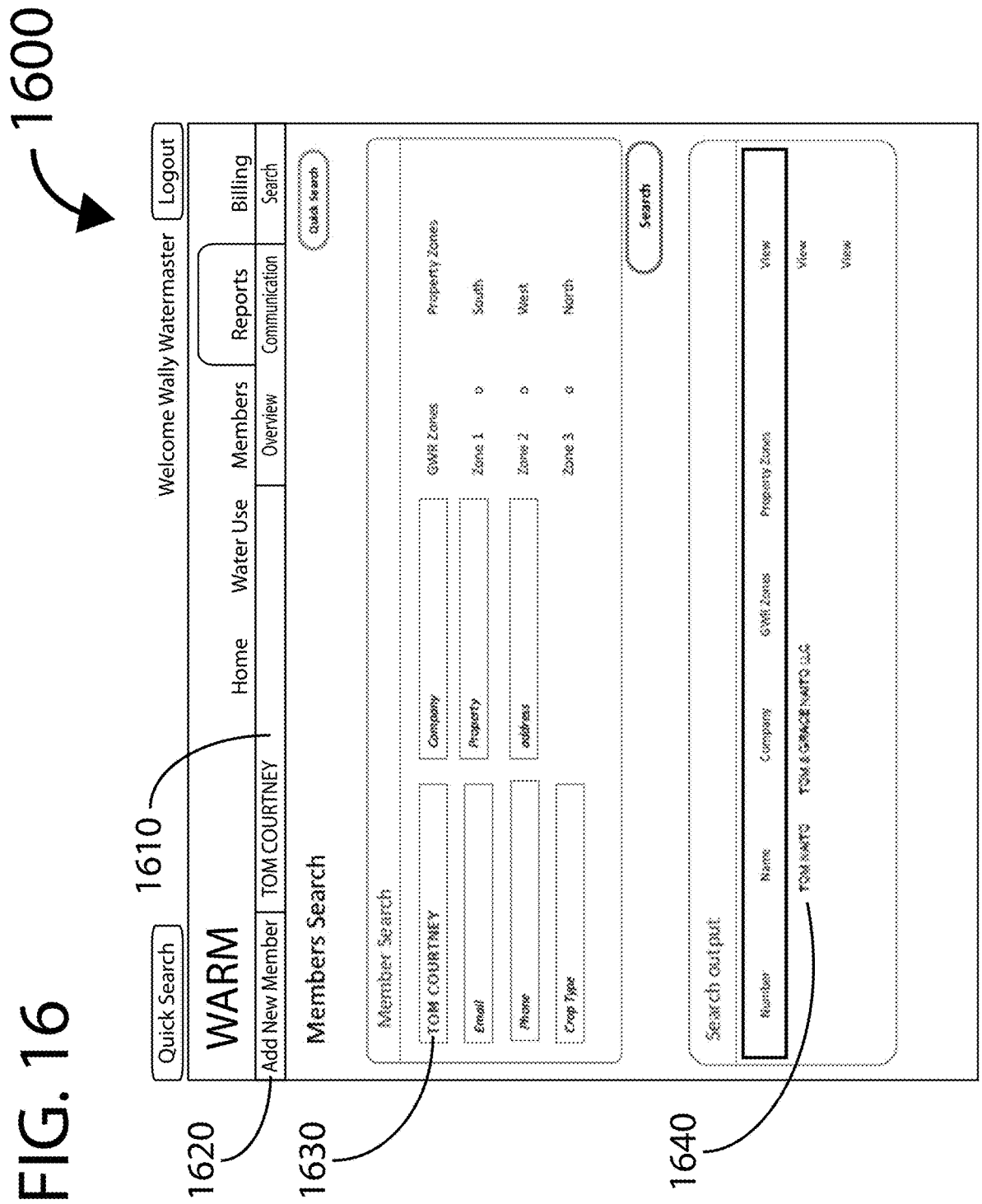
FIG. 16 is an exemplary screen image illustrating the sustainability manager experience of a WAMP Member Search display page for the embodiment of FIG. 1.

Earlier in the morning Wally had spoken with a new Director, Tom Courtney. Tom has just moved into the district and might not yet be in the WAMP Database(s) 158. So Wally decides to check. Referring to FIG. 16, Wally navigates to the Member Search display page 1600. He searches for Tom in the members contacts by typing "Tom Courtney" in the Member Search name entry box 1630. In some embodiments, the WAMP 150 looks for direct match(es) to "Tom" or "Courtney" or alternative spellings (e.g., Thomas) or possible misspellings (e.g., Tim). "Tom Courtney" does not come up in the WAMP 150 member search, but by coincidence another Tom—Tom Naito—does 1640. With no exact matches, the WAMP 150 automatically alters the submenu tray 1610 by adding an Add New Member submenu tab 1620. By waiting to display the Add New Member submenu tab 1620 until after a member search has been attempted, the WAMP 150 significantly reduces the number of duplicate member entries. Wally clicks submenu tab 1620 to create a new WAMP 150 member contact record for Tom.

Referring to FIGS. 17A and 17B WAMP 150 displays Member Contact display page 1700A/1700B. FIG. 17A shows the upper portion of the page 1700A (FIG. 17B shows the lower portion 1700B). Referring to FIG. 17A, Wally adds Tom Courtney as a new member by typing in his contact details into the Contact Details entry subscreen 1720*a*. Referring to FIG. 17B, Wally adds a note in entry subscreen 1780*b* so other sustainability managers will know Tom is on the GMA's board of directors.

Next Wally wants to check to see if the Naitos have already acquired additional water rights utilizing the WAMP 150-facilitated electronic water rights exchange.

Figure 18:
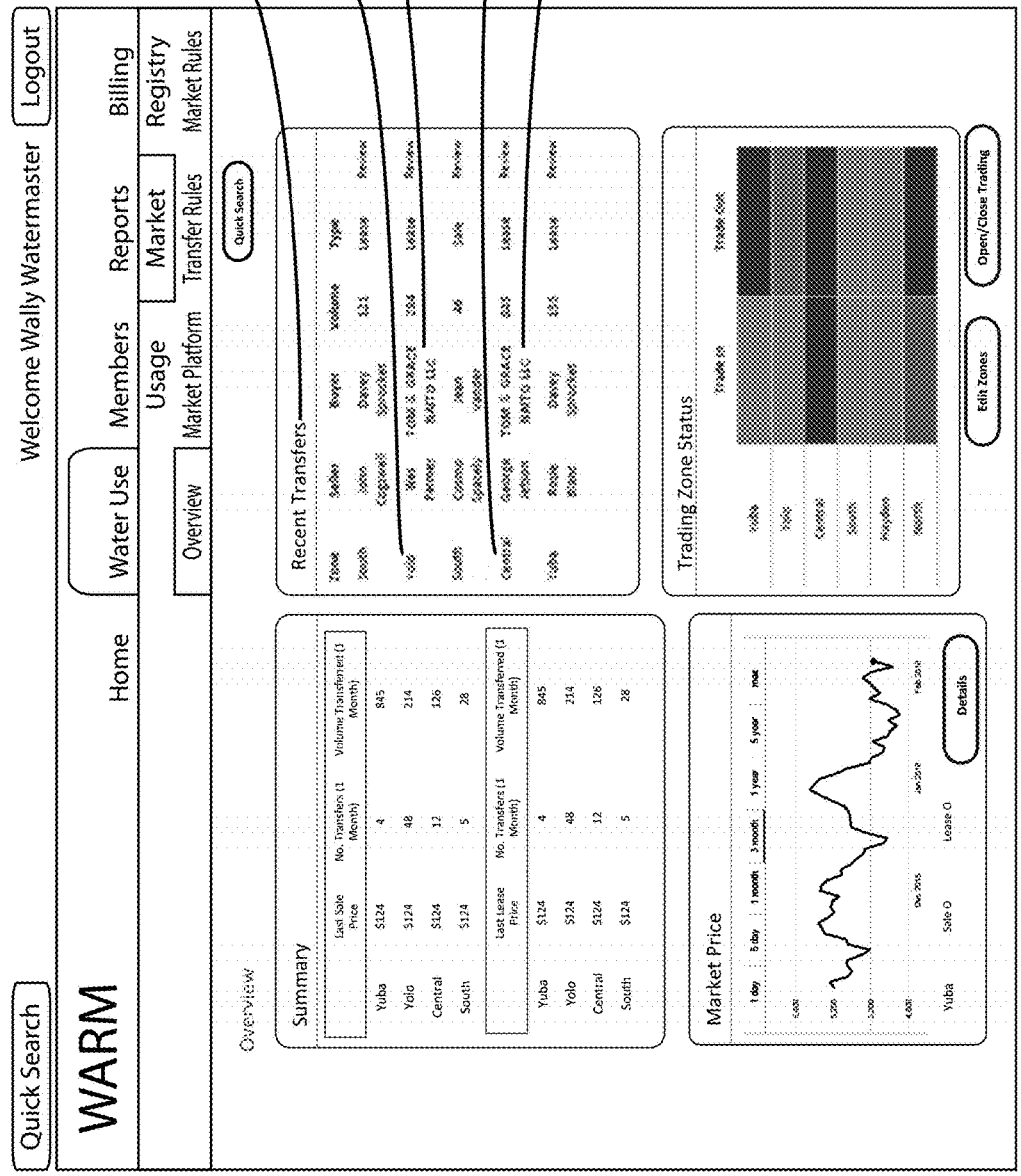
FIG. 18 is an exemplary screen image illustrating the sustainability manager experience of a WAMP Overview display page for the embodiment of FIG. 1.

Referring to FIG. 18, WAMP 150 displays the Overview display page 1800 for the WAMP 150-facilitated electronic water rights exchange. In the right hand column, Wally scans the Recent Transfers display list 1810. He sees that there are two water rights lease purchases 1835 and 1845 by the Naitos that have been entered into WAMP 150 processing.

Figure 19:
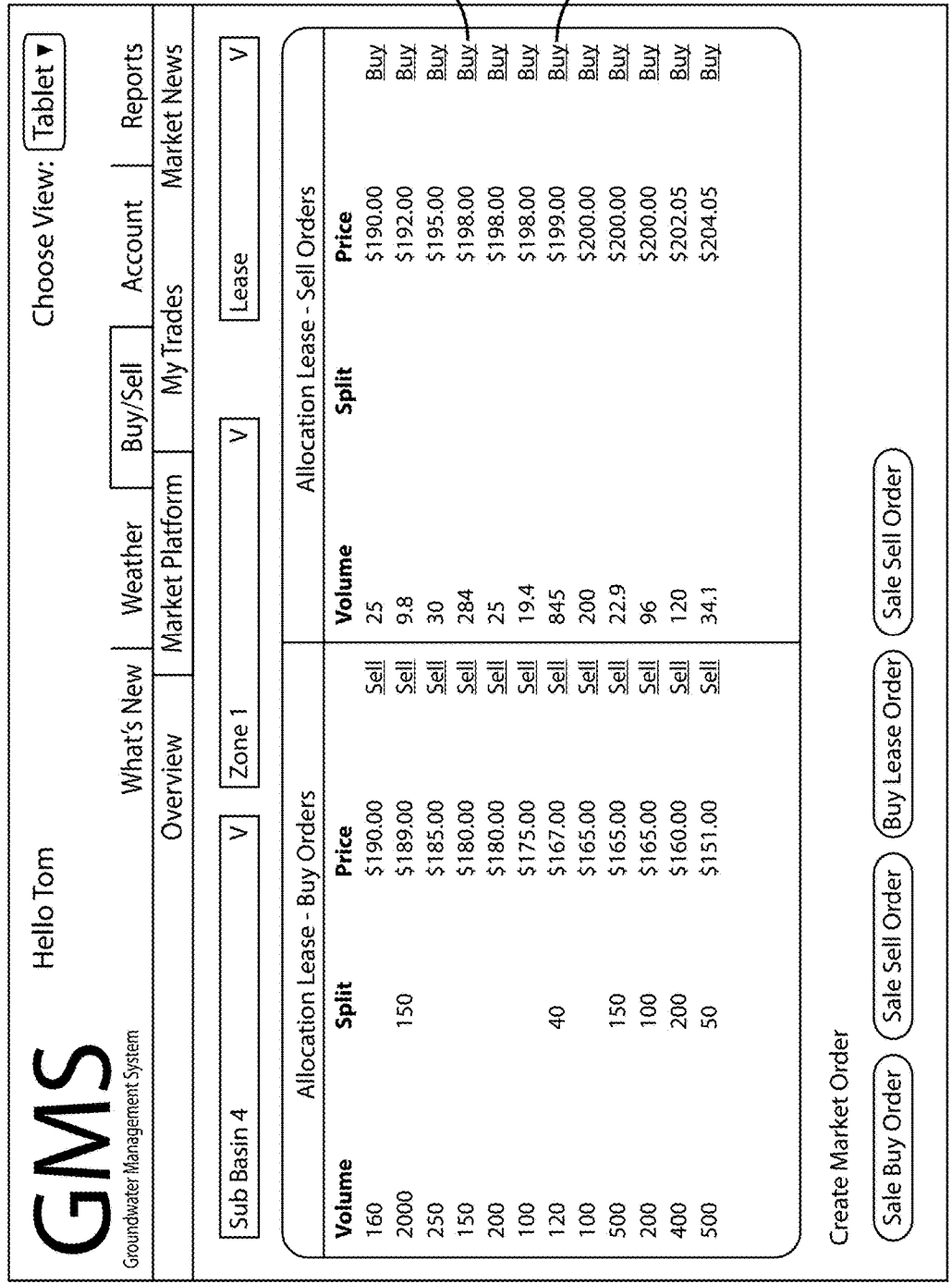
FIG. 19 is an exemplary screen image illustrating the property manager experience of a WAMP Market Platform display page for the embodiment of FIG. 1.

Referring to FIG. 19, in order to acquire additional water rights, GMA member Tom Naito utilized the WAMP 150-facilitated electronic water rights exchange from his tablet computer (see FIG. 1, 191). Tom navigated to the Market Platform display page 1900 of the WAMP 150 members web site. (In some embodiments, a mobile App may be utilized). Tom found two water rights lease offers that met his requirements and purchased them both—one for 284 acre feet 1950 and one for 845 acre feet 1970. Had he not found an offer that was acceptable, Tom could have placed a lease order on the market with a set price and volume and received a notification from the WAMP 150 when a matching offer to lease was found or when a GWR seller chose to accept Tom's offer on the WAMP 150-facilitated electronic water rights exchange and to lease GWRs at Tom's offering price (not shown).

Wally earlier used the WAMP 150 to set up water market trading rules so that whenever someone made a trade between zones it would need Wally's approval to be processed by the WAMP 150. Wally had set it up this way to make sure that there was never a case where more water was transferred out of a zone than the aquifers could sustainably support.

Referring back to FIG. 18, the sellers of the water leases that Tom Naito purchased each were in different zones 1830 and 1840 within the GMA's jurisdiction than the zone for the Naito's properties and therefore the leases need Wally's approval.

Figure 20A:
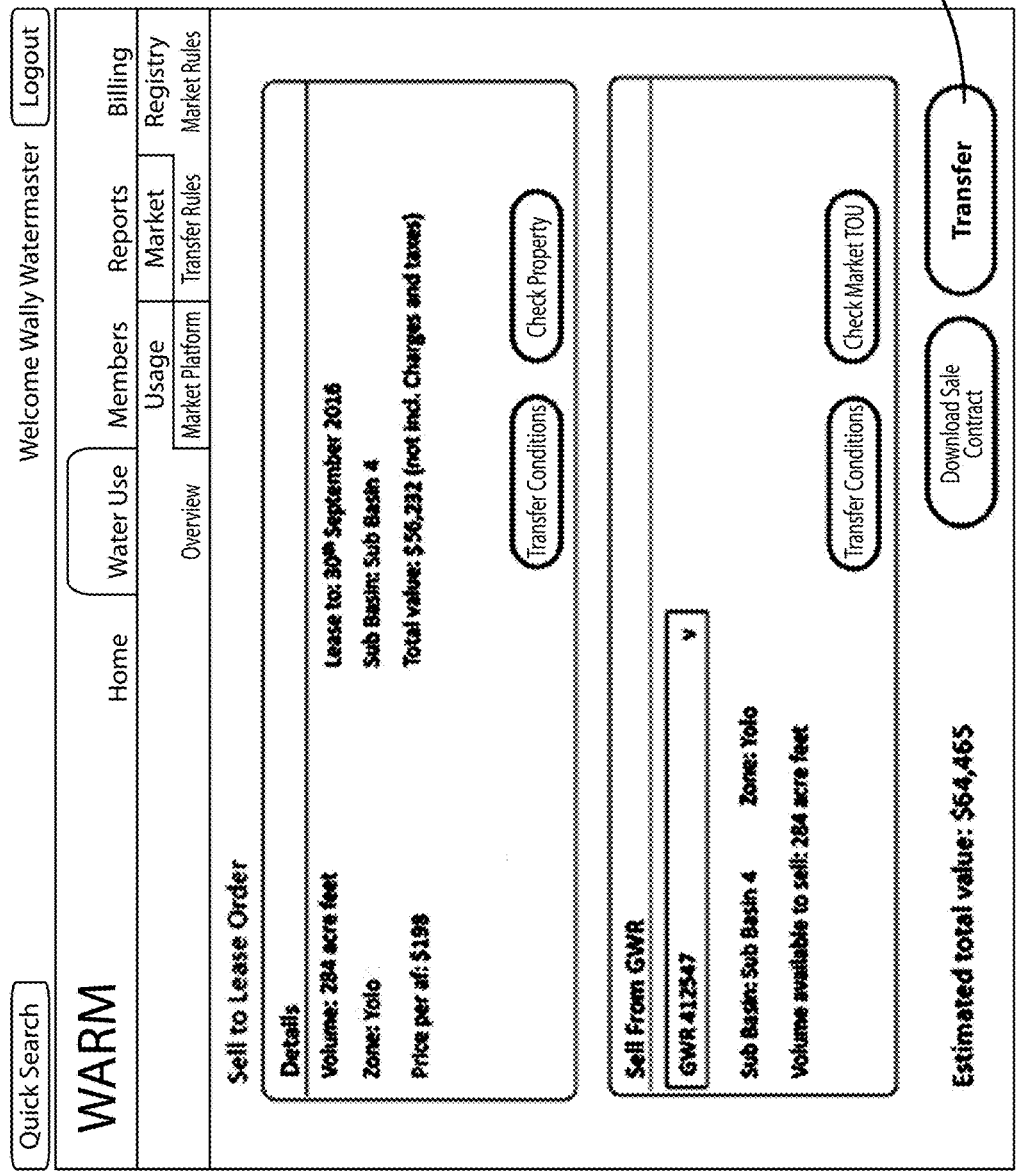

Referring to FIGS. 20A and 20B, WAMP 150 displays the Market Platform display page 2000A/B for the WAMP 150-facilitated electronic water rights exchange. Referring to FIG. 20A, Wally is confident that the trades meet sustainability requirements and therefore clicks the Transfer button 2080*a* on each of the trade records to approve the trades. Upon Wally's approval of the trades, electronic notifications are automatically sent to the Naitos and also to each of the sellers to let them know the leased transfer of water rights has been approved and made. Additionally, appropriate third parties are notified. And of course the WER registry is updated automatically for both the Naitos and the sellers to reflect the transfers of water rights. Referring to FIG. 20B, in some embodiments a sustainability manager may utilize the WAMP 150 to place a water extraction rights trade on the WAMP 150-facilitated electronic water rights exchange—perhaps to assist a member who lacks computer access at the time of such a trade.

Figure 21:
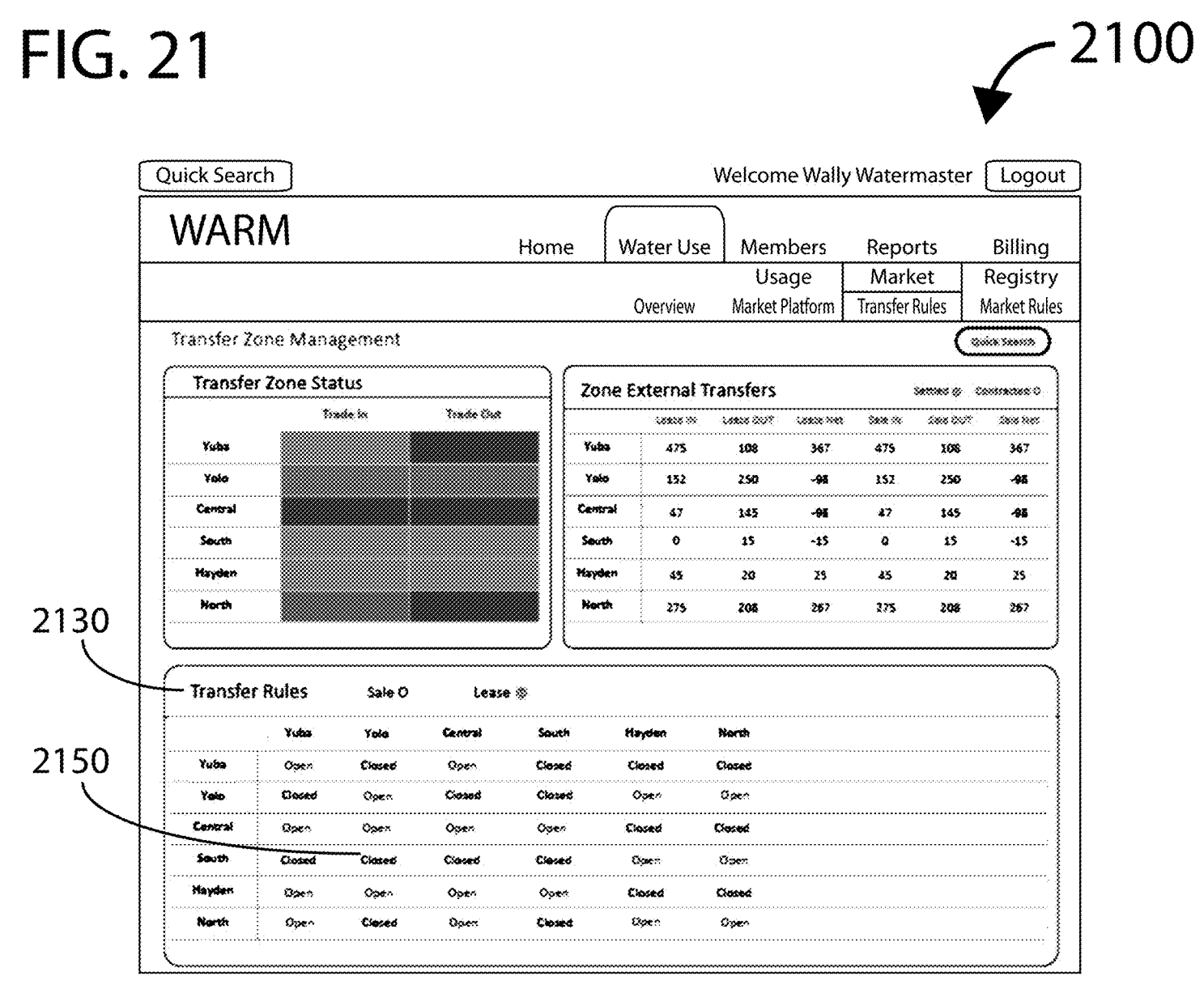

Referring to FIG. 21, Wally can double check the transfer rules by navigating to the WAMP 150 Transfer Zone Management display page 2100. In some embodiments, Wally can configure the WAMP 150 to automatically enforce the transfer rules—perhaps when the trade volume goes way up, or when Wally is on vacation. Wally can change individual transfer rules utilizing the Transfer Rules table 2130. For example, he can click on the transfer rule toggle button 2150 for transfers from the South zone to the Yolo zone with each click toggling the setting for the rule. So for example, a single click may change the rule from "Closed" to "Open".

Figure 22A:
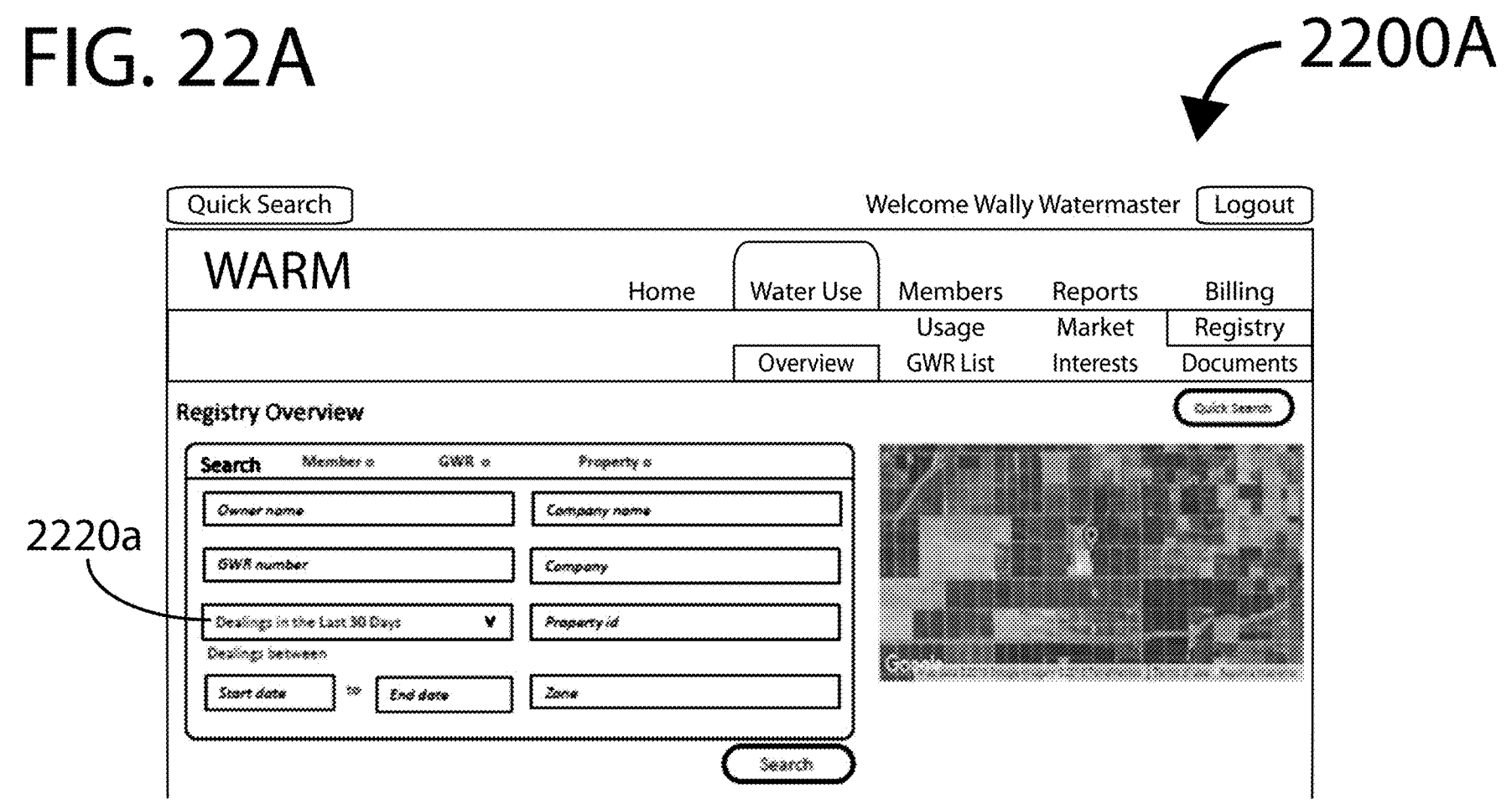
Figure 22B:
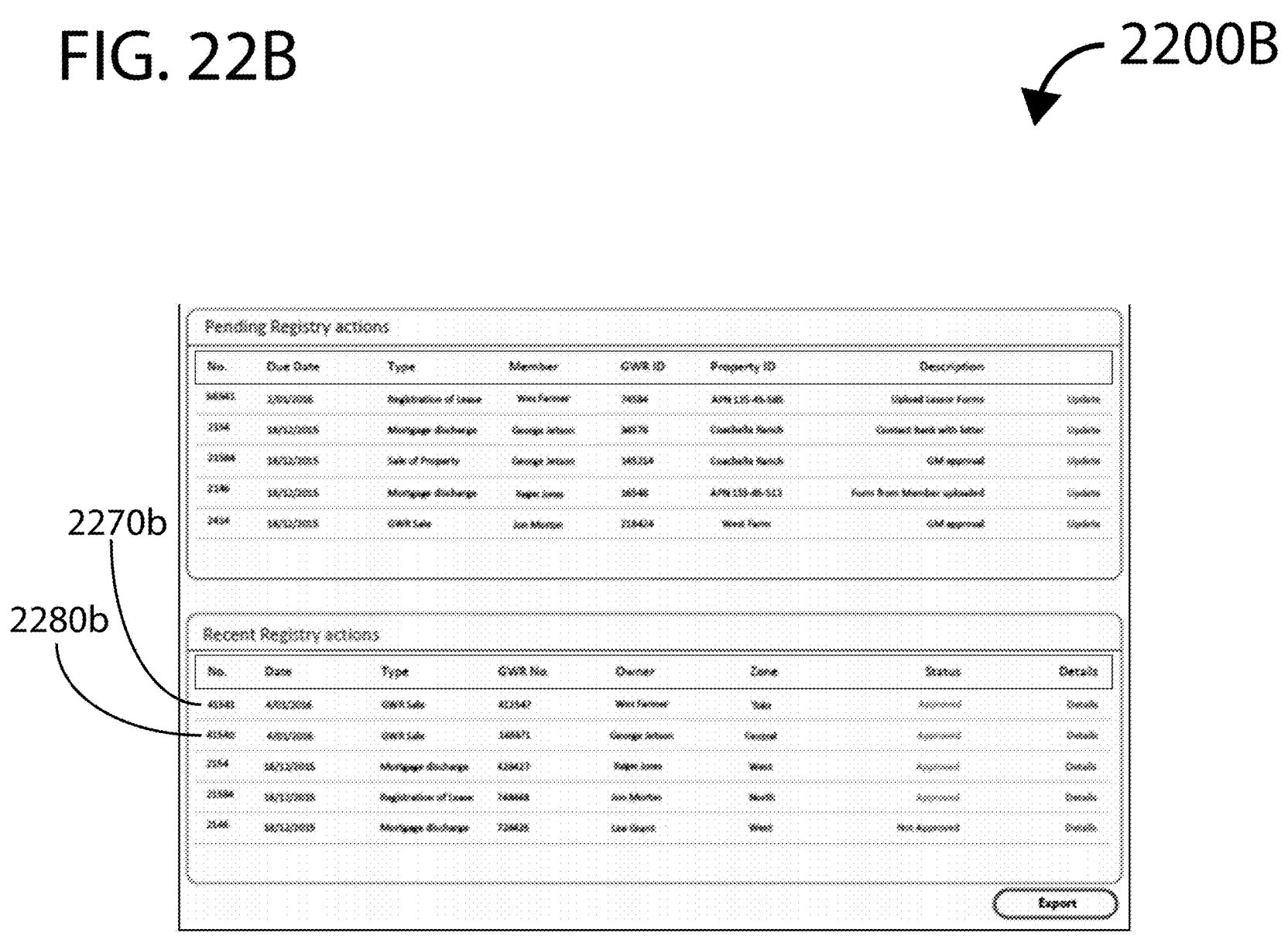

Referring to FIGS. 22A and 22B, WAMP 150 displays the Overview display page 2200A/2200B for the WAMP 150 WER registry. FIG. 22A shows the page's upper portion 2200A (FIG. 22B shows the lower portion 2200B). Referring to FIG. 22A, Wally looks for the updates to the WER Registry that he just approved. Since they just happened, he simply picks Dealings in the Last 30 Days 2220*a* in the Registry search array. Referring to FIG. 22B, Wally immediately spots the two approved WER Registry updates 2270*b* and 2280*b* at the top of the Recent Registry actions list.

Figure 23B:
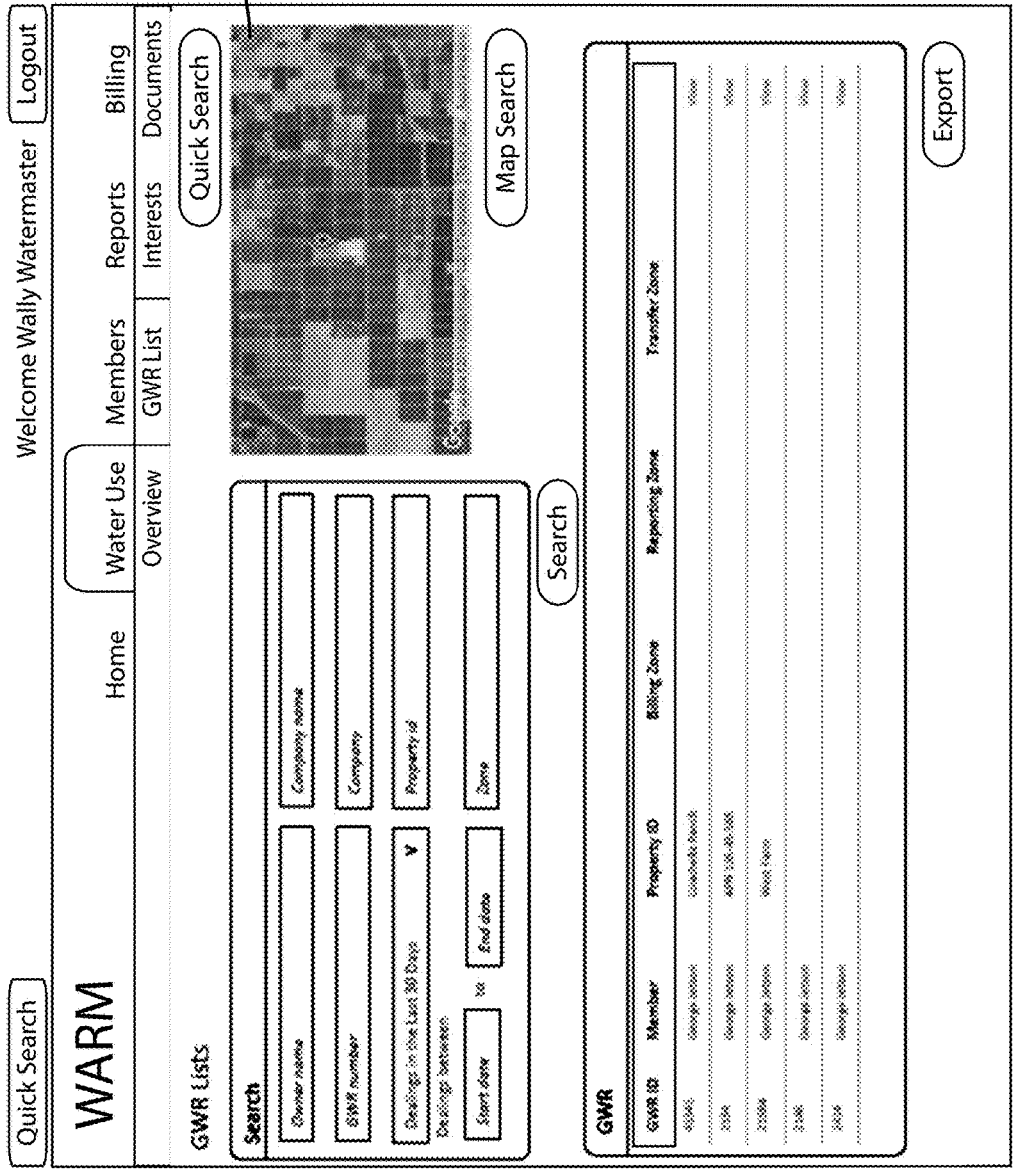

Referring to FIGS. 23A and 23B, Referring to FIG. 23A, Wally navigates to the GWR List display page 2300A where entries 2310*a* and 2320*a* for the Naito's newly approved trades appear. Wally clicks the corresponding Goto CRM button 2340*a*. Referring to FIG. 23B, in some embodiments, a GWR List display page 2300B may facilitate a boundary mapping tool 2345*b* for utilization by a sustainability manager in a GWR search.

Figure 24:
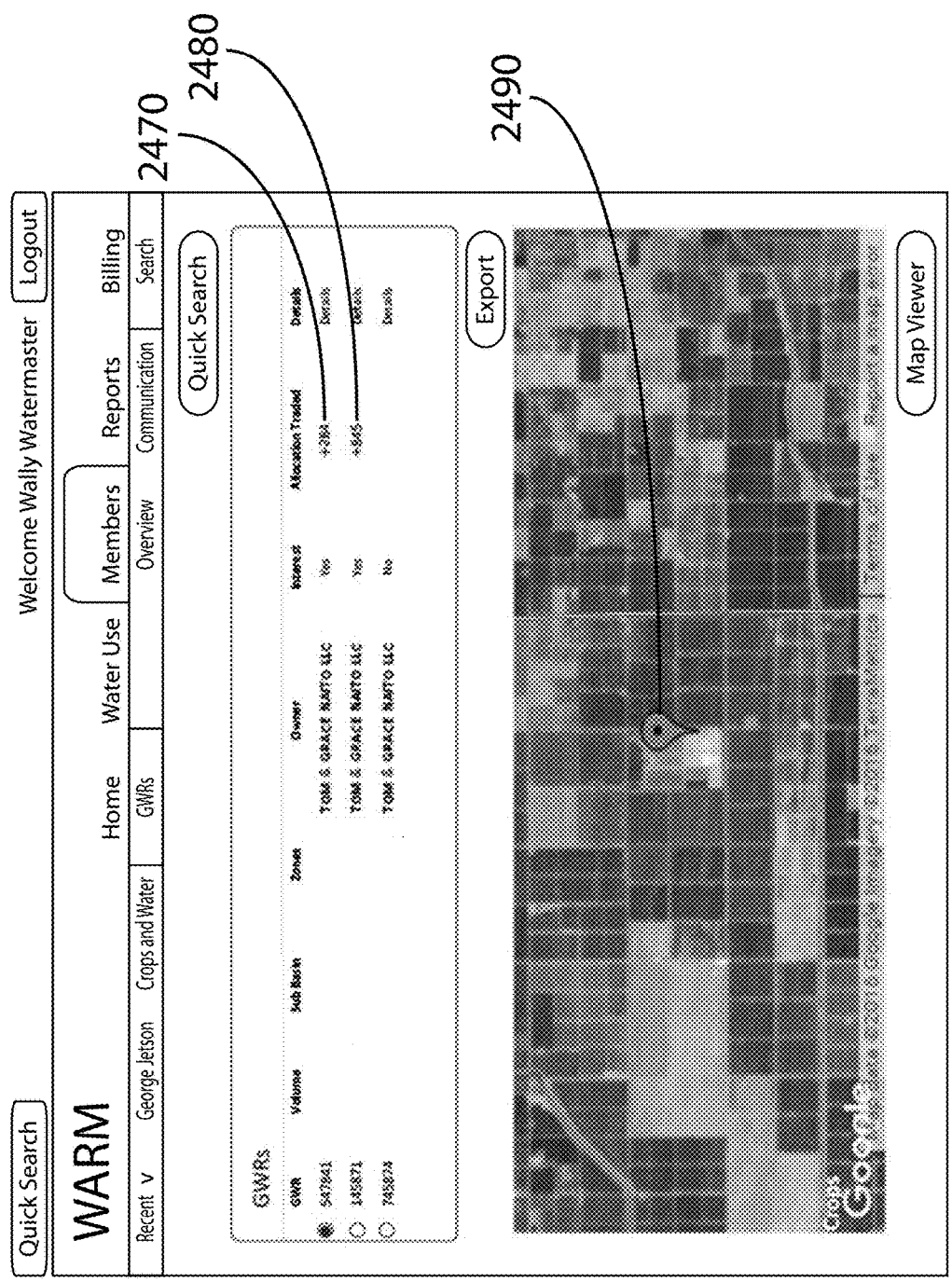
FIG. 24 is an exemplary screen image illustrating the sustainability manager experience of a WAMP Members GWR display page for the embodiment of FIG. 1.

Referring to FIG. 24, Wally navigates to the Members GWR display page 2400 where he checks the Naitos' groundwater rights to verify that the new GWRs just acquired by the Naitos are listed. He sees the GWRs: 2470 and 2480 on their account. He then clicks on the Well Balloon button 2490 to bring up the WAMP 150 forecast for the Naito's water use. Depending on the well, WAMP 150 may utilize measured water use if the well is metered, or WAMP 150-imputed water use if it is unmetered. A sustainability manager may compare actual water use data with the forecasted results from WAMP 150 water balance modeling (not shown).

Figure 25:
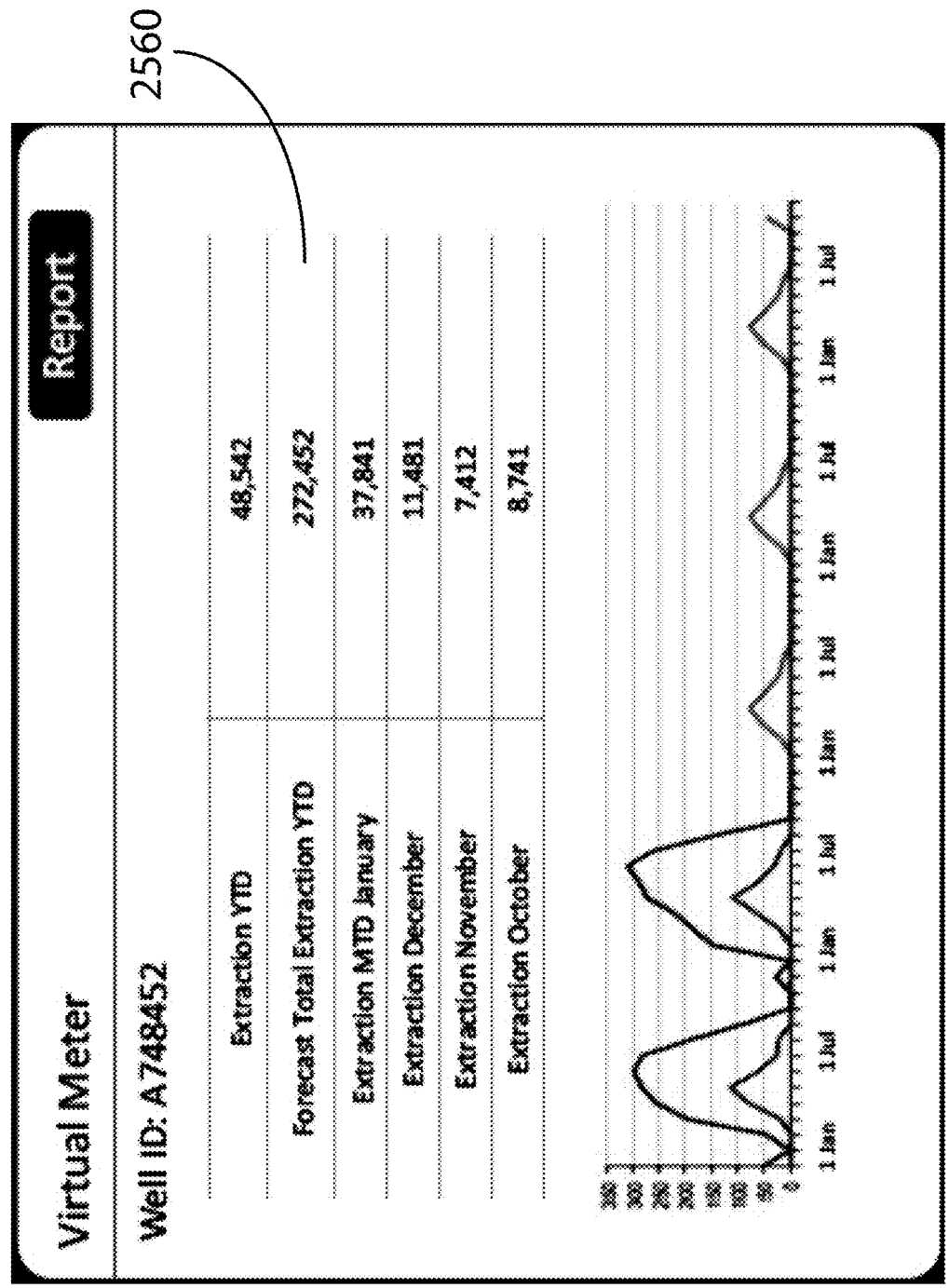
FIG. 25 is an exemplary screen image illustrating the sustainability manager experience of a WAMP Virtual Meter display subpage for the embodiment of FIG. 1.

Referring to FIG. 25, Wally navigates to the WAMP 150 Virtual Meter display subpage 2500 where he may view an estimate 2560 of the Naito's water use for the remainder of the year. Wally may also adjust this estimate for different rainfall and climatic conditions (not shown). Through this estimate 2560, the WAMP 150 shows that the Naitos should now have enough water rights for the rest of the water year.

Next, Wally navigates from the Naitos' membership account to the registry system and downloads an official statement of the Naitos' current water right volume.

Figure 26A:
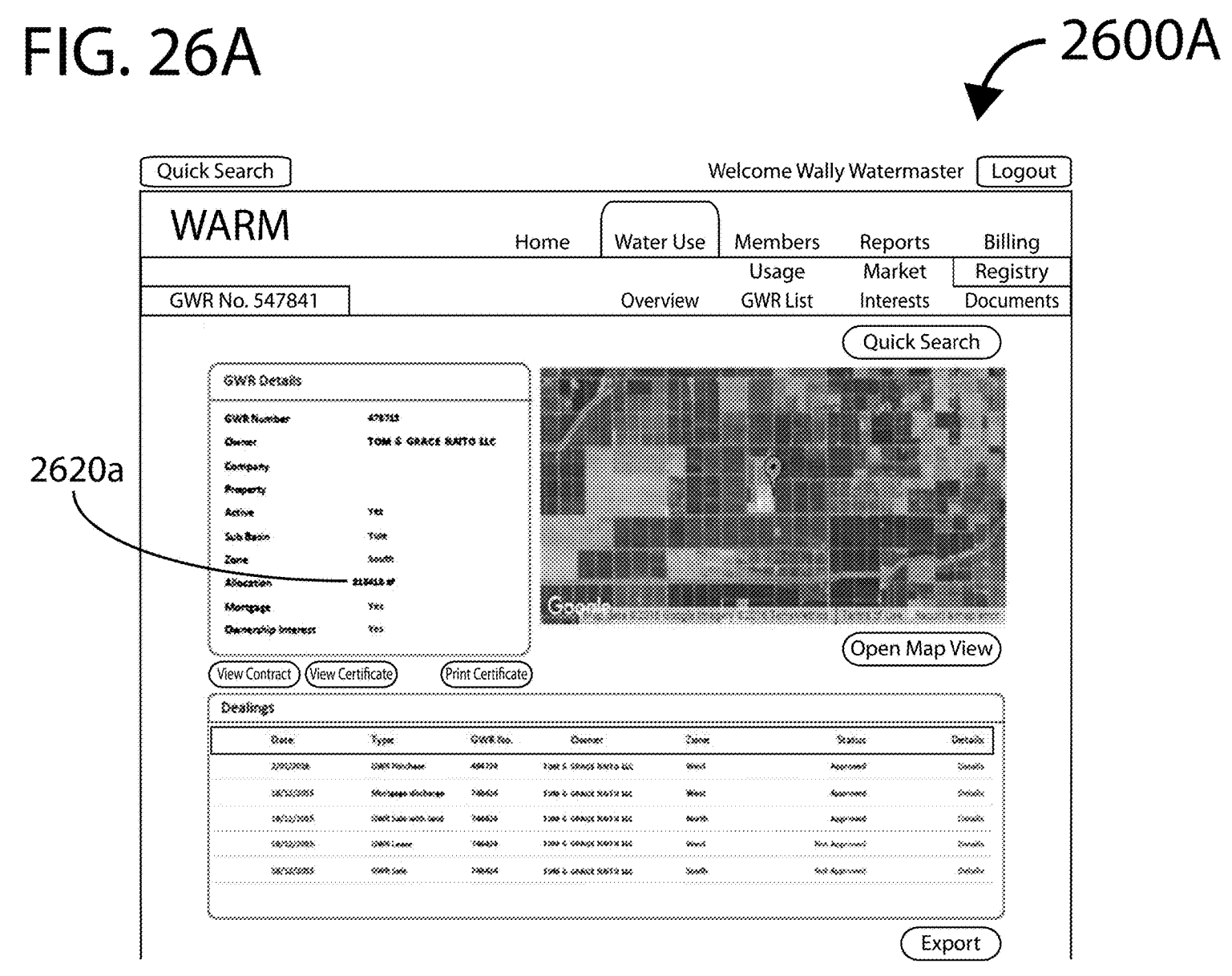
Figure 26B:
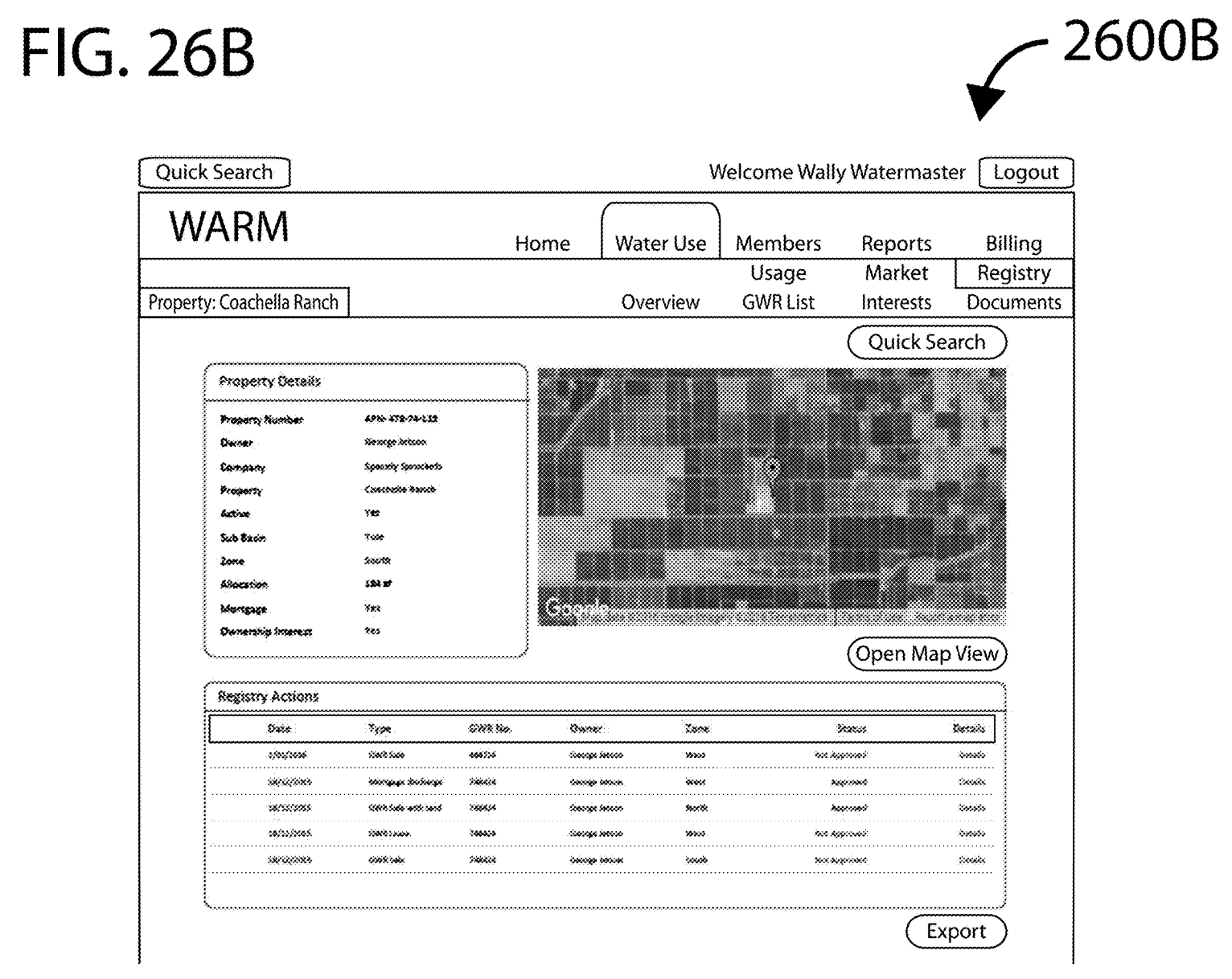
Figure 26C:
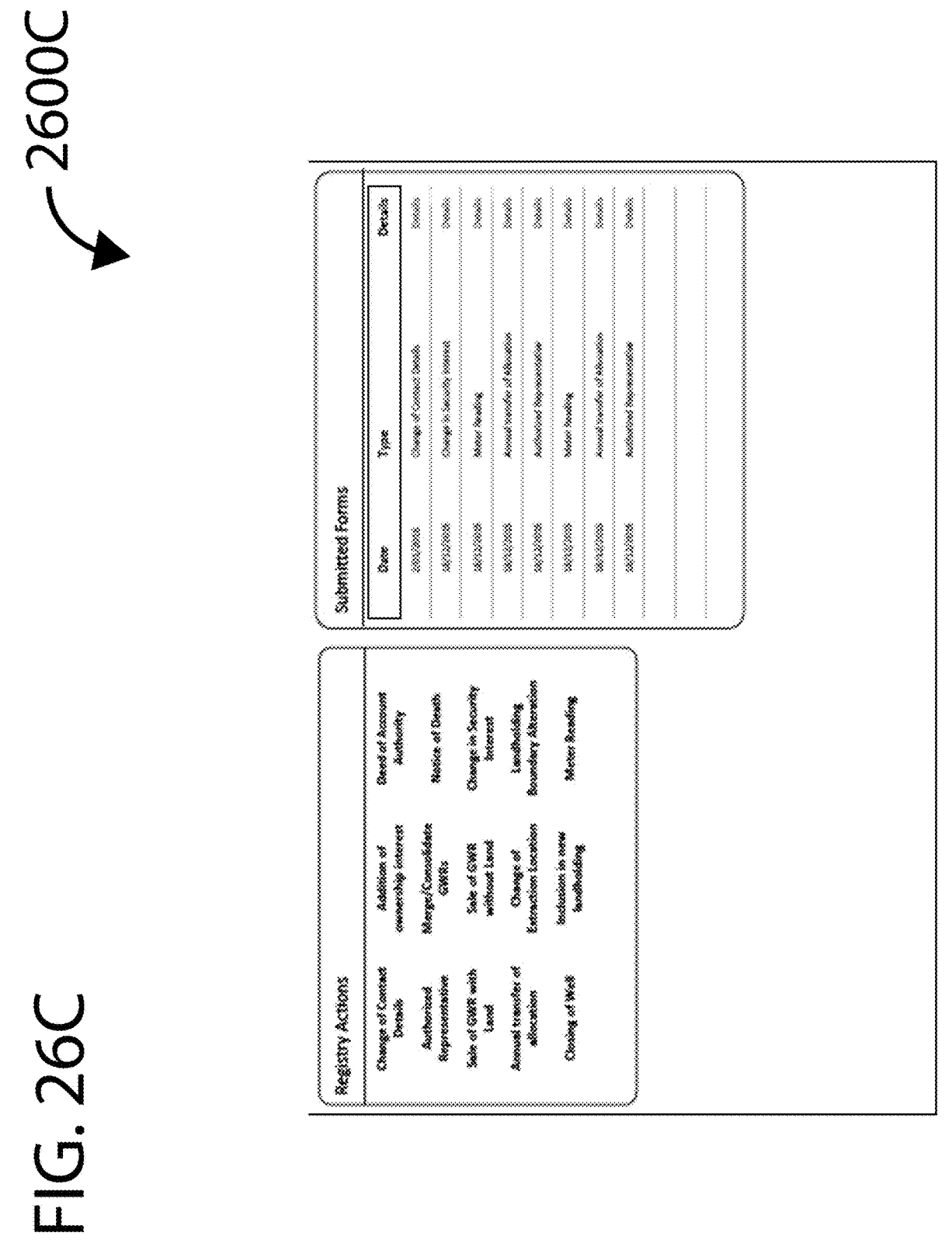

Referring to FIGS. 26A, 26B and 26C, WAMP 150 displays a GWR display page 2600A/2600B/2600C. FIG. 26A shows the page's upper portion 2600A (FIG. 26B shows an alternative upper portion 2600B and FIG. 26C shows the lower portion 2600C). Referring to FIG. 26A, WAMP 150 displays a GWR No. 547841 display page 2600A for the WAMP 150-facilitated electronic water rights exchange by the Naitos. Wally views the Naitos' current water right allocation 2620a. Wally attaches this information to an email and sends it to the Naitos letting them know that they now likely have enough water rights to see them through the rest of the year (not shown). Referring to FIG. 26B, in some embodiments a sustainability manager may utilize the WAMP 150 to display property account details corresponding to the transferee or to the transferor of GWRs.

Figure 27:
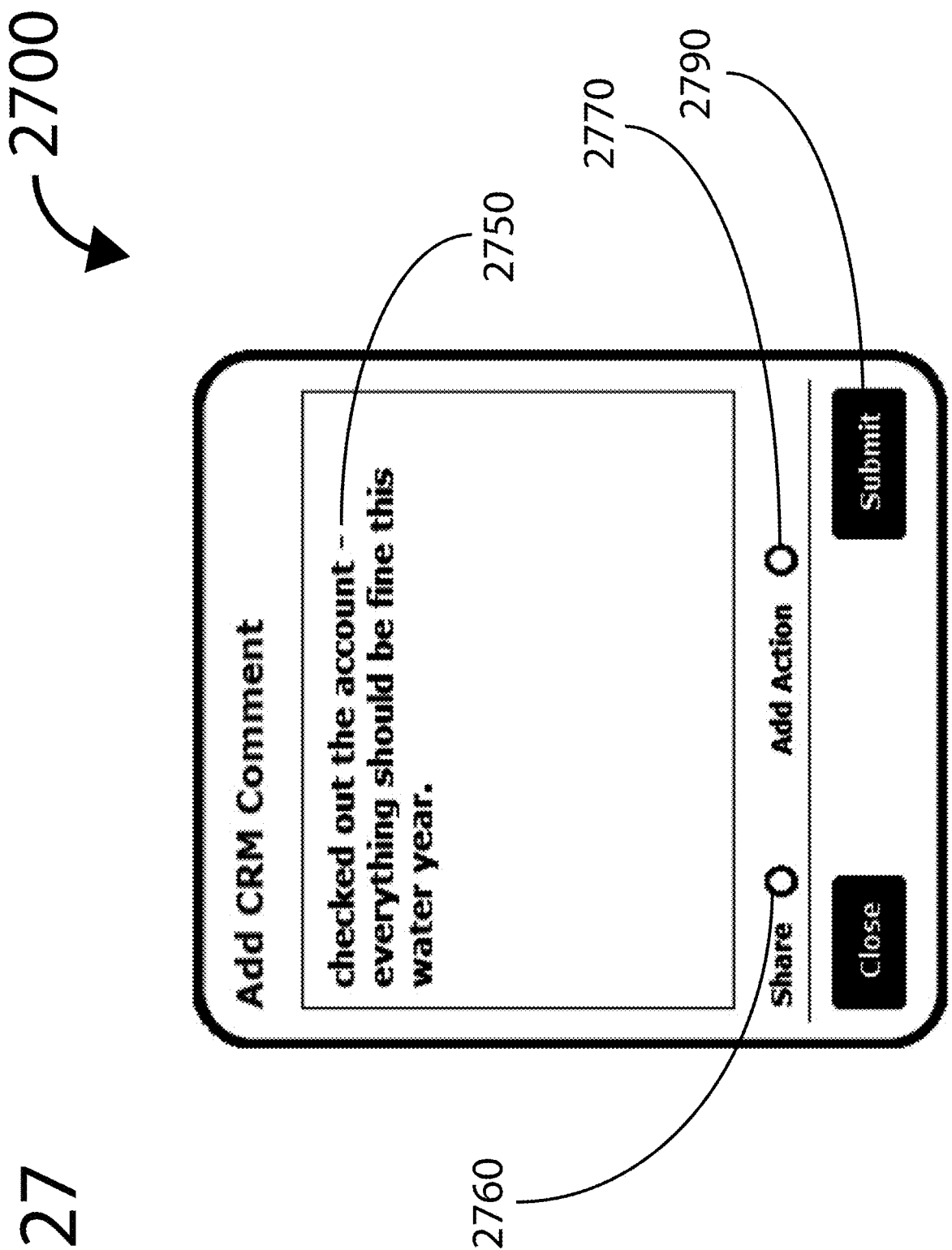
FIG. 27 is an exemplary screen image illustrating the sustainability manager experience of a WAMP Add CRM Comment display subpage for the embodiment of FIG. 1.

Referring to FIG. 27, Wally makes a note in the Add CRM Comment display subpage 2700 on the Naitos' member account in the contact notes section (not shown). The text 2750 of the note says that Wally checked out the account and everything should be fine this water year. Although he does not use it for this note, Wally has the option to share his note with other sustainability managers and/or to create an action notification for himself utilizing respectively: the Share selector button 2760 and the Add Action selector button 2770. Wally then clicks the Submit button 2790 to add the note to Naitos' member account.

Sometime ago, the Naitos legally transferred interest in their properties, including water extraction rights to a limited liability company (LLC). Many farming families who have property (and/or other valuable assets) are taking similar legal actions to protect their estates from exposure to law suits or simply from probate. Some families have transferred their interest into a trust or trusts, others have adopted various forms of joint ownership such as joint tenancy. Others utilize corporations. In some instances, the original family manages the fictitious legal entity that holds their property. In other instances, third parties such as trustees are the managers. In some instances, property interests are legally seized or enjoined. The WAMP 150 facilitates creating or updating a GMA's WAMP 150 records (e.g., property accounts, WER registry, etc.) to reflect ownership or control of interests by groups of persons or legal entities.

Figure 28A:
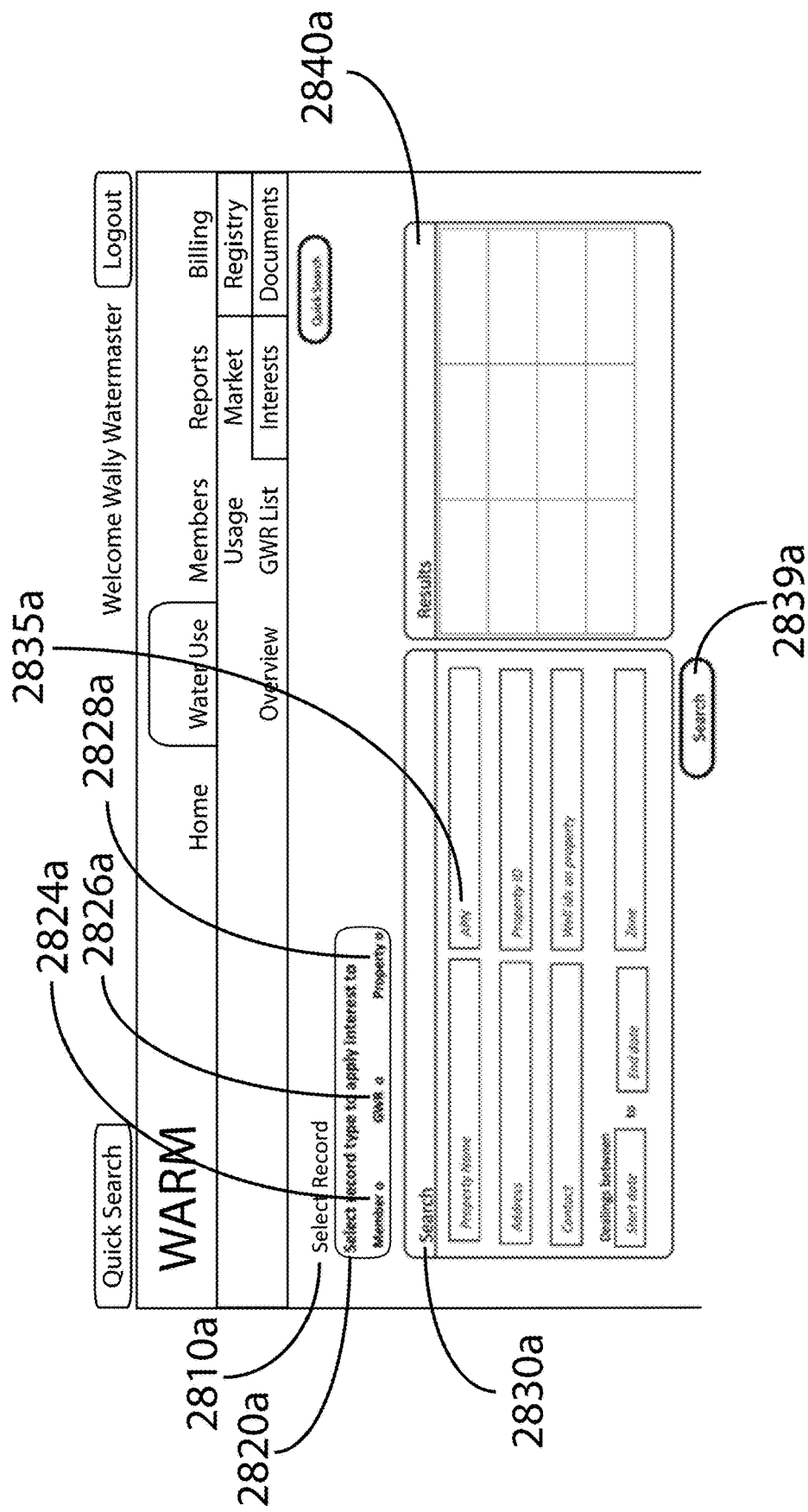
FIGS. 28A and 28B are upper and lower portions (respectively) of an exemplary screen image illustrating the sustainability manager experience of a WAMP Interests display page for the embodiment of FIG. 1.
Figure 28B:
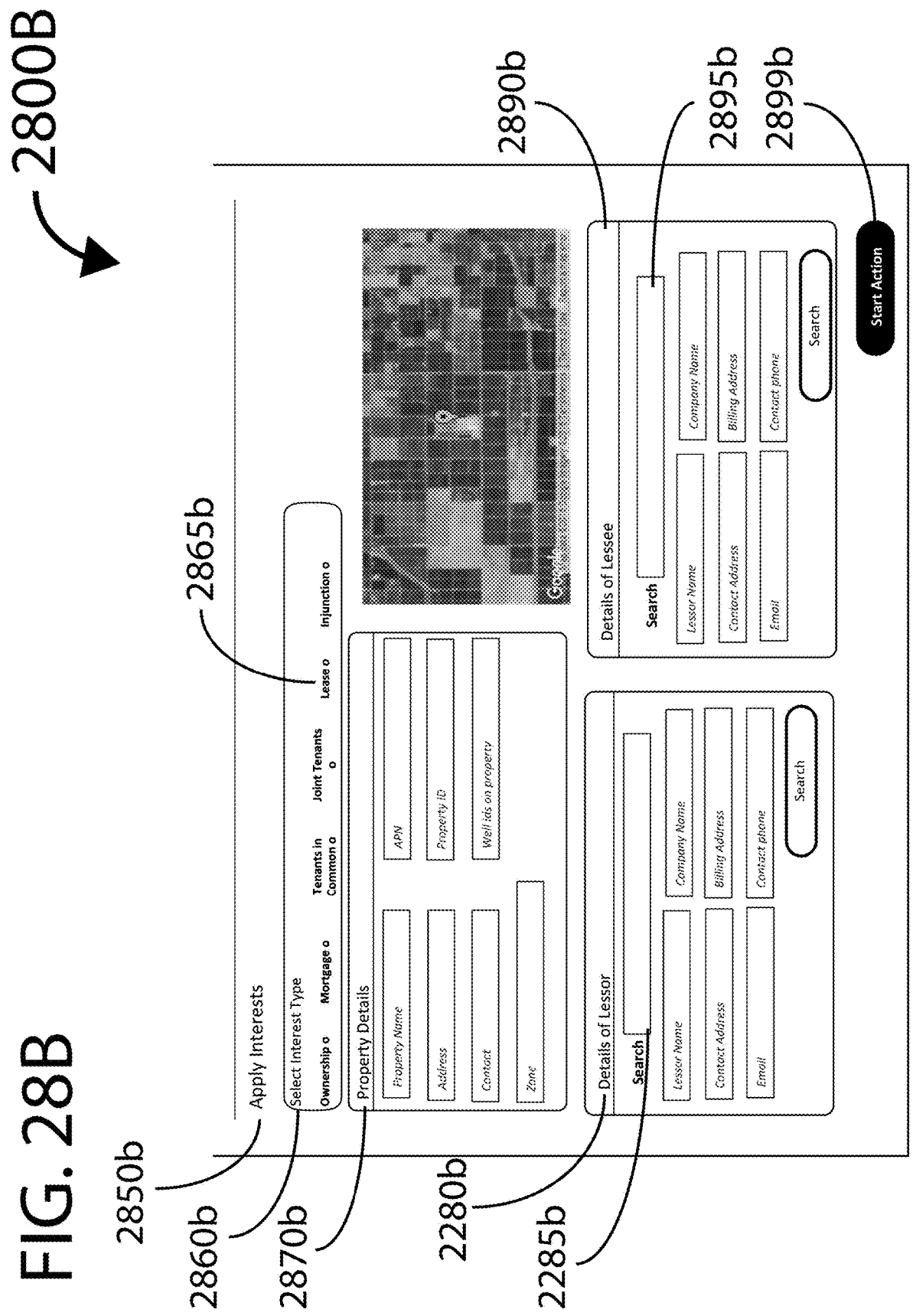

Referring to FIGS. 28A and 28B WAMP 150 displays the Interests display page 2800A/2800B for the WAMP 150. FIG. 28A shows the page's upper portion 2800A (FIG. 28B shows the lower portion 2800B). Referring to FIG. 28A, a Select Record subpage 2810a facilitates selecting a WAMP 150 record to create or update to reflect the interests being added. A record type selection bar 2820a displays radio buttons corresponding to WAMP 150 record types. For this exemplary Interests display page 2800A, property record type 2828a is shown selected. Alternative selections include Member record type 2824a and GWR record type 2826a.

Based on the record type selected, Interests display page 2800A may display a Search box 2830a that facilitates finding a specific record of the selected type to apply interest updates to. In this exemplary Interests display page 2800A, a Search box 2830a organized and formatted specifically for a property record search is displayed. Should the sustainability manager select a different type of record type to apply interest to, the Search box 2830a may be replaced by a corresponding alternatively organized and formatted search box.

To illustrate use of this exemplary Interests display page 2800A/2800B, let us assume that GMA member Albert Tesla is leasing his farm to Judith Jedson. Wally selects the property record type radio button 2828a to select the record type to apply interest to. The corresponding Search box 2830a for property account records is displayed. Wally may fill in one or more fields in the Search Box 2830a before clicking the Search button 2839a to initiate the record search by the WAMP 150. For example, Wally may type the appraiser's parcel number (APN #) of Albert's farm into the APN box 2835a and click the Search button 2839a to locate and access the WAMP 150 property account record corresponding to Albert's farm.

After Wally clicks the Search button 2839a, the WAMP 150 may display a corresponding search result entry (or entries) in the Results table 2840a. In some embodiments, each Results table entry may be a clickable link to a corresponding search-matched record as may be apparent to one skilled in the art. In this instance, there may be only one Results table entry (not shown) corresponding to the APN #, but in other instances multiple Results table entries may be displayed by a WAMP 150. A sustainability manager may click on a Results table entry that is recognizable as correct (or failing that, choose arbitrarily and click on a Results table entry in a relatively quick process of trial and error). In some embodiments, if the WAMP 150 search results in no match, a "Create a new record" result/link (not shown) may be displayed in the Results table 2820a.

Referring to FIG. 2800B, with a selection of a record type to apply interest to and the selection of such a record, Apply Interests subpage 2850b may be displayed.

Within Apply Interests subpage 2850b, a interest type selection bar 2860a displays radio buttons corresponding to WAMP 150 property interest types. For this exemplary Interests page 2800B, interest type Lease 2865b is shown selected.

The format and organization of the Apply Interests subpage 2850b may vary with the record type to apply interest to that was selected in record type selection bar 2810a. In exemplary Interests display page 2800B, the Apply Interests subpage 2850b shown is therefore correspondingly organized and formatted for applying an interest to a WAMP 150 property account record. Furthermore, portions of the Apply Interests subpage 2850b may vary additionally based on the property interest type selected in interest type selection bar 2860b.

In exemplary Interests display page 2800B, three entry subpages are displayed based on selection of the Lease interest type 2865b: Property Details subpage 2870b, Details of Lessor 2880b and Details of Lessee 2890b. In some embodiments, the WAMP 150 may automatically populate the displayed fields of Property Details subpage 2870b based on the Result entry selected from Results table 2840a. Additionally, search entry boxes 2885b and 2895b facilitate auto-population of Details of Lessor 2880b and Details of Lessee 2890b subpages respectively. Upon filling in fields of Property Details 2870b, Details of Lessor 2880b and Details of Lessee 2890b subpages, clicking the Start Action button 2899b may cause the thusly described property interest to be applied to the property account record (not shown) selected from the Results table 2840a and a "registration of lease" action notification added for the required change to the WER registry.

Figure 29B:
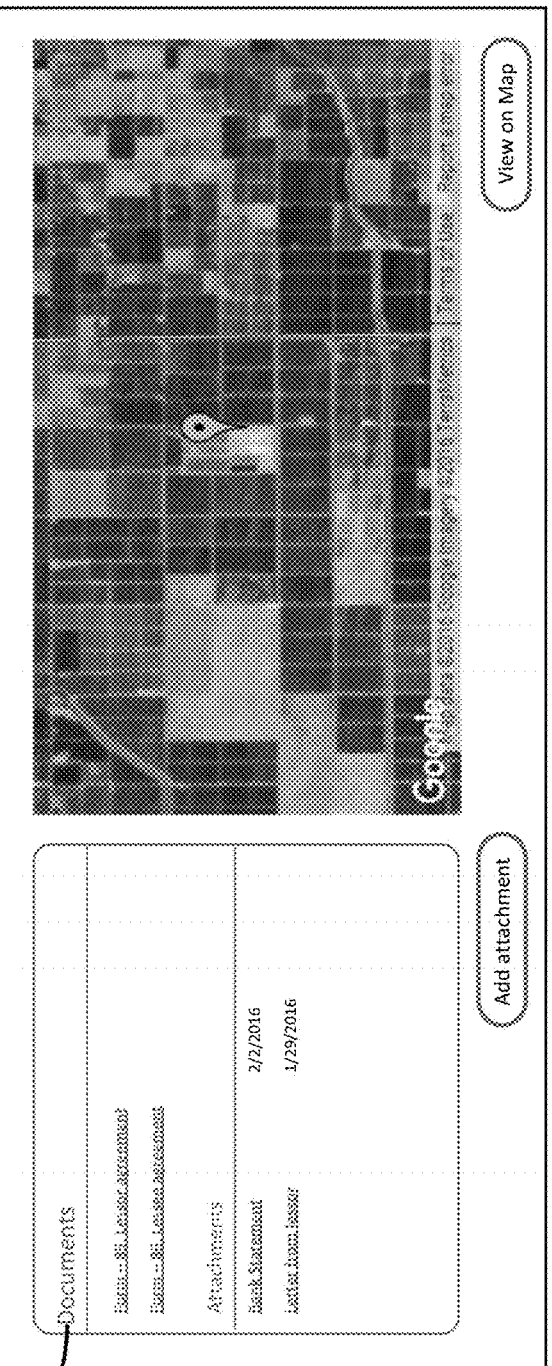

Referring to FIGS. 29A and 29B WAMP 150 displays the Registry Action display page 2900A/2900B for the WAMP 150. FIG. 29A shows the page's upper portion 2900A (FIG. 29B shows the lower portion 2900B). Referring to FIG. 29A, WAMP 150 displays a Registration of Lease 2910a for the Naitos' just completed water extraction right lease 2920a. Referring to FIG. 29B, WAMP 150 displays a Documents table 2960b containing links to supporting documents for the Naitos' water extraction right lease 2920a.

Referring to FIG. 30, a Registry Documents Repository display page 3000 is shown. A sustainability manager may upload new documents by clicking on Upload Document button 3020 and entering a file name (not shown). The WAMP 150 supports numerous document and image formats including, but not limited to: .TXT, .RTF, .DOCX, .PDF, and .JPEG. A sustainability manager may locate a document stored in the WER registry by clicking on Quick Search button 3030 and entering a search term in a search entry box (not shown). A document listed as an entry in the Documents table 3040 may be opened by clicking on the entry link in the table 3050 for that document.

Having wrapped up his tasks related to the Naitos, Wally wants to take a look at the overall activity and performance of his GMA. Rather than navigate through several individual WAMP 150 display pages, Wally utilizes his WAMP 150 custom configurable dashboard where he has accumulated and arranged key WAMP 150 indicators of the operation of his GMA so he can get a quick overview of the GMA's business with a quick visual scan.

Figure 31A:
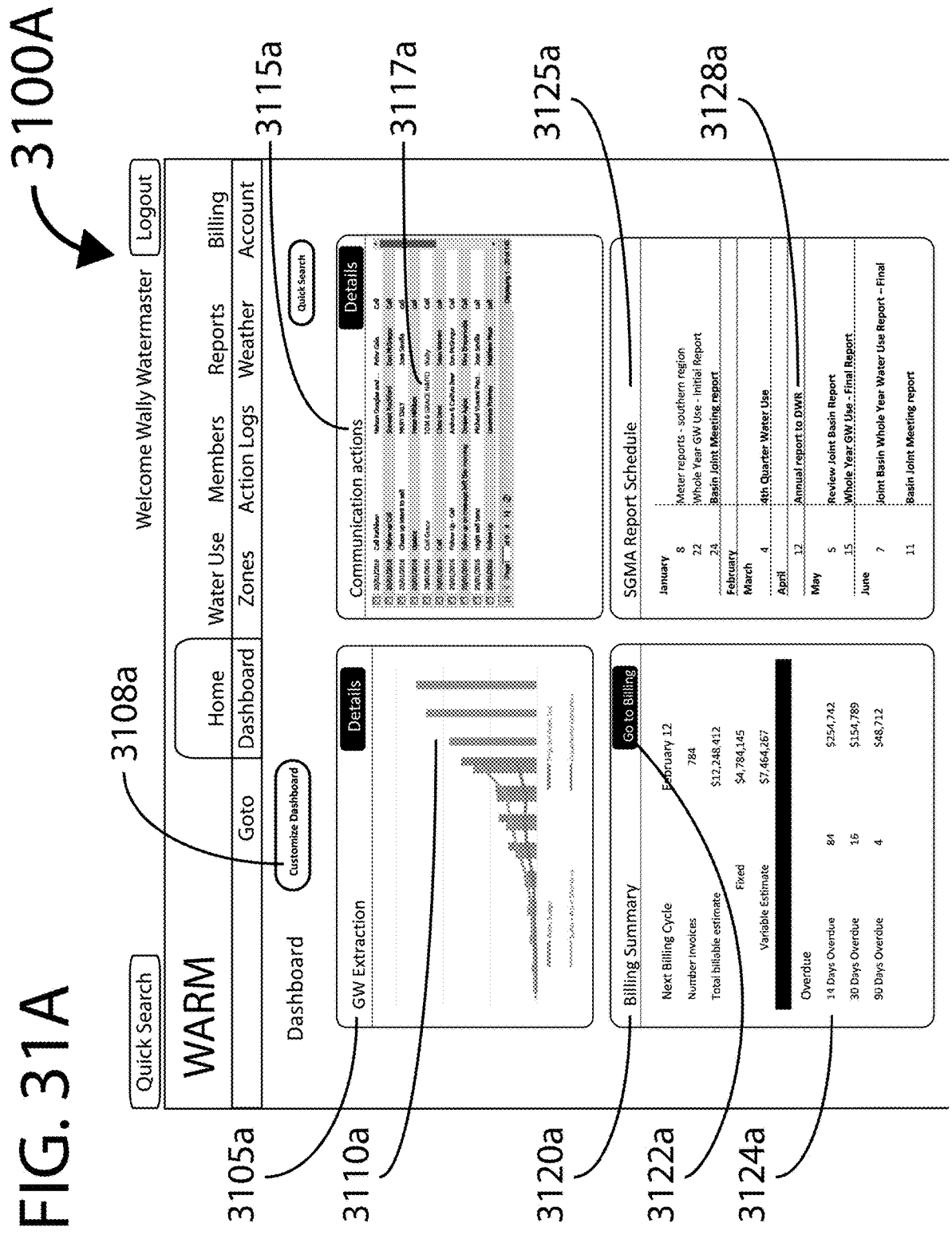

Referring to FIGS. 31A and 31B WAMP 150 displays the Dashboard display page 3100A/3100B for the WAMP 150. FIG. 31A shows the Dashboard page's upper portion 3100A (FIG. 31B shows the lower portion 3100B). Referring to FIG. 31A, Wally quickly scans the display elements that he currently has assembled on his dashboard. First he checks the GW Extraction graph 3105a that represents the ongoing results of the WAMP 150 water balance modeling. Wally is particularly interested and concerned about the right hand side of the graph 3110a where projected future water use is quantified. The warmer and more sunny growing season is approaching and he knows meeting sustainability goals will become more of a challenge as rainfall decreases and evapotranspiration increases.

Next Wally looks at the Communications Actions table 3115a, which serves effectively as a to-do list for member outreach. He sees his action notification to himself 3117a to call Grace Naito, which in some embodiments may be a clickable link that may navigate for example to a WAMP 150 display page for the Naito's member account. Wally gazes next at the SGMA Report Schedule table 3125a, the upcoming annual report to the DWR 3128a is a constant reminder to Wally that his efforts have real consequences.

The Billing Summary 3120a also is a to-do list of sorts. Wally sees that the 14 days overdue numbers 3124a are creeping up. Many farmers are stressed by rising water costs and increased competition.

Referring to FIG. 31B, Wally takes a quick moment of satisfaction as he notes that the Naitos' water lease no longer appears in the Pending Registry Actions list 3160b (a filtered list of action notifications specific to WER registry changes), because he cleared it personally. Finally, Wally ponders the Recently Saved Reports table 3170a with both relief and some trepidation. He has several of the most pressing reports done, but he knows he also has three more reports to review and publish.

Referring again to FIG. 31A, Wally glances at the Customize Dashboard button 3108a. He knows that he wants to reconfigure his dashboard to give him quicker visibility into overdue accounts, but decides he'll work on that from home after dinner tonight. Instead, Wally clicks the Goto Billing button 3122a and proceeds to look into billing.

Figure 32B:
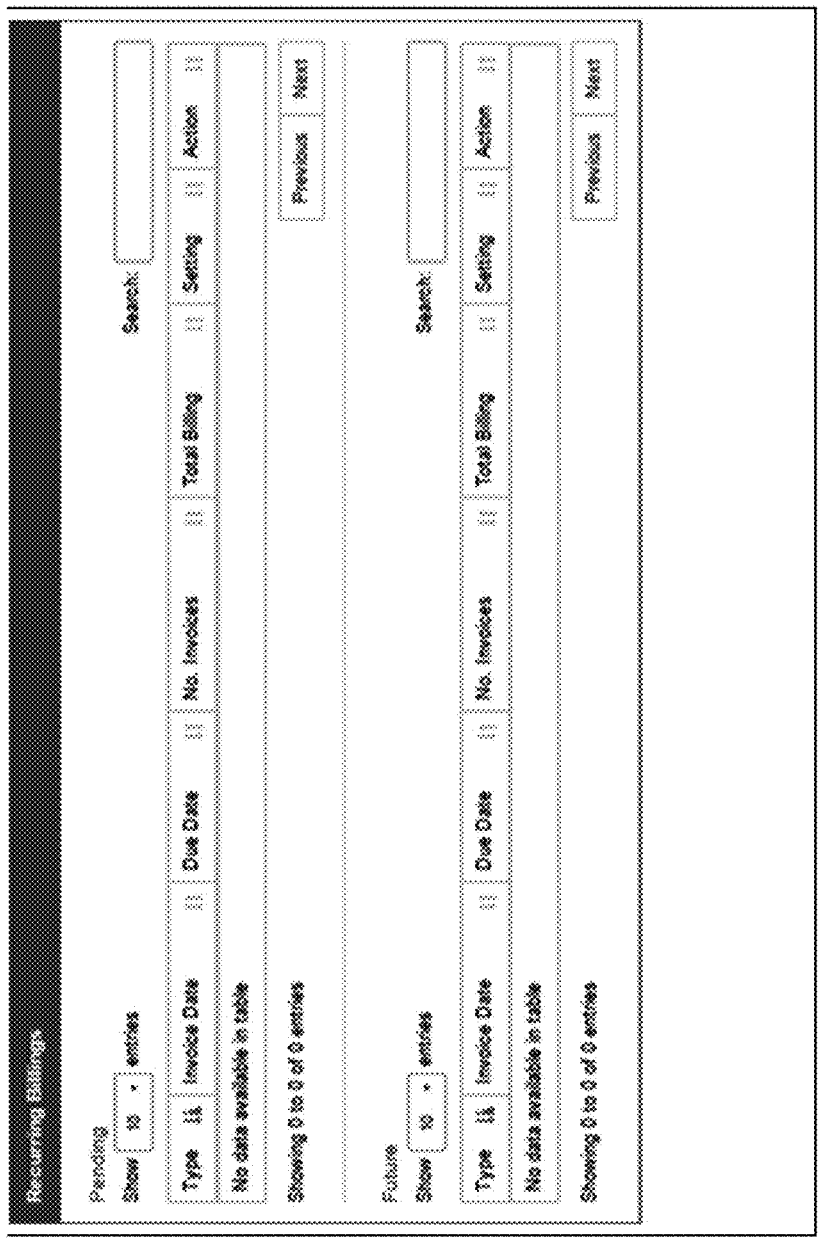

Referring to FIGS. 32A and 32B WAMP 150 displays the Invoices display page 3200A/3200B for WAMP 150 Billing. FIG. 32A shows the Invoices display page's upper portion 3200A (FIG. 32B shows the lower portion 3200B). Referring to FIG. 32A, Wally takes a quick look at Current Invoices total 3220a—i.e., the total amount that will be billed in the billing run. Furthermore, Wally knows that he may utilize the WAMP 150 to view the exact billing lines that may be included in that billing run (not shown). He sees that it is slightly higher than last month, which is what he expected. He knows that it will go up substantially as the summer approaches. Next, he looks at the Overdue Invoices total 3230a. It is up again for the fourth month running. He knows he'll be calling several of his members this afternoon to see how the GMA may help. Before that though, he'll run some WAMP 150 water balance models for each farmer to see how they might conserve on water use. He'll do that right after his coffee break.

Figure 33A:
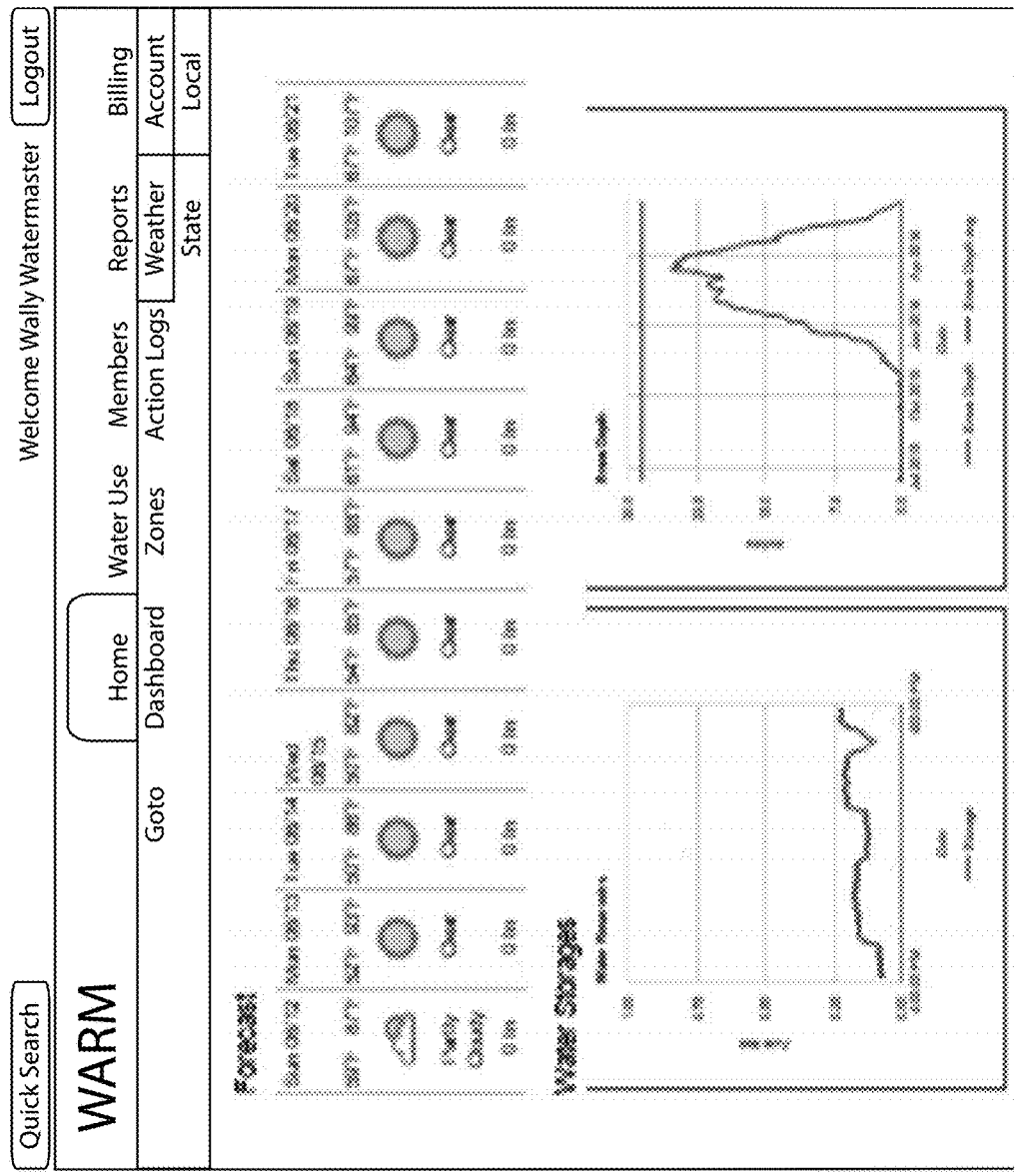
FIGS. 33A and 33B are upper and lower portions (respectively) of an exemplary screen image illustrating the sustainability manager experience of a WAMP Local Weather display page for the embodiment of FIG. 1.
Figure 33B:
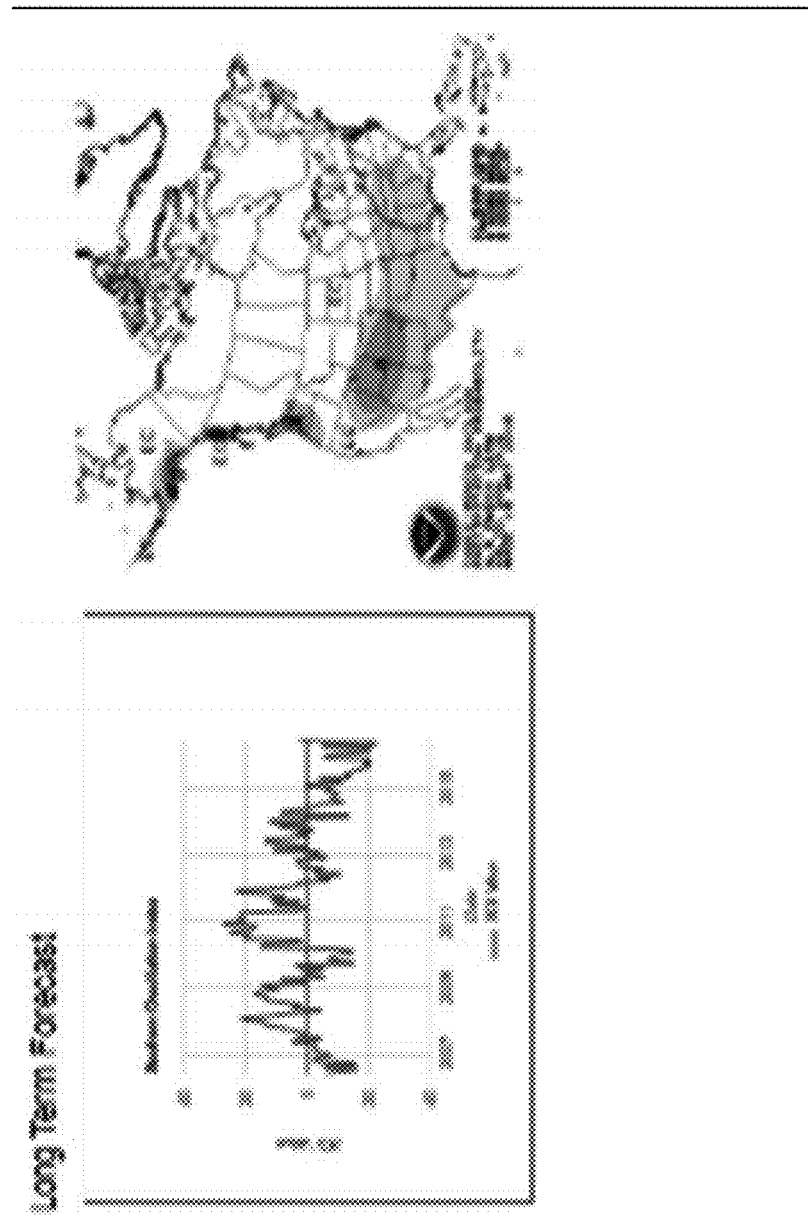

Referring to FIGS. 33A and 33B WAMP 150 displays the Local Weather display page 3300A/3300B. FIG. 33A shows the Local Weather display page's upper portion 3300A (FIG. 33B shows the lower portion 3300B). Referring to FIG. 33A, Wally looks over the weather for the next few days. Then he grabs his jacket and heads for the door.

Many modifications and additions to the above embodiments are possible. For example, groundwater imputation factor of Resource Monitor 264 may also take into consideration groundwater recharging by the property.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. In an electronic newsletter distribution system useful in association with a water agency management platform (WAMP), a method for promulgating exchange information thereby facilitating administration of groundwater extraction rights market for a plurality of stakeholders, the method comprising:

receiving water rights information from the WAMP, wherein the water rights information is derived in part by the WAMP executing the steps of:

monitoring groundwater and surface-water resources by sensor data communicating via telemetry facilities and stored in a resource and physical plant database;

implementing water agency logic using information from the resource and physical plant database, and a weather and climate database wherein the water agency logic manages the groundwater and surface-water resources in at least one trading-zone;

receiving offer data from a workflow database responsive to privilege and access controls stored in a user database (i) that is generated in response to physical activity of a plurality of human users of the WAMP and (ii) that represents a plurality of offers to trade an utilization of a groundwater extraction right (GWR), wherein the GWR is associated with the at least one trading zone;

determining that the trading zone that is associated with open trading data in the WAMP by accessing a jurisdiction and rights database (i) that is generated in response to physical activity of a human managing user of the WAMP and (ii) that indicates that water rights associated with the trading zone can be traded without intervention by the managing user;

matching at least two of the plurality of offers to trade the utilization of the GWR;

intermediating the transfer of the GWR based on at least one transfer rule without intervention by the managing user upon the condition that the open trading data indicates that water rights associated with the trading zone can be traded without intervention by the managing user; and transferring groundwater responsive to the transferred GWR using existing groundwater distribution systems determined by the resource and physical plant database; and distributing a portion of the water rights information to at least one of the plurality of stakeholders.

2. The method of claim 1 further comprising uploading water pricing and offering information into a Customer Relations Management (CRM) tool.

3. The method of claim 2 further comprising providing the at least one of the plurality of stakeholders with a portion of the water pricing and water offering information based on the at least one stakeholder's trading zone.

4. The method of claim 3 further comprising enabling the at least one plurality of stakeholders to buy a "sell order" or to sell a "buy order" in response to the water pricing and water offering information.

5. The method of claim 4 further comprising enabling the at least one plurality of stakeholders to buy the "sell order" by a "click to buy", or to sell the "buy orders" by a "click to sell".

6. The method of claim 1, wherein the groundwater resource includes at least one aquifer.

7. The method of claim 1, wherein the boundaries of the at least one trading zone is based on a surface geographical trace of an underlying groundwater sub-basin.

8. An electronic newsletter distribution system useful in association with a water agency management platform (WAMP), the distribution system promulgating exchange information thereby facilitating administration of groundwater extraction rights market for a plurality of stakeholders, and wherein the distribution system is configured to:

receive water rights information from the WAMP, wherein the water rights information is derived in part by the WAMP executing the steps of:

monitoring groundwater and surface-water resources by sensor data communicating via telemetry facilities and stored in a resource and physical plant database;

implementing water agency logic using information from the resource and physical plant database, and a weather and climate database wherein the water agency logic manages the groundwater and surface-water resources in at least one trading-zone;

receiving offer data from a workflow database responsive to privilege and access controls stored in a user database (i) that is generated in response to physical activity of a plurality of human users of the WAMP and (ii) that represents a plurality of offers to trade an utilization of a groundwater extraction right (GWR), wherein the GWR is associated with the at least one trading zone;

determining that the trading zone that is associated with open trading data in the WAMP by accessing a jurisdiction and rights database (i) that is generated in response to physical activity of a human managing user of the WAMP and (ii) that indicates that water rights associated with the trading zone can be traded without intervention by the managing user;

matching at least two of the plurality of offers to trade the utilization of the GWR;

intermediating the transfer of the GWR based on at least one transfer rule without intervention by the managing user upon the condition that the open trading data indicates that water rights associated with the trading zone can be traded without intervention by the managing user; and transferring groundwater responsive to the transferred GWR using existing groundwater distribution systems determined by the resource and physical plant database; and distributing a portion of the water rights information to at least one of the plurality of stakeholders.

9. The distribution system of claim 8 further configured to upload water pricing and offering information into a Customer Relations Management (CRM) tool.

10. The distribution system of claim 9 further configured to provide the at least one of the plurality of stakeholders with a portion of the water pricing and water offering information based on the at least one stakeholder's trading zone.

11. The distribution system of claim 10 further configured to enable the at least one plurality of stakeholders to buy a "sell order" or to sell a "buy order" in response to the water pricing and water offering information.

12. The distribution system of claim 11 further configured to enable the at least one plurality of stakeholders to buy the "sell order" by a "click to buy", or to sell the "buy orders" by a "click to sell".

13. The distribution system of claim 8, wherein the groundwater resource includes at least one aquifer.

14. The distribution system of claim 8, wherein the boundaries of the at least one trading zone is based on a surface geographical trace of an underlying groundwater sub-basin.

* * * * *